(12) United States Patent
Amimoto et al.

(10) Patent No.: US 11,848,620 B2
(45) Date of Patent: Dec. 19, 2023

(54) THREE-LEVEL POWER CONVERSION DEVICE

(71) Applicant: Mitsubishi Electric Corporation, Tokyo (JP)

(72) Inventors: Takeshi Amimoto, Tokyo (JP); Yu Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 272 days.

(21) Appl. No.: 17/605,235

(22) PCT Filed: Jul. 4, 2019

(86) PCT No.: PCT/JP2019/026732
§ 371 (c)(1),
(2) Date: Oct. 21, 2021

(87) PCT Pub. No.: WO2021/002017
PCT Pub. Date: Jan. 7, 2021

(65) Prior Publication Data
US 2022/0181990 A1 Jun. 9, 2022

(51) Int. Cl.
*H02M 7/483* (2007.01)
*H02M 1/00* (2006.01)
*H02M 7/5387* (2007.01)

(52) U.S. Cl.
CPC ......... *H02M 7/483* (2013.01); *H02M 1/0009* (2021.05); *H02M 7/53871* (2013.01)

(58) Field of Classification Search
CPC ........ H02M 3/073; H02M 3/10; H02M 3/135; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875;
(Continued)

(56) References Cited

U.S. PATENT DOCUMENTS

| | | | |
|---|---|---|---|
| 6,720,675 B2 * | 4/2004 | Azuma | H02M 7/23 307/85 |
| 9,013,906 B2 * | 4/2015 | Itoh | H02M 7/483 363/132 |
| 2018/0138827 A1 * | 5/2018 | Goto | H02M 7/521 |

FOREIGN PATENT DOCUMENTS

JP 2012-205390 A 10/2012
JP 2017-127115 A 7/2017

OTHER PUBLICATIONS

International Search Report and Written Opinion dated Sep. 3, 2019, received for PCT Application PCT/JP2019/026732, Filed on Jul. 4, 2019, 8 pages including English Translation.

\* cited by examiner

*Primary Examiner* — Jeffrey A Gblende
(74) *Attorney, Agent, or Firm* — XSENSUS LLP

(57) ABSTRACT

A first leg includes a first switch circuit disposed between a first node to which a positive electrode of a DC power supply is connected and a second node and a second switch circuit disposed between the second node and a third node. A first filter circuit includes a first capacitor. A bridge circuit includes a second leg and a third leg that are disposed in parallel between the first node and the third node. A clamp circuit includes a bidirectional switch disposed between a fourth node that is a midpoint of the second leg and a fifth node that is a midpoint of the third leg. A second filter circuit includes a first reactor and a second reactor.

18 Claims, 59 Drawing Sheets

(58) Field of Classification Search
CPC ........ H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02M 7/5395; H02M 7/483; H02M 1/0009
See application file for complete search history.

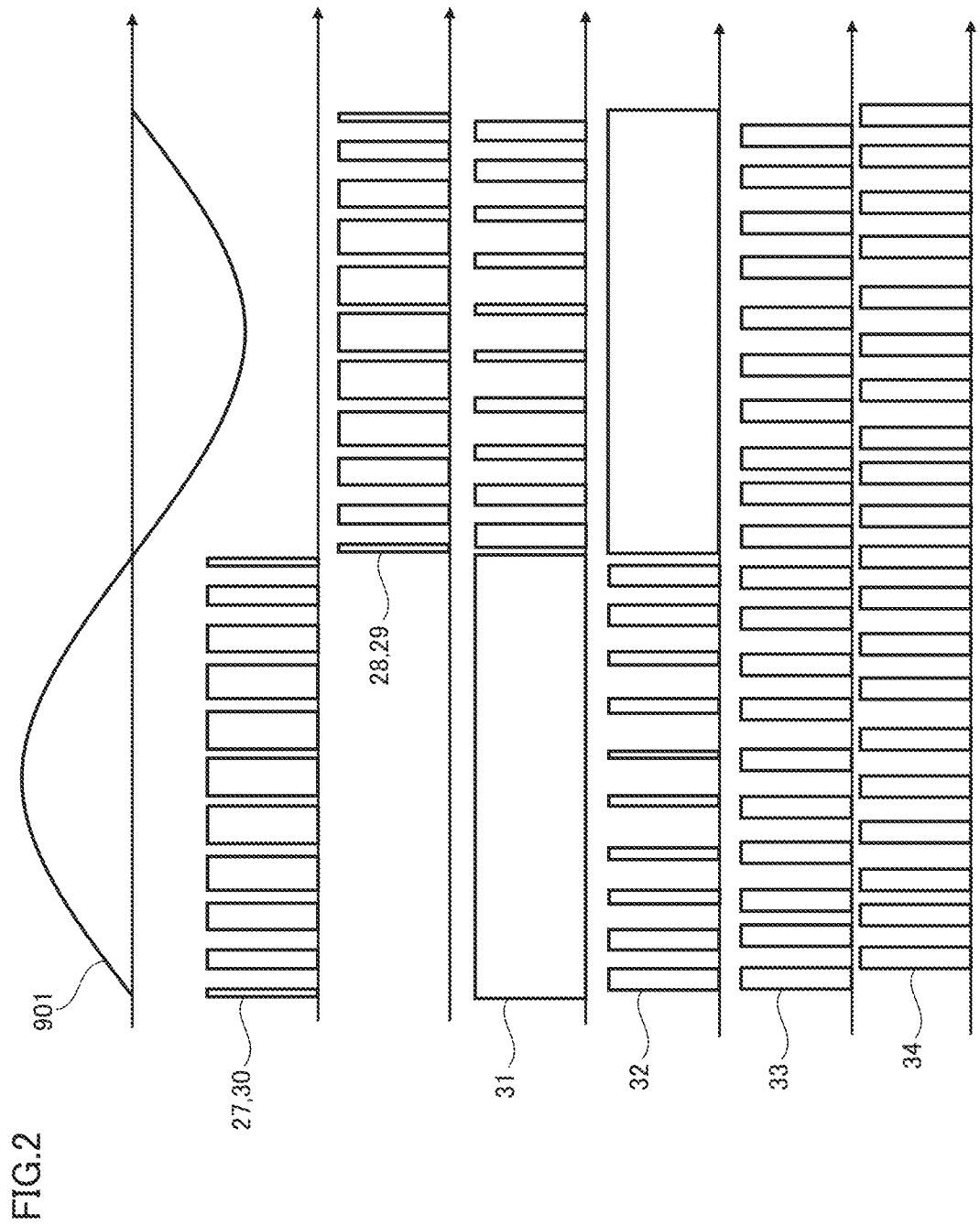

FIG.3

| BRIDGE CIRCUIT SWITCHING STATE | | CLAMP CIRCUIT SWITCHING STATE | | OUTPUT VOLTAGE VOUT | OPERATION MODE |
|---|---|---|---|---|---|
| ELEMENT 5 ELEMENT 8 | ELEMENT 6 ELEMENT 7 | ELEMENT 9 | ELEMENT 10 | | |
| ON | OFF | ON | OFF | POSITIVE BIAS | FIRST SWITCHING MODE |
| OFF | OFF | ON | OFF | ZERO BIAS | FIRST DEAD TIME MODE |
| OFF | OFF | ON | ON | ZERO BIAS | SECOND SWITCHING MODE |
| OFF | ON | OFF | ON | NEGATIVE BIAS | THIRD SWITCHING MODE |
| OFF | OFF | OFF | ON | ZERO BIAS | SECOND DEAD TIME MODE |

FIG.48

| | AC VOLTAGE > POSITIVE AND AC CURRENT > POSITIVE | | | AC VOLTAGE < POSITIVE AND AC CURRENT < POSITIVE | | |
|---|---|---|---|---|---|---|
| | POWER TRANSMISSION PERIOD | DEAD TIME PERIOD | FLOW BACK PERIOD | POWER TRANSMISSION PERIOD | DEAD TIME PERIOD | FLOW BACK PERIOD |
| POWER OF AC POWER SUPPLY 17 > POWER OF AC POWER SUPPLY 18 | | | | | | |
| SWITCHING ELEMENT 11 IS ON | POWER TRANSMISSION | REGENERATION | FLOW BACK | POWER TRANSMISSION | FLOW BACK | FLOW BACK |
| SWITCHING ELEMENT 12 IS ON | POWER TRANSMISSION | FLOW BACK | FLOW BACK | FLOW BACK | REGENERATION | REGENERATION |
| SWITCHING ELEMENTS 11, 12 ARE OFF | FLOW BACK | REGENERATION | REGENERATION | FLOW BACK | REGENERATION | REGENERATION |
| POWER OF AC POWER SUPPLY 17 < POWER OF AC POWER SUPPLY 18 | | | | | | |
| SWITCHING ELEMENT 11 IS ON | POWER TRANSMISSION | FLOW BACK | FLOW BACK | POWER TRANSMISSION | REGENERATION | FLOW BACK |
| SWITCHING ELEMENT 12 IS ON | POWER TRANSMISSION | REGENERATION | REGENERATION | POWER TRANSMISSION | FLOW BACK | FLOW BACK |
| SWITCHING ELEMENTS 11, 12 ARE OFF | FLOW BACK | REGENERATION | REGENERATION | FLOW BACK | REGENERATION | REGENERATION |

FIG.56

THREE-LEVEL POWER CONVERSION DEVICE

CROSS-REFERENCE TO RELATED APPLICATION

The present application is based on PCT filing PCT/JP2019/026732, filed Jul. 4, 2019, the entire contents of which is incorporated herein by reference.

TECHNICAL FIELD

The present invention relates to a three-level power conversion device.

BACKGROUND ART

A three-level power conversion device including a clamp circuit is known. For example, a three-level power conversion device described in PTL 1 includes a bridge circuit, a filter circuit, a clamp circuit, and a control circuit. The bridge circuit converts an input DC voltage and outputs an AC voltage. The filter circuit attenuates a high-frequency component of the AC voltage output from the bridge circuit. The clamp circuit is interposed between the bridge circuit and the filter circuit, and can short-circuit an output side of the bridge circuit. The control circuit controls a plurality of switching elements included in the bridge circuit and the clamp circuit to output the AC voltage having at least three voltage levels from the filter circuit.

CITATION LIST

Patent Literature

PTL 1: Japanese Patent Laying-Open No. 2017-127115

SUMMARY OF INVENTION

Technical Problem

When the three-level power conversion device including the clamp circuit is caused to perform single-phase three-wire operation, the following problem is generated. When the two AC powers output from the three-level power conversion device are different from each other, some currents pass through a power supply, but other currents do not pass through the power supply. As a result, the three-level power conversion device cannot continue stable operation.

An object of the present invention is to provide a three-level power conversion device including a clamp circuit capable of performing the stable single-phase three-wire operation.

Solution to Problem

According to one aspect of the present invention, a three-level power conversion device includes: a first leg including a first switch circuit disposed between a first node to which a positive electrode of a DC power supply is connected and a second node and a second switch circuit disposed between the second node and a third node; a first filter circuit including a first capacitor disposed between the first node and the third node; a bridge circuit including a second leg and a third leg that are disposed in parallel between the first node and the third node; a clamp circuit including a fourth leg including a bidirectional switch disposed between a fourth node that is a midpoint of the second leg and a fifth node that is a midpoint of the third leg; and a second filter circuit including a first reactor including a first terminal connected to the fourth node and a second terminal connected to a sixth node and a second reactor including a first terminal connected to the fifth node and a second terminal connected to a seventh node.

Advantageous Effects of Invention

When the three-level power conversion device of the present invention includes the bidirectional switch, generation of the state in which part of the current passes through the power supply (DC power supply, first capacitor) but other currents do not pass through the power supply (DC power supply, first capacitor) can be reduced in the case of different magnitudes of the two AC powers output from the three-level power conversion device. As a result, the three-level power conversion device can continue stable operation.

BRIEF DESCRIPTION OF DRAWINGS

FIG. 2 is a view illustrating an AC power command value 201 and drive signals 27 to 34 during single-phase three-wire operation of the power conversion device 1 of the first embodiment.

FIG. 3 is a view illustrating a relationship between states of switching elements included in a bridge circuit 200 and a clamp circuit 300 and an output voltage VOUT and an operation mode of the power conversion device 1.

FIG. 48 is a view illustrating magnitude of power of the AC power supply 17 and power of the AC power supply 18, a sign of the AC voltage, a sign of the AC current, and a path of the differential current IB for each on and off of the switching element 11 and the switching element 12.

FIG. 56 is a view illustrating a configuration of a power conversion device 1 according to a fifth embodiment.

DESCRIPTION OF EMBODIMENTS

With reference to the drawings, embodiments will be described below.

First Embodiment

Figure 1:
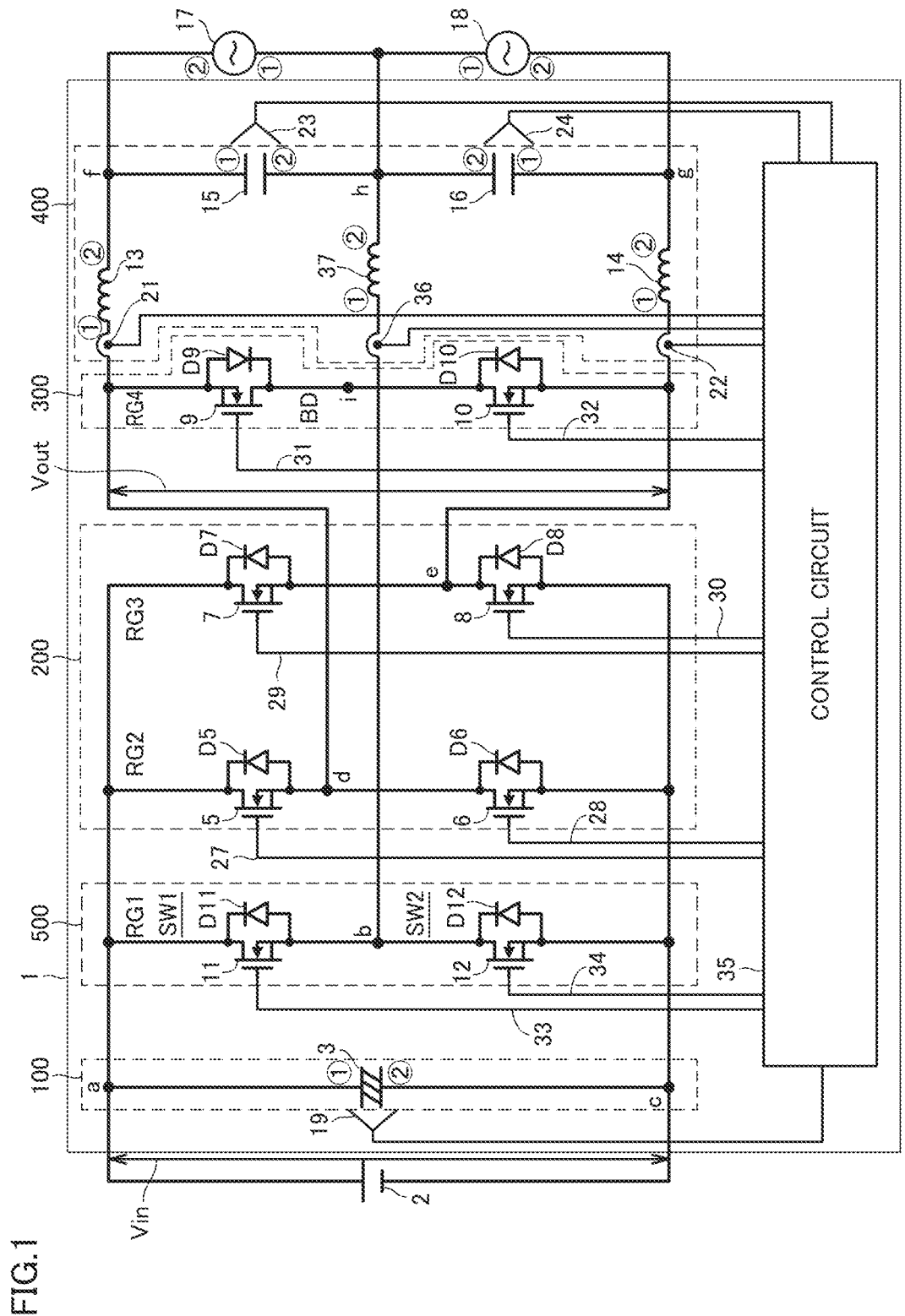
FIG. 1 is a view illustrating a configuration of a power conversion device 1 according to a first embodiment.

FIG. 1 is a view illustrating a configuration of a power conversion device 1 according to a first embodiment. Power conversion device 1 is a three-level power conversion device. In the following description, the three-level power conversion device is also referred to as a power conversion device.

An input of power conversion device 1 is connected to a DC power supply 2. An output of power conversion device 1 is connected to an AC power supply 17 and an AC power supply 18.

For example, DC power supply 2 is a DC stabilizing power supply, a fuel cell, a solar cell, a wind power generator, or a storage battery. DC power supply 2 may be directly connected to a power supply or may be connected to an inverter through a conversion mechanism such as a converter.

For example, AC power supply 17 and AC power supply 18 are a power system or an AC load. When DC power supply 2 is a secondary battery, not only discharge but also charge can be performed. Accordingly, power conversion device 1 can not only convert DC power into AC power, but also convert the AC power into the DC power.

Power conversion device 1 includes a first filter circuit 100, a first leg RG1, a bridge circuit 200, a clamp circuit 300, a second filter circuit 400, a first leg 500, voltage detectors 19, 23, 24, current detectors 21, 22, 36, and a control circuit 35.

A positive electrode of DC power supply 2 is connected to a node a (first node). A negative electrode of DC power supply 2 is connected to a node c (third node). A first terminal of AC power supply 17 and a first terminal of AC power supply 18 are connected at a node h (eighth node). A second terminal of AC power supply 17 is connected to a node f (sixth node). A second terminal of AC power supply 18 is connected to a node g (seventh node).

First filter circuit 100 includes a capacitor 3 (first capacitor) disposed between node a and node c. A first terminal of capacitor 3 is connected to node a. A second terminal of capacitor 3 is connected to node c.

Bridge circuit 200 includes a second leg RG2 and a third leg RG3 that are disposed in parallel between node a and node c. Bridge circuit 200 operates as an inverter circuit that converts the DC power supplied from DC power supply 2 into the AC power. Bridge circuit 200 converts a DC voltage VIN supplied from DC power supply 2 into an AC voltage defined by a combination of a positive bias (+VIN) and a negative bias (-VIN).

Second leg RG2 includes a switching element 5 (first switching element) disposed between node a and a node d (fourth node) that is a midpoint of second leg RG2 and a switching element 6 (second switching element) disposed between node d and node c. A positive electrode of switching element 5 is connected to node a. A negative electrode of switching element 5 is connected to node d. A positive electrode of switching element 6 is connected to node d. A negative electrode of switching element 6 is connected to node c. Second leg RG2 further includes a diode D5 (first diode) connected in antiparallel to switching element 5 and a diode D6 (second diode) connected in antiparallel to switching element 6.

Third leg RG3 includes a switching element 7 (third switching element) arranged between node a and a node e (fifth node) that is a midpoint of third leg RG3 and a switching element 8 (fourth switching element) disposed between node e and node c. A positive electrode of switching element 7 is connected to node a. A negative electrode of switching element 7 is connected to node e. A positive electrode of switching element 8 is connected to node e. A negative electrode of switching element 8 is connected to node c. Third leg RG3 further includes a diode D7 (third diode) connected in antiparallel to switching element 7 and a diode D8 (fourth diode) connected in antiparallel to switching element 8.

Clamp circuit 300 includes a fourth leg RG4 including a bidirectional switch BD disposed between node d and node e. Clamp circuit 300 is configured to be capable of short-circuiting node b (second node) and node e.

Bidirectional switch BD includes a switching element 9 (fifth switching element), a switching element 10 (sixth switching element), a diode D9 (fifth diode), and a diode D10 (sixth diode). Switching element 9 is disposed between node d and a node i (ninth node). Switching element 10 is disposed between node i and node e. A negative electrode of switching element 9 is connected to node d. A negative electrode of switching element 10 is connected to node e. A positive electrode of switching element 9 and a positive electrode of switching element 10 are connected to node i. Diode D9 is connected in antiparallel to switching element 9. Diode D10 is connected in antiparallel to switching element 10.

Second filter circuit 400 includes a capacitor 15 (second capacitor) and a capacitor 16 (third capacitor) that are connected in series between node f and node g. A first terminal of capacitor 15 is connected to node f, and a second terminal of capacitor 15 is connected to node h. A first terminal of the capacitor 16 is connected to node g, and a second terminal of capacitor 16 is connected to node h.

Second filter circuit 400 further includes reactors 13, 14, 37.

Reactor 13 (first reactor) is disposed between node d and node f A first terminal of reactor 13 is connected to node d. A second terminal of reactor 13 is connected to node f.

Reactor 14 (second reactor) is disposed between node e and node g. A first terminal of reactor 14 is connected to node e. A second terminal of reactor 14 is connected to node g.

Reactor 37 (third reactor) is disposed between node b and node h. A first terminal of reactor 37 is connected to node b. A second terminal of reactor 37 is connected to node h.

First leg 500 (RG1) includes a first switch circuit SW1 disposed between node a and node b and a second switch circuit SW2 disposed between node b and node c.

First switch circuit SW1 includes a switching element 11 (eighth switching element) and a diode D11 (eighth diode).

Second switch circuit SW2 includes a switching element 12 (seventh switching element) and a diode D12 (seventh diode).

Switching element 11 is disposed between node a and node b. Switching element 12 is disposed between node b and node c. A positive electrode of switching element 11 is connected to node a. A negative electrode of switching element 12 is connected to node c. A negative electrode of switching element 11 and a positive electrode of switching element 12 are connected to node b. Diode D11 is connected in antiparallel to switching element 11. Diode D12 is connected in antiparallel to switching element 12.

Voltage detector 19 detects the voltage at both ends of capacitor 3. Voltage detector 23 detects the voltage at both ends of capacitor 15. Voltage detector 24 detects the voltage at both ends of capacitor 16. Current detector 21 detects the current flowing through reactor 13. Current detector 22 detects the current flowing through reactor 14. Current detector 36 detects the current flowing through reactor 37.

Control circuit 35 receives output signals from voltage detectors 19, 23, 24 and output signals from current detectors 21, 22, 36. Control circuit 35 outputs drive signals 27, 28, 29, 30, 31, 32, 33, 34 for driving switching elements 5, 6, 7, 8, 9, 11, 11, 12.

Switching element 5 to 12 is configured by a metal oxide semiconductor field effect transistor (MOSFET), an insulated gate bipolar transistor (IGBT), or a high electron mobility transistor (HEMT). When switching element 5 to 12 is configured by the IGBT, a positive electrode of switching element 5 to 12 corresponds to a collector, a negative electrode corresponds to an emitter, and a control electrode corresponds to a gate. When switching element 5 to 12 is configured by the MOSFET, diodes D5 to D12 can utilize a parasitic diode formed in a direction from the source to the drain of the MOSFET or the HEMT. Capacitor 3 is assumed to be an electrolytic capacitor, but may be a film capacitor or a storage battery.

Power conversion device 1 performs the single-phase three-wire operation or the single-phase two-wire operation. When power conversion device 1 performs the single-phase three-wire operation, it is assumed that AC power supply 17 and AC power supply 18 are loads that consume different power.

When the power conversion device does not include switch circuit SW1 and switch circuit SW2, paths through which different currents flow cannot be generated in the case where the power of AC power supply 17 is different from the power of AC power supply 18. For this reason, the power conversion device does not perform the single-phase three-wire operation. Power conversion device 1 of the first embodiment including switch circuit SW1 and switch circuit SW2 can perform the single-phase three-wire operation.

FIG. 2 is a view illustrating an AC power command value 201 and drive signal 27 to 34 during the single-phase three-wire operation of power conversion device 1 of the first embodiment.

FIG. 2 illustrates AC power command value 201, drive signals 27, 30 of the switching elements 5, 8, drive signals 28, 29 of switching elements 6, 7, drive signal 31 of switching element 9, drive signal 32 of switching element 10, drive signal 33 of switching element 11, and drive signal 34 of switching element 12. Drive signal 27 to 34 are a binary of a high level or a low level. When a high-level drive signal is input to the switching element, the switching element is turned on to be in a conductive state. When a low-level drive signal is input to the switching element, the switching element is turned off to be in a cutoff state.

When AC power command value 201 is positive, the operation is as follows.

Switching elements 5, 8, 10 perform the switching. At this point, the switching operation of switching element 10 is complementary to the switching operation of switching elements 5, 8. Switching elements 6, 7 are always in the off-state. Switching element 9 is always in an on-state.

When AC power command value 201 is negative, the operation is as follows.

Switching elements 6, 7, 9 perform the switching. At this point, the switching operation of switching element 9 is complementary to the switching operation of switching elements 6, 7. Switching elements 5, 8 are always in the off-state. Switching element 10 is always in the on-state. Switching elements 11, 12 continue the switching operation regardless of whether AC power command value 201 is positive or negative.

In the above-described complementary operation, the timing of turning on one switching element and the timing of turning off the other switching element are set so as not to be completely simultaneous. This is to avoid generation of the short-circuit state of DC power supply 2.

For example, when switching elements 5, 8 are turned from on to off while switching element 10 is turned from off to on, because switching element 9 is always in the on-state, there is a possibility that all switching elements 5, 8, 9, 10 are temporarily in the on-state. In this case, a path short-circuiting DC power supply 2 is generated, and power conversion device 1 may fail due to overcurrent. For this reason, at the timing of switching on and off of switching elements 5, 8, 10 such that the path short-circuiting DC power supply 2 is not generated, dead time in which all three switching elements 5, 8, 10 are turned off is provided. At this point, there is no problem in that switching element 9 is always in the on-state. In this way, the generation of the short circuit can be prevented by switching the switching element in the on-state after providing the period in which all three switching elements 5, 8, 10 are turned off. Similarly, the dead time is provided at the time of switching on and off of switching elements 6, 7, 9. In general, a power conversion device of several kW often performs the switching of several tens of kilohertz, and in this case, the dead time of several microseconds is often provided. However, because the switching element using a SiC or GaN material called a wide bandgap semiconductor has short rising and falling time of the switching, the switching element may operate at the dead time of several tens of nanoseconds to several hundreds of nanoseconds.

FIG. 3 is a view illustrating a relationship between states of the switching elements included in bridge circuit 200 and clamp circuit 300 and an output voltage VOUT and an operation mode of power conversion device 1. The output voltage is a voltage between node d and node e. Output voltage VOUT is any of three levels of positive bias, zero bias, and negative bias. The positive bias is a voltage VIN of DC power supply 2. The zero bias is zero. The negative bias is (−VIN).

When switching elements 5, 8 are turned on, switching elements 6, 7 are turned off, switching element 9 is turned on, and switching element 10 is turned off, output voltage VOUT becomes a positive bias, and power conversion device 1 is set to a first switching mode.

When switching elements 5, 8 are turned off, switching elements 6, 7 are turned off, switching element 9 is turned on, and switching element 10 is turned off, output voltage VOUT becomes zero bias, and power conversion device 1 is set to a first dead time mode.

When switching elements 5, 8 are turned off, switching elements 6, 7 are turned off, switching element 9 is turned on, and switching element 10 is turned on, output voltage VOUT becomes zero bias, and power conversion device 1 is set to a second switching mode.

When switching elements 5, 8 are turned off, switching elements 6, 7 are turned on, switching element 9 is turned off, and switching element 10 is turned on, output voltage VOUT becomes a negative bias, and power conversion device 1 is set to a third switching mode.

When switching elements 5, 8 are turned off, switching elements 6, 7 are turned off, switching element 9 is turned off, and switching element 10 is turned on, output voltage VOUT becomes zero bias, and power conversion device 1 is set to a second dead time mode.

(A-1) AC Voltage is Positive, AC Current is Positive, Power of AC Power Supply 17>Power of AC Power Supply 18

The operation when the power of AC power supply 17 is larger than the power of AC power supply 18 in the case of the positive AC voltage and the positive AC current will be described.

When the AC voltage is positive, the voltage at the first terminal of capacitor 15 is positive, the voltage at the second terminal of capacitor 15 is negative, the voltage at the second terminal of capacitor 16 is positive, and the voltage at the first terminal of capacitor 16 is negative.

When the alternating current is positive, the current flows from the first terminal to the second terminal of reactor 13. At this point, switching elements 5, 8, 10 perform switching operations, switching elements 6, 7 are always in the off-state, and switching element 9 is always in the on-state.

It is assumed that the voltages of AC power supply 17 and AC power supply 18 are controlled by control circuit 35 so as to become, for example, AC 100 [V]. In this case, AC power supply 17 and AC power supply 18 operate as AC loads, and the power consumed by AC power supply 17 is larger than the power consumed by AC power supply 18. Because the power of AC power supply 17 is larger than the power of AC power supply 18, the current flowing through AC power supply 17 is larger than the current flowing through AC power supply 18.

(A-1-1) Power Transmission Period

Figure 4:
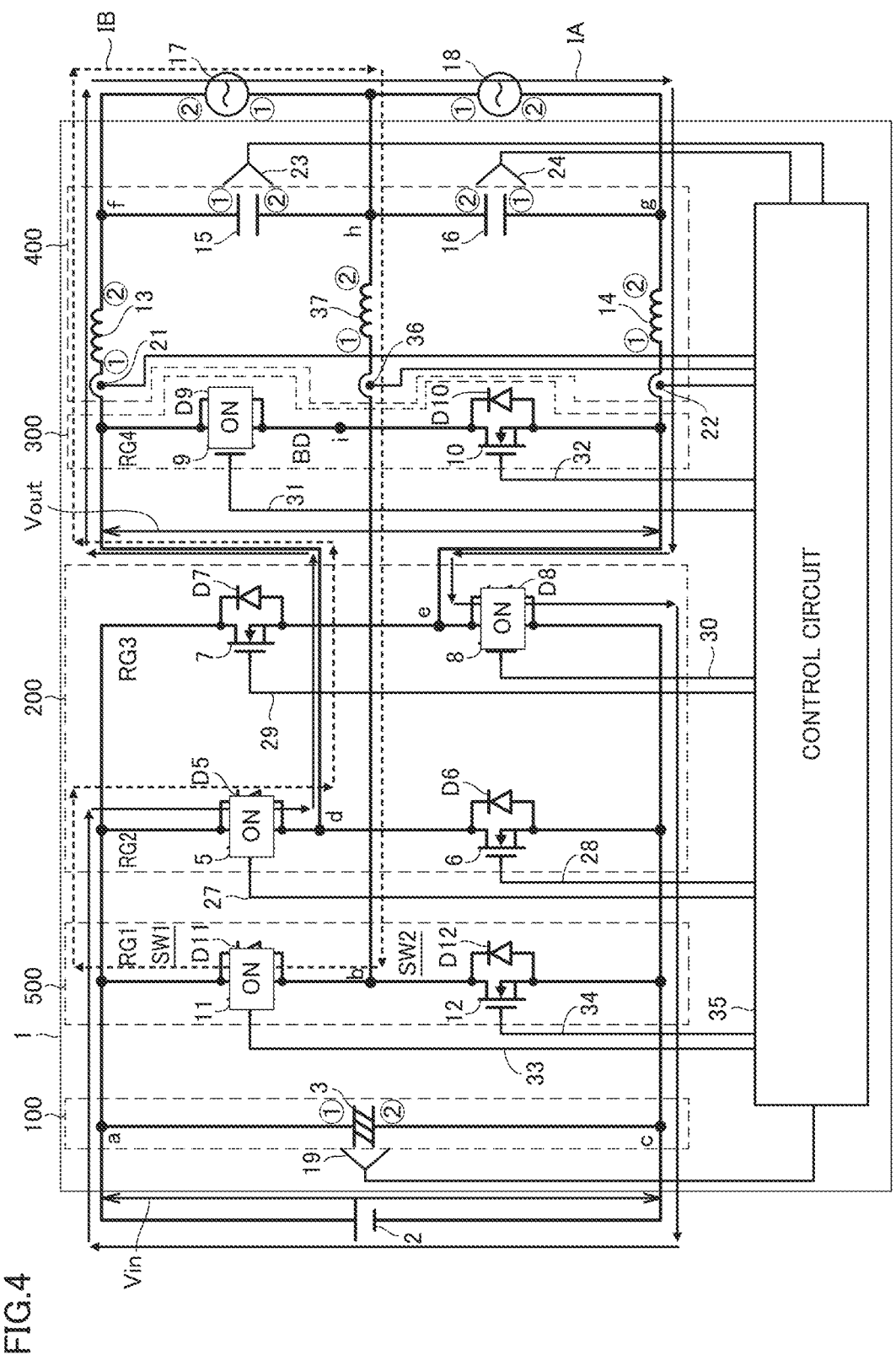
FIG. 4 is a view illustrating a current path at a power transmission period during turn-on of a switching element 11 when an AC voltage is positive, an AC current is positive, and current flowing through an AC power supply 17 is larger than current flowing through an AC power supply 18 in the single-phase three-wire operation.
Figure 5:
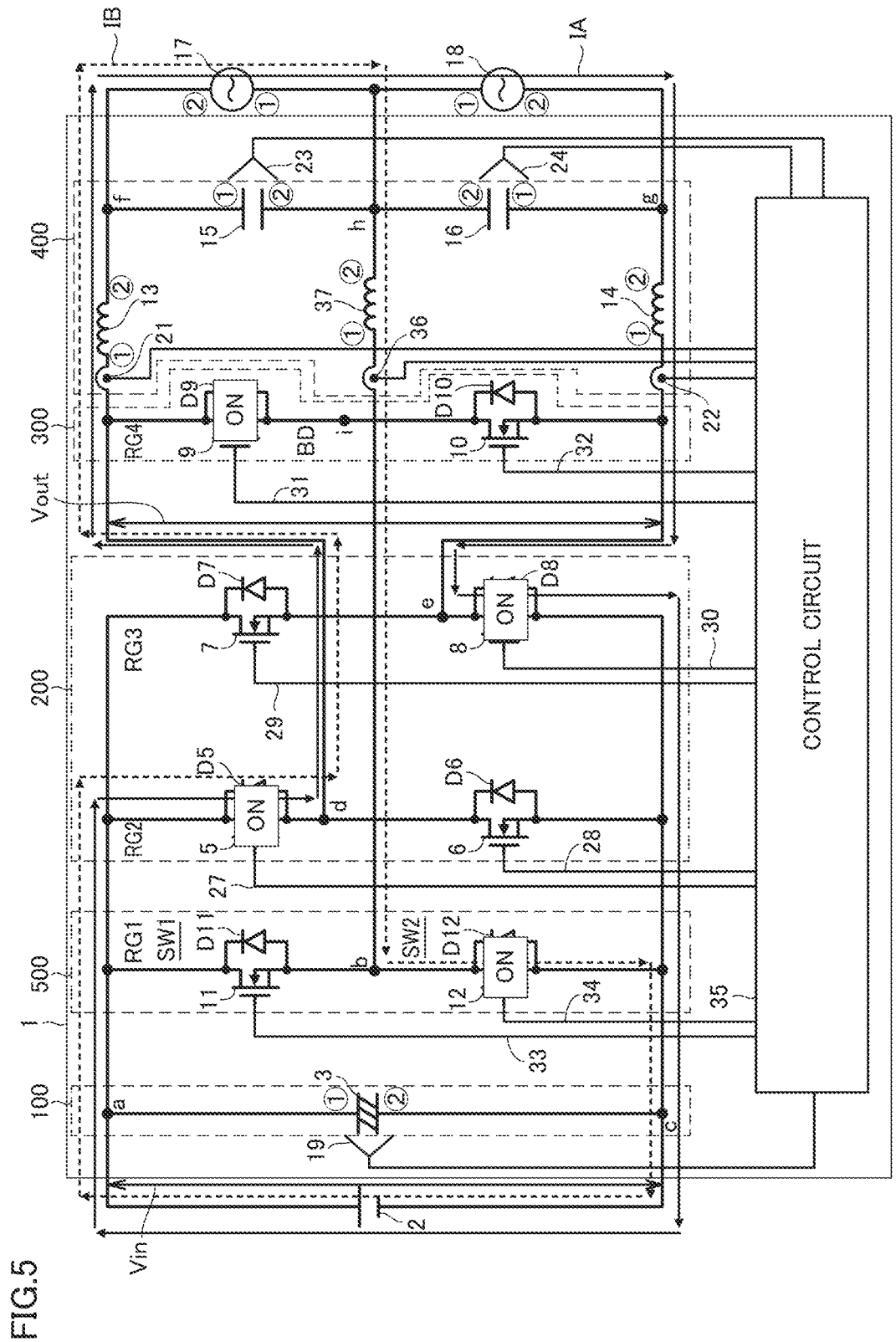
FIG. 5 is a view illustrating a current path at the power transmission period during turn-on of a switching element 12 when the AC voltage is positive, the AC current is positive, and the current flowing through the AC power supply 17 is larger than the current flowing through the AC power supply 18 in the single-phase three-wire operation.
Figure 6:
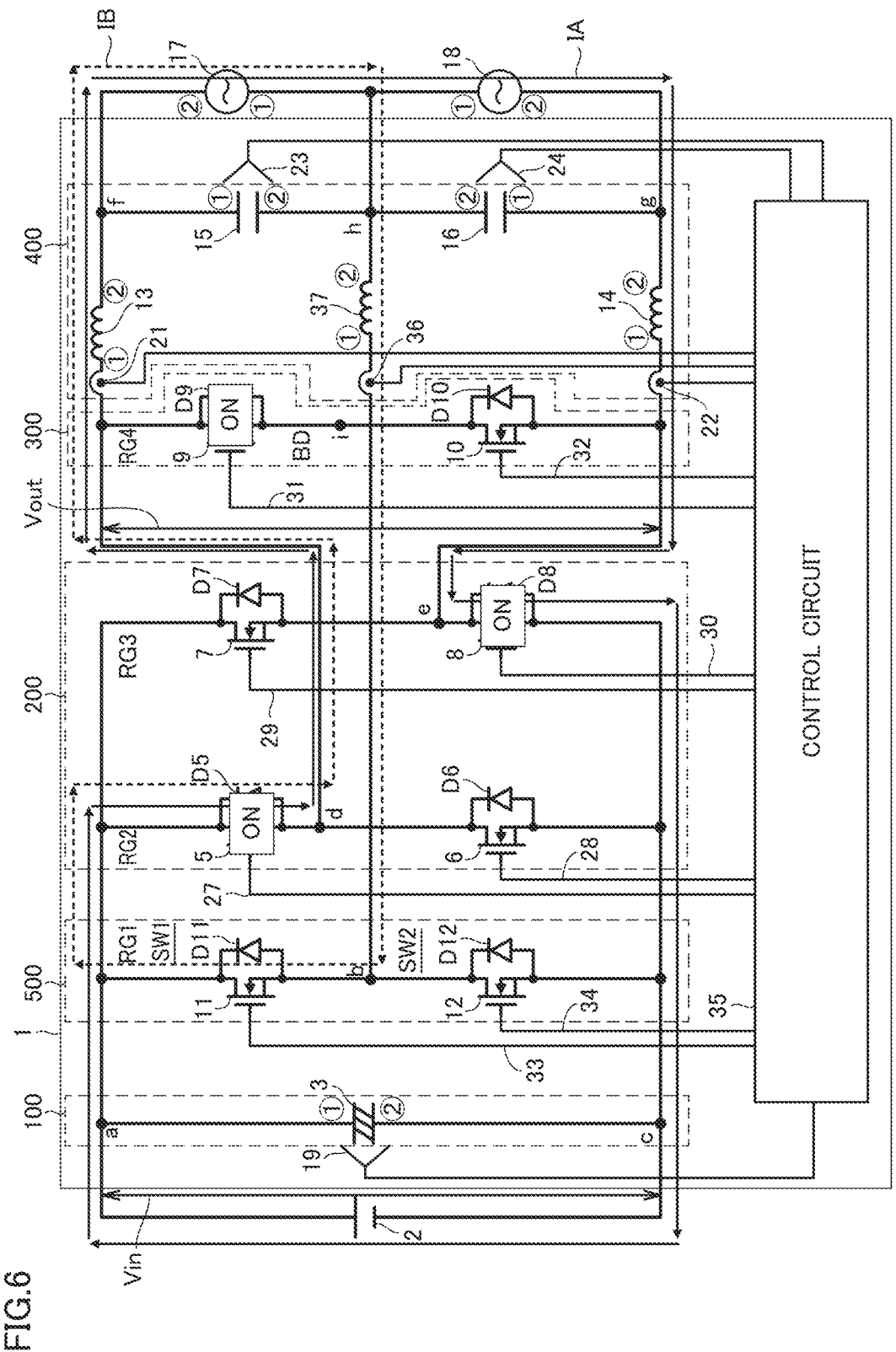
FIG. 6 is a view illustrating a current path at the power transmission period during turn-off of the switching elements 11, 12 when the AC voltage is positive, the AC current is positive, and the current flowing through the AC power supply 17 is larger than the current flowing through the AC power supply 18 in the single-phase three-wire operation.

FIGS. 4, 5, and 6 are views illustrating the current path during the power transmission period when the AC voltage is positive, the AC current is positive, and the current flowing through AC power supply 17 is larger than the current flowing through AC power supply 18 in the single-phase three-wire operation. In the power transmission period, switching elements 5, 8 are turned on by the switching, switching elements 6, 7 are always in the off-state, switching element 9 is always in the on-state, and switching element 10 is turned off by the switching. Switching elements 11, 12 continue switching between on and off by switching. That is, power conversion device 1 is set to the first switching mode.

FIG. 4 illustrates a flow of the current when switching element 11 is on in switching element 11 and switching element 12.

When switching element 11 is on in switching element 11 and switching element 12, current IA flows through DC power supply 2, switching element 5, the reactor 13, AC power supply 17, AC power supply 18, reactor 14, switching element 8, and DC power supply 2 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, AC power supply 17, reactor 37, switching element 11, switching element 5, and reactor 13 in this order. Because current IA flows through the path passing through C power supply 2, the power transmission is performed by current IA. Current IB does not flow through the path passing through DC power supply 2, and current IB flows back.

FIG. 5 illustrates the flow of the current when switching element 12 is on in switching element 11 and switching element 12.

When switching element 11 is on in switching element 12 and switching element 12, current IA flows through DC power supply 2, switching element 5, reactor 13, AC power supply 17, AC power supply 18, reactor 14, switching element 8, and DC power supply 2 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, AC power supply 17, reactor 37, switching element 12, DC power supply 2, switching element 5, and reactor 13 in this order. Because current IA flows through the path passing through DC power supply 2, the power transmission is performed by current IA. Because current IB flows through the path passing through DC power supply 2, the power transmission is also performed by current IB.

FIG. 6 illustrates the flow of the current during a dead time period of switching element 11 and switching element 12 when switching element 11 and switching element 12 are turned off.

When switching element 11 and switching element 12 are off, current IA flows through DC power supply 2, switching element 5, reactor 13, AC power supply 17, AC power supply 18, reactor 14, switching element 8, and DC power supply 2 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, AC power supply 17, reactor 37, diode D11, switching element 5, and reactor 13 in this order. Because current IA flows through the path passing through DC power supply 2, the power transmission is performed by current IA. Current IB does not flow through the path passing through DC power supply 2, and current IB flows back.

(A-1-2) Dead Time Period

Figure 7:
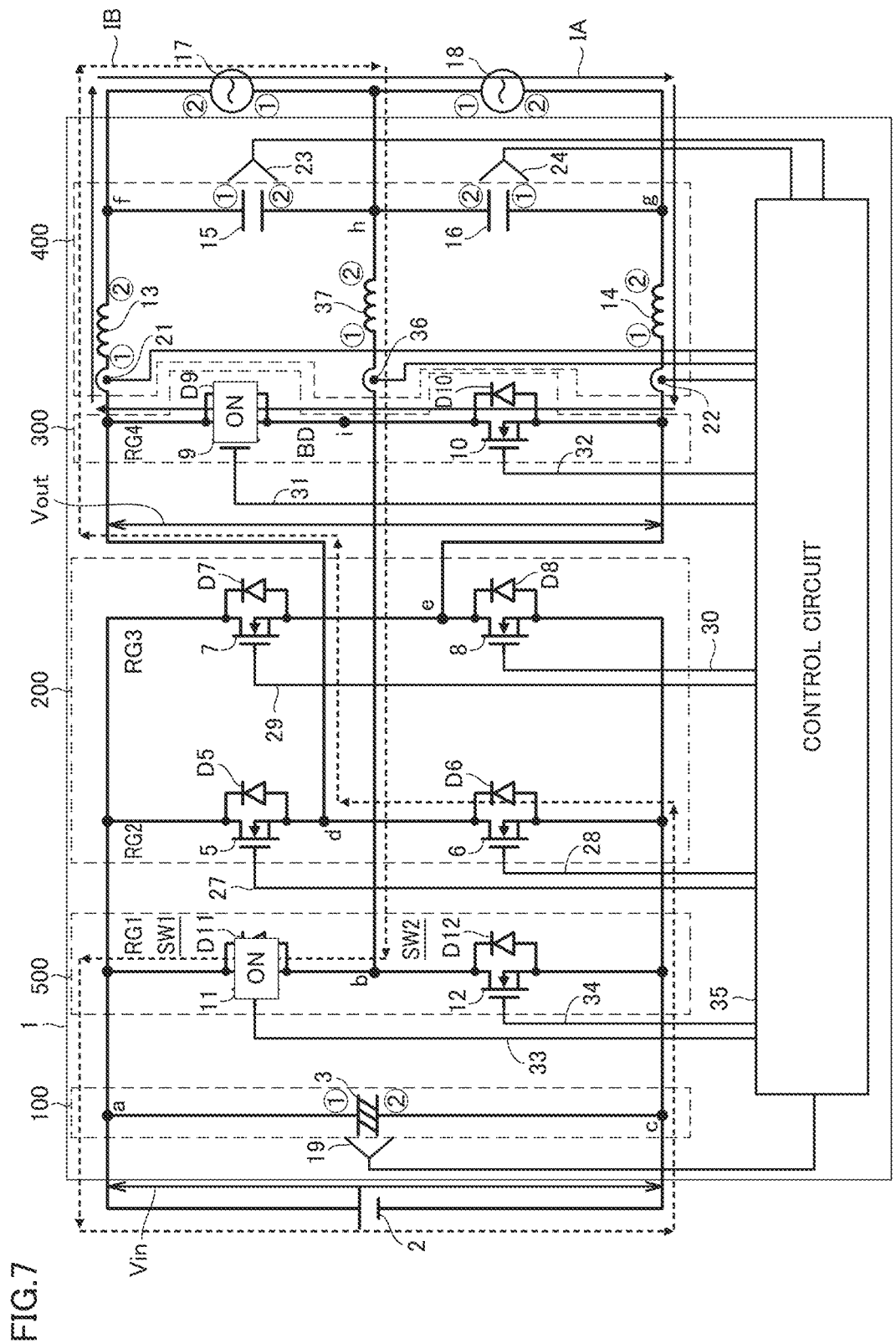
FIG. 7 is a view illustrating a current path at a dead time period during the turn-on of the switching element 11 when the AC voltage is positive, the AC current is positive, and the current flowing through the AC power supply 17 is larger than the current flowing through the AC power supply 18 in the single-phase three-wire operation.
Figure 8:
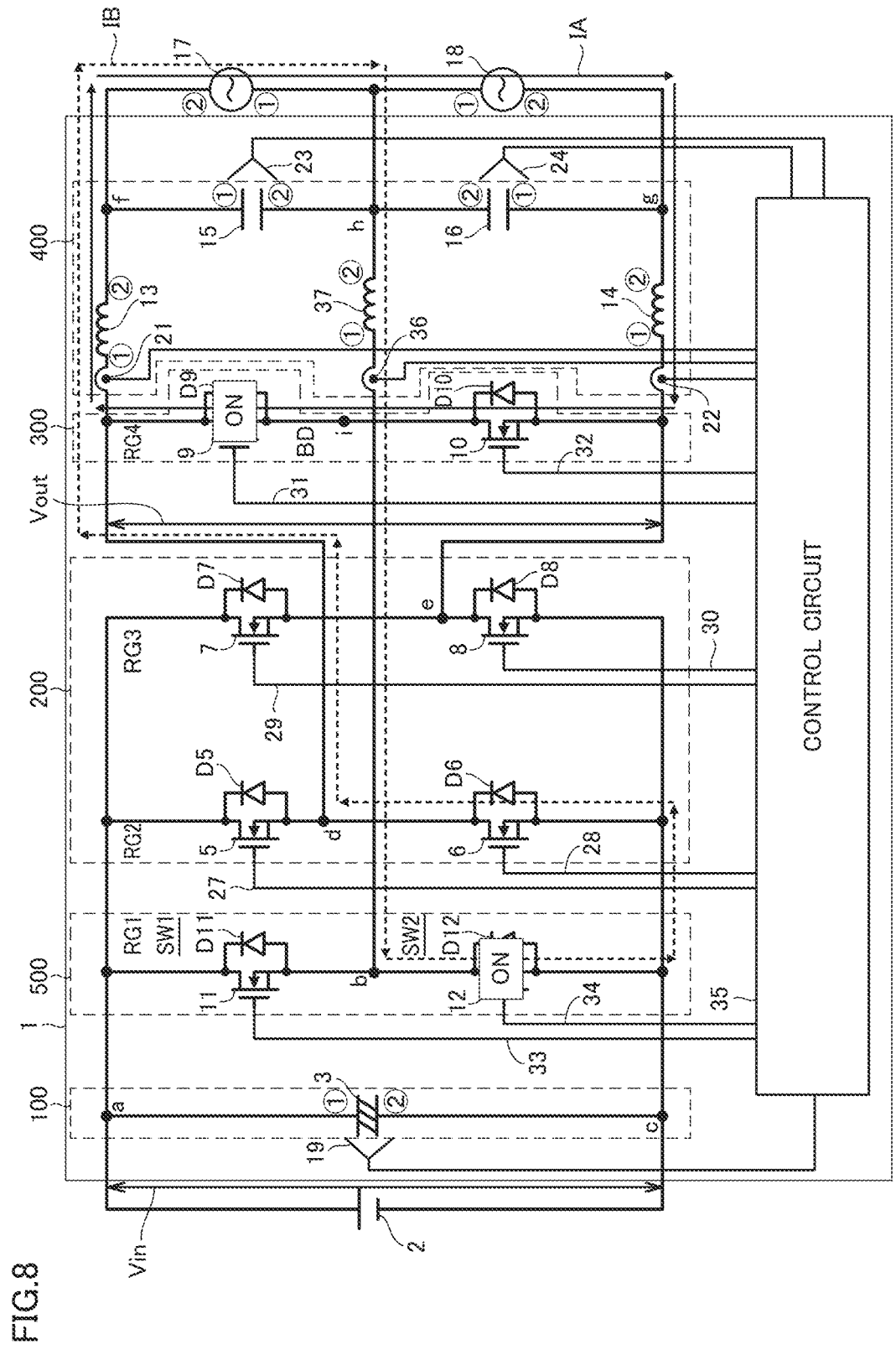
FIG. 8 is a view illustrating a current path at the dead time period during the turn-on of the switching element 12 when the AC voltage is positive, the AC current is positive, and the current flowing through the AC power supply 17 is larger than the current flowing through the AC power supply 18 in the single-phase three-wire operation.
Figure 9:
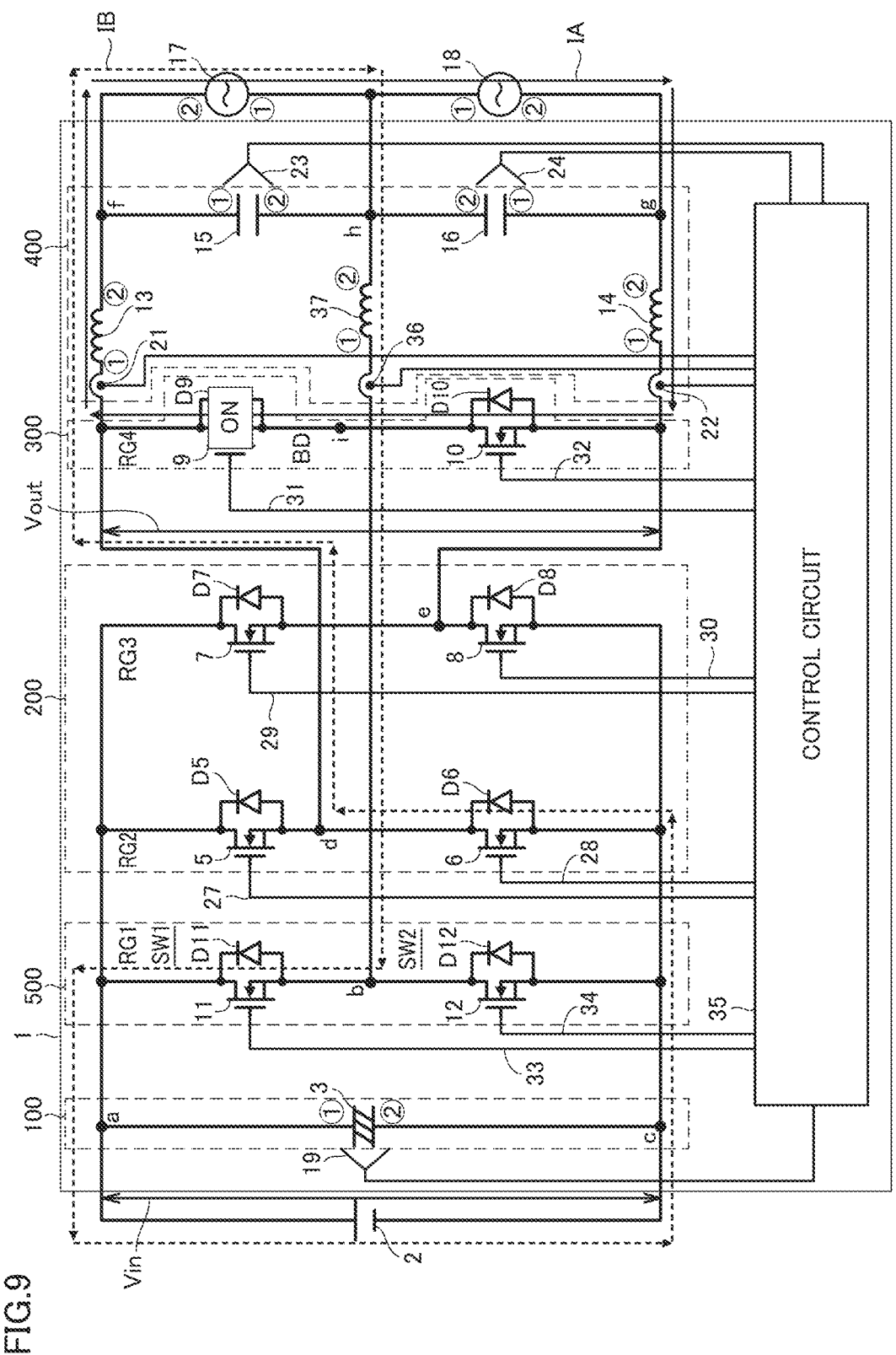
FIG. 9 is a view illustrating a current path at a dead time period during the turn-off of the switching elements 11, 12 when the AC voltage is positive, the AC current is positive, and the current flowing through the AC power supply 17 is larger than the current flowing through the AC power supply 18 in the single-phase three-wire operation.

FIGS. 7, 8, and 9 are views illustrating the current path during the dead time period when the AC voltage is positive, the AC current is positive, and the current flowing through AC power supply 17 is larger than the current flowing through AC power supply 18 in the single-phase three-wire operation. In the dead time period, switching elements 5, 8 are switched from on to off by the switching, switching elements 6, 7 are always in an off-state, switching element 9 is always in the on-state, and switching element 10 is maintained in the off-state. Switching elements 11, 12 continue switching between on and off by switching. That is, power conversion device 1 is set to the first dead time mode.

FIG. 7 illustrates the flow of the current when switching element 11 is on in switching element 11 and switching element 12.

When switching element 11 is on in switching element 11 and switching element 12, current IA flows through reactor 13, AC power supply 17, AC power supply 18, reactor 14, diode D10, switching element 9, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, AC power supply 17, reactor 37, switching element 11, DC power supply 2, diode D6, and reactor 13 in this order. Current IA does not flow through the path passing through DC power supply 2, and current IA flows back. Because the current IB flows through the path passing through DC power supply 2, regeneration is performed by current IB.

FIG. 8 illustrates the flow of the current when switching element 12 is on in switching element 11 and switching element 12.

When switching element 12 is on in switching element 11 and switching element 12, current IA flows through reactor 13, AC power supply 17, AC power supply 18, reactor 14, diode D10, switching element 9, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, AC power supply 17, reactor 37, switching element 12, diode D6, and reactor 13 in this order. Current IA does not flow through the path passing through DC power supply 2, and current IA flows back. Current IB also does not flow through the path passing through DC power supply 2, and current IB flows back.

FIG. 9 illustrates the flow of the current during the dead time period of switching element 11 and switching element 12 when switching element 11 and switching element 12 are turned off.

When switching element 11 and switching element 12 are off, current IA flows through reactor 13, AC power supply 17, AC power supply 18, reactor 14, diode D10, switching element 9, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, AC power supply 17, reactor 37, diode D11, DC power supply 2, diode D6, and reactor 13 in this order. Current IA does not flow through the path passing through DC power supply 2, and current IA flows back. Because the current IB flows through the path passing through DC power supply 2, regeneration is performed by current IB.

(A-1-3) Flow Back Period

Figure 10:
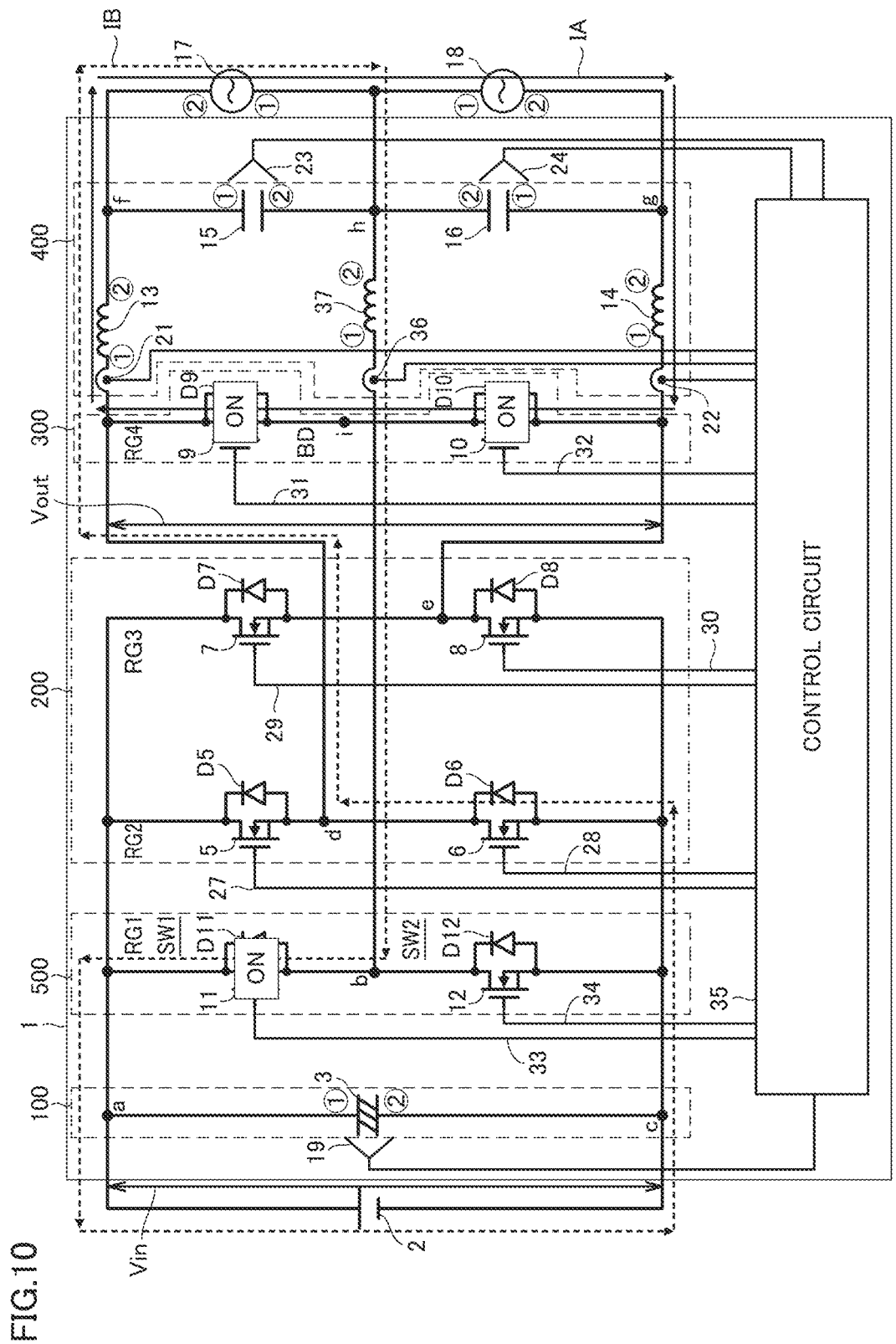
FIG. 10 is a view illustrating a current path at a flow back period during the turn-on of the switching element 11 when the AC voltage is positive, the AC current is positive, and the current flowing through the AC power supply 17 is larger than the current flowing through the AC power supply 18 in the single-phase three-wire operation.
Figure 11:
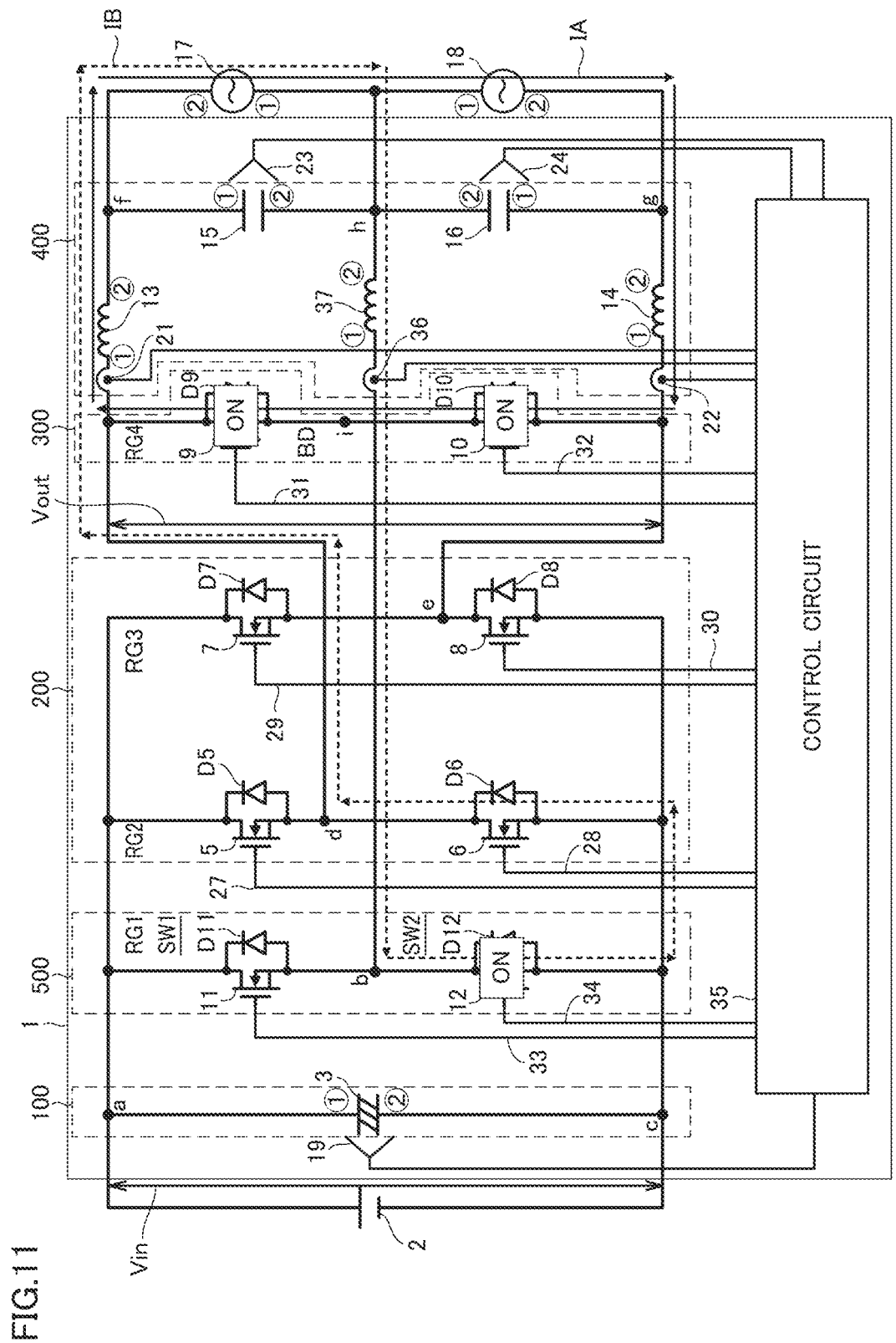
FIG. 11 is a view illustrating a current path at the flow back period during the turn-on of the switching element 12 when the AC voltage is positive, the AC current is positive, and the current flowing through the AC power supply 17 is larger than the current flowing through the AC power supply 18 in the single-phase three-wire operation.
Figure 12:
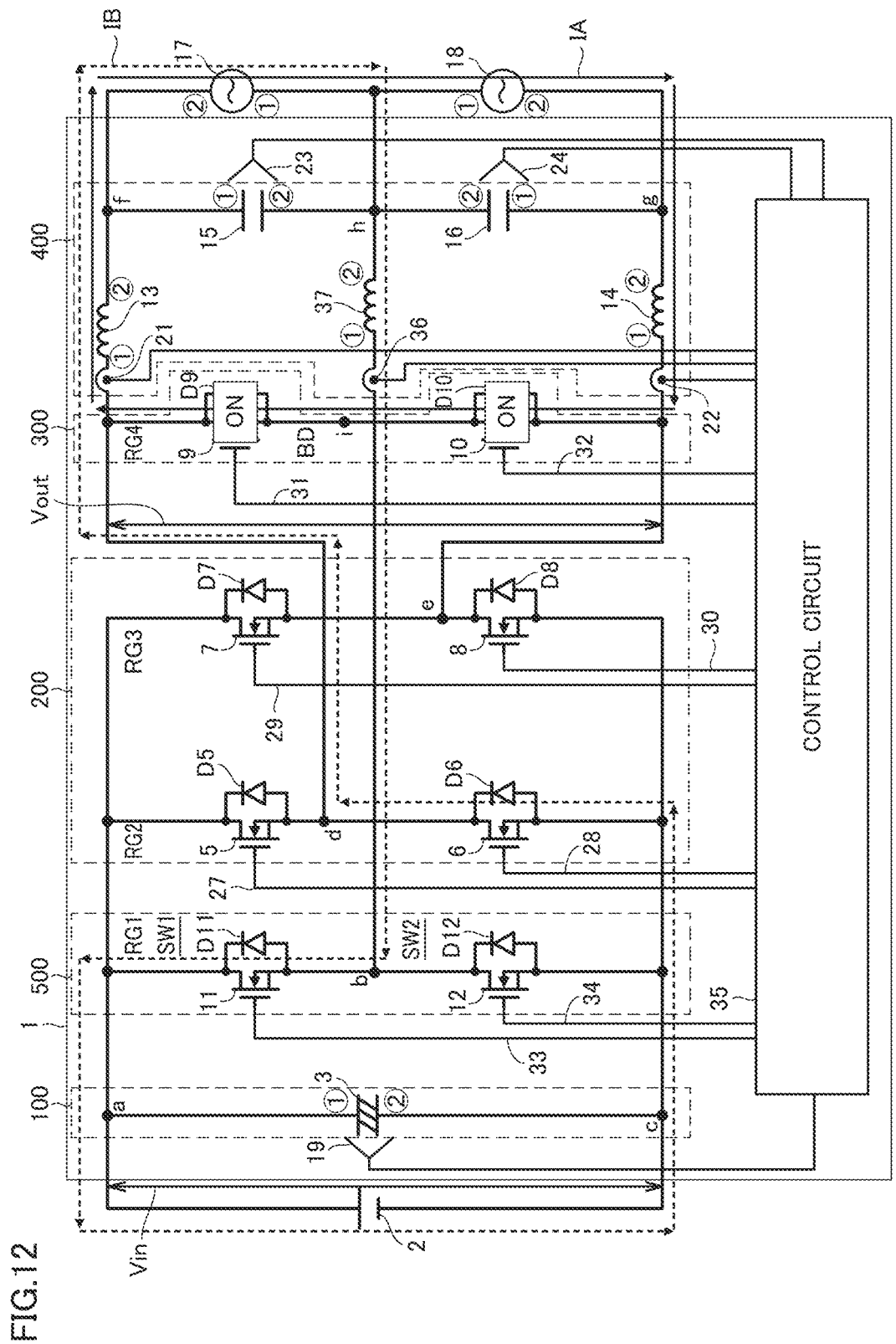
FIG. 12 is a view illustrating a current path at the flow back period during the turn-off of the switching elements 11, 12 when the AC voltage is positive, the AC current is positive, and the current flowing through the AC power supply 17 is larger than the current flowing through the AC power supply 18 in the single-phase three-wire operation.

FIGS. 10, 11, and 12 are views illustrating the current path during the flow back period when the AC voltage is positive, the AC current is positive, and the current flowing through AC power supply 17 is larger than the current flowing through AC power supply 18 in the single-phase three-wire operation. During the flow back period, switching elements 5, 8 are maintained in the off-state, switching elements 6, 7 are always in the off-state, switching element 9 is always in the on-state, and switching element 10 is switched from off to on by the switching operation. Switching elements 11, 12 continue switching between on and off by switching. That is, power conversion device 1 is set to the second switching mode.

FIG. 10 illustrates the flow of the current when switching element 11 is on in switching element 11 and switching element 12.

When switching element 11 is on in switching element 11 and switching element 12, current IA flows through reactor 13, AC power supply 17, AC power supply 18, reactor 14, switching element 10, switching element 9, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, AC power supply 17, reactor 37, switching element 11, DC power supply 2, diode D6, and reactor 13 in this order. Current IA does not flow through the path passing through DC power supply 2, and current IA flows back. Because the current IB flows through the path passing through DC power supply 2, regeneration is performed by current IB.

FIG. 11 illustrates the flow of the current when switching element 12 is on in switching element 11 and switching element 12.

When switching element 12 is on in switching element 11 and switching element 12, current IA flows through reactor 13, AC power supply 17, AC power supply 18, reactor 14, switching element 10, switching element 9, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, AC power supply 17, reactor 37, switching element 12, diode D6, and reactor 13 in this order. Current IA does not flow through the path passing through DC power supply 2, and current IA flows back. Current IB also flows back without flowing through the path passing through DC power supply 2.

FIG. 12 illustrates the flow of the current during the dead time period of switching element 11 and switching element 12 when switching element 11 and switching element 12 are turned off.

When switching element 11 and switching element 12 are off, current IA flows through reactor 13, AC power supply 17, AC power supply 18, reactor 14, switching element 10, switching element 9, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, AC power supply 17, reactor 37, diode D11, DC power supply 2, diode D6, and reactor 13 in this order. Current IA does not flow through the path passing through DC power supply 2, and current IA flows back. Because the current IB flows through the path passing through DC power supply 2, regeneration is performed by current IB.

When the flow back period ends, the processing transitions to the dead time period similar to (A-1-2), and then returns to the power transmission period of (A-1-1).

(A-2) AC Voltage is Negative, AC Current is Negative, Power of AC Power Supply 17>Power of AC Power Supply 18

The operation when the power of AC power supply 17 is larger than the power of AC power supply 18 in the case of the negative AC voltage and the negative AC current will be described. Because the power of AC power supply 17 is larger than the power of AC power supply 18, the current flowing through AC power supply 17 is larger than the current flowing through AC power supply 18.

When the AC voltage is negative, the voltage at the first terminal of capacitor 15 is negative, the voltage at the second terminal of capacitor 15 is positive, the voltage at the second terminal of capacitor 16 is negative, and the voltage at the first terminal of capacitor 16 is positive. When the alternating current is negative, the current flows from the second terminal to the first terminal of reactor 13.

(A-2-1) Power Transmission Period

Figure 13:
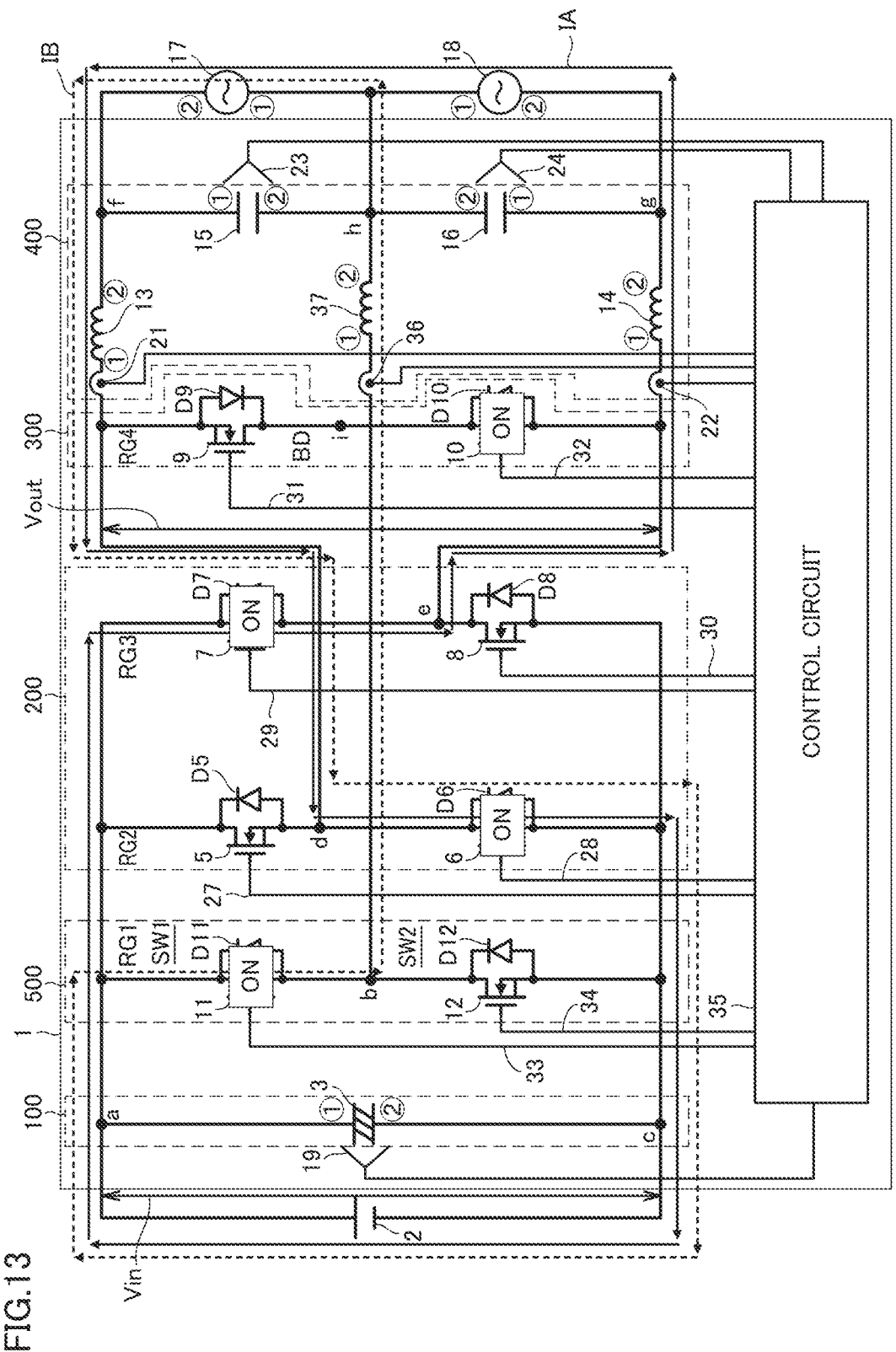
FIG. 13 is a view illustrating a current path at the power transmission period during the turn-on of the switching element 11 when the AC voltage is negative, the AC current is negative, and the current flowing through the AC power supply 17 is larger than the current flowing through the AC power supply 18 in the single-phase three-wire operation.
Figure 14:
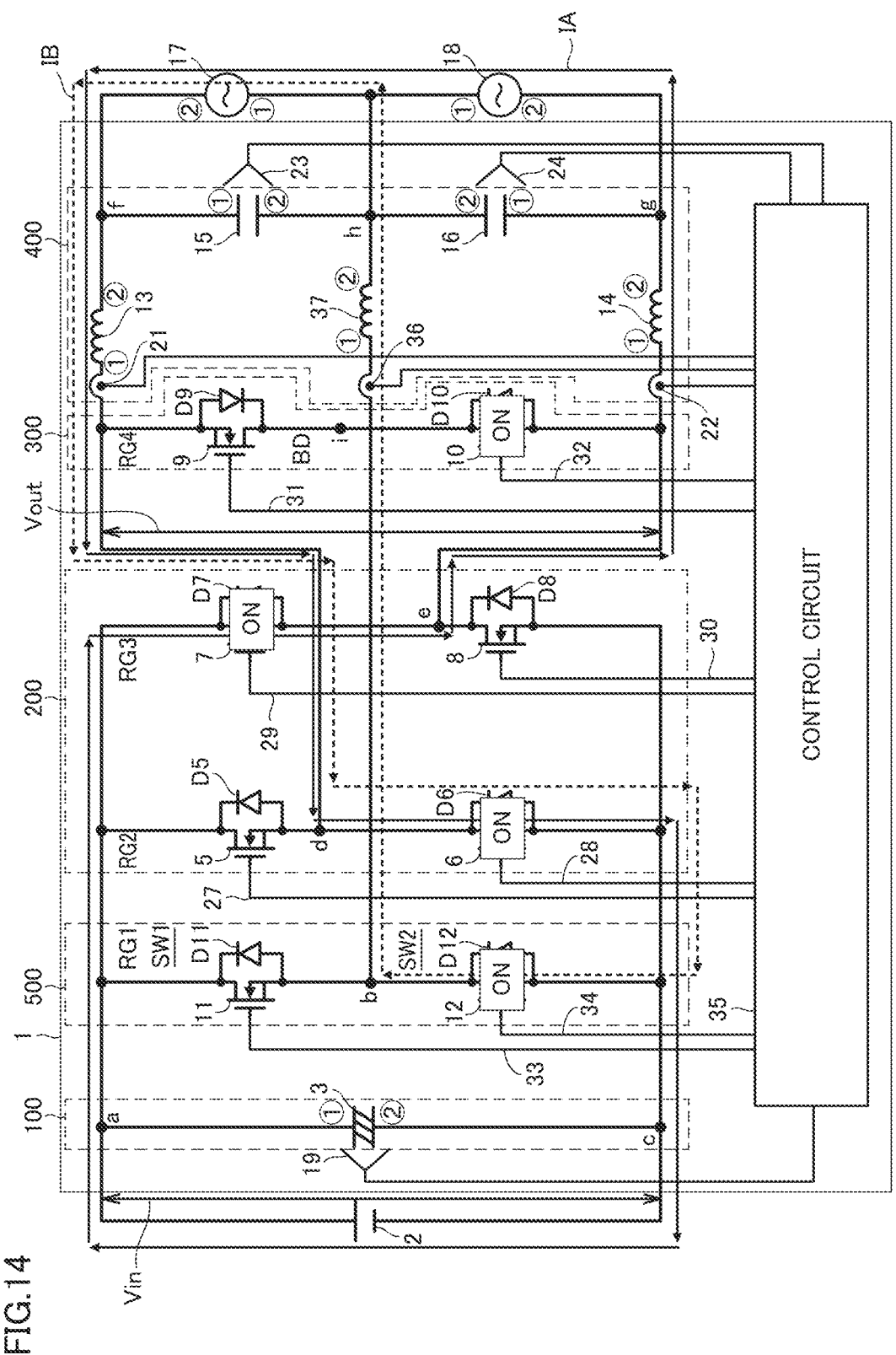
FIG. 14 is a view illustrating a current path at the power transmission period during the turn-on of the switching element 12 when the AC voltage is negative, the AC current is negative, and the current flowing through the AC power supply 17 is larger than the current flowing through the AC power supply 18 in the single-phase three-wire operation.
Figure 15:
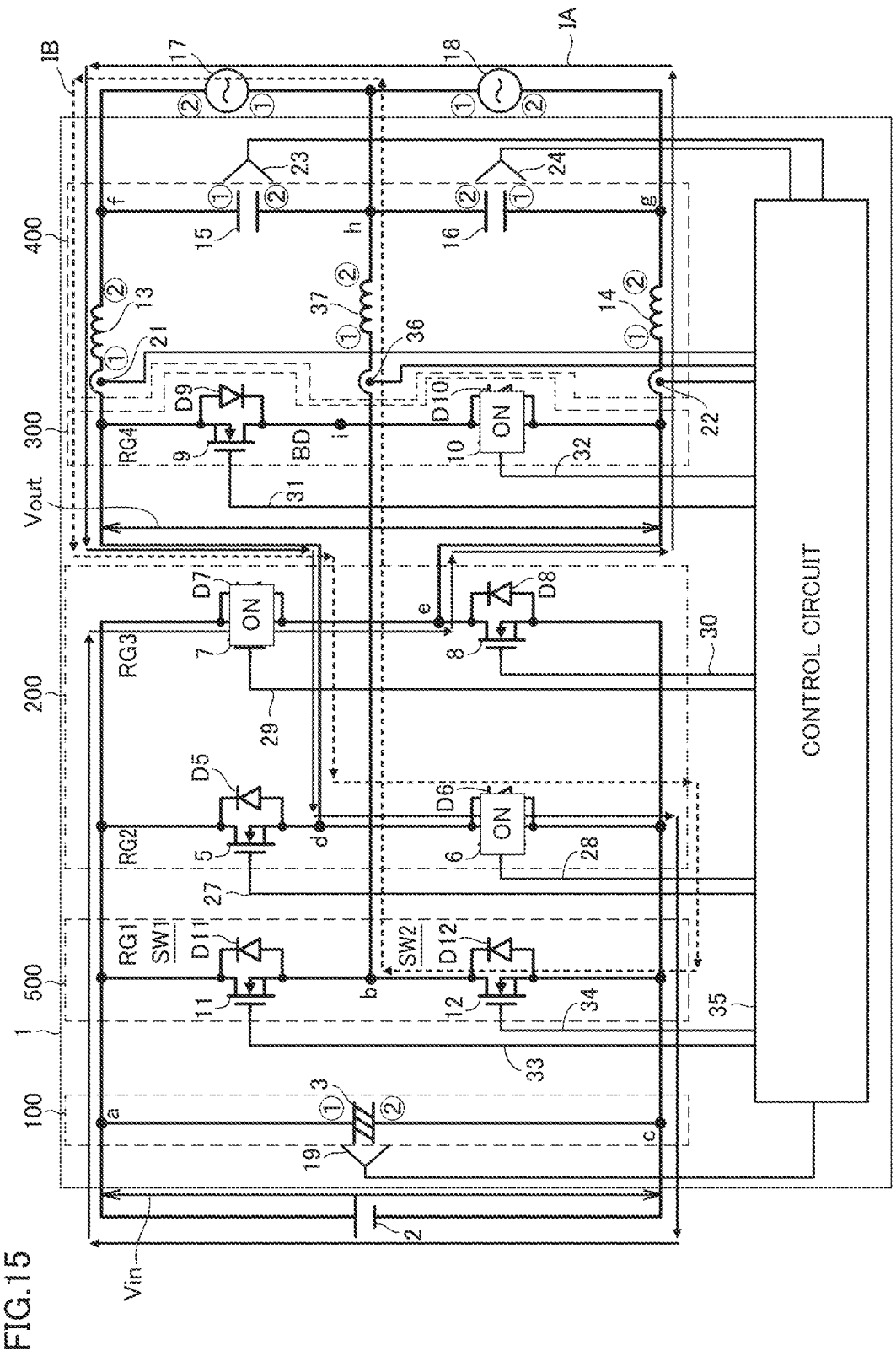
FIG. 15 is a view illustrating a current path at the power transmission period during turn-off of the switching elements 11, 12 when the AC voltage is negative, the AC current is negative, and the current flowing through the AC power supply 17 is larger than the current flowing through the AC power supply 18 in the single-phase three-wire operation.

FIGS. 13, 14, and 15 are views illustrating the current path during the power transmission period when the AC voltage is negative, the AC current is negative, and the current flowing through AC power supply 17 is larger than the current flowing through AC power supply 18 in the single-phase three-wire operation. In the power transmission period, switching elements 6, 7 are turned on by the switching, switching elements 5, 8 are always in the off-state, switching element 10 is always in the on-state, and switching element 9 is turned off by the switching. Switching elements 11, 12 continue switching between on and off by switching. That is, power conversion device 1 is set to the third switching mode.

FIG. 13 illustrates the flow of the current when switching element 11 is on in switching element 11 and switching element 12.

When switching element 11 is on in switching element 11 and switching element 12, current IA flows through DC power supply 2, switching element 7, reactor 14, AC power supply 18, AC power supply 17, reactor 13, switching element 6, and DC power supply 2 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, switching element 6, DC power supply 2, switching element 11, reactor 37, AC power supply 17, and reactor 13 in this order. Because current IA flows through the path passing through DC power supply 2, the power transmission is performed by current IA. Because current IB also flows through the path passing through DC power supply 2, the power transmission is performed by current IB.

FIG. 14 illustrates the flow of the current when switching element 12 is on in switching element 11 and switching element 12.

When switching element 12 is on in switching element 11 and switching element 12 is on, current IA flows through DC power supply 2, switching element 7, reactor 14, AC power supply 18, AC power supply 17, reactor 13, switching element 6, and DC power supply 2 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, switching element 6, switching element 12, reactor 37, AC power supply 17, and reactor 13 in this order. Because current IA flows through the path passing through DC power supply 2, the power transmission is performed by current IA. Current IB does not flow through the path passing through DC power supply 2, and current IB flows back.

FIG. 15 illustrates the flow of the current during the dead time period of switching element 11 and switching element 12 when switching element 11 and switching element 12 are turned off.

When switching element 11 and switching element 12 are off, current IA flows through DC power supply 2, switching element 7, reactor 14, AC power supply 18, AC power supply 17, reactor 13, switching element 6, and DC power supply 2 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, switching element 6, diode D12, reactor 37, AC power supply 17, and reactor 13 in this order. Because current IA flows through the path passing through DC power supply 2, the power transmission is performed by current IA. Current IB does not flow through the path passing through DC power supply 2, and current IB flows back.

(A-2-2) Dead Time Period

Figure 16:
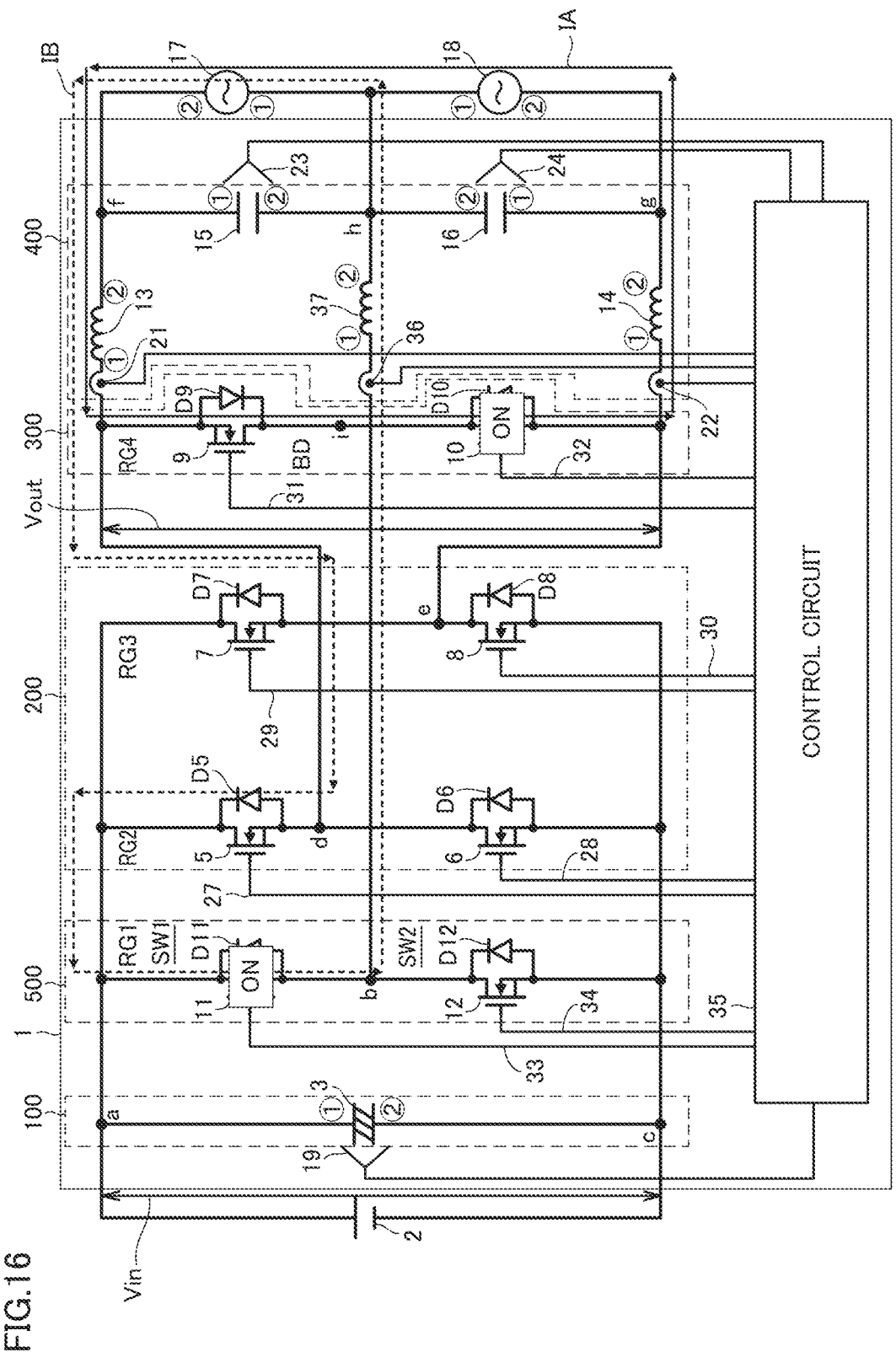
FIG. 16 is a view illustrating a current path at the dead time period during the turn-on of the switching element 11 when the AC voltage is negative, the AC current is negative, and the current flowing through the AC power supply 17 is larger than the current flowing through the AC power supply 18 in the single-phase three-wire operation.
Figure 17:
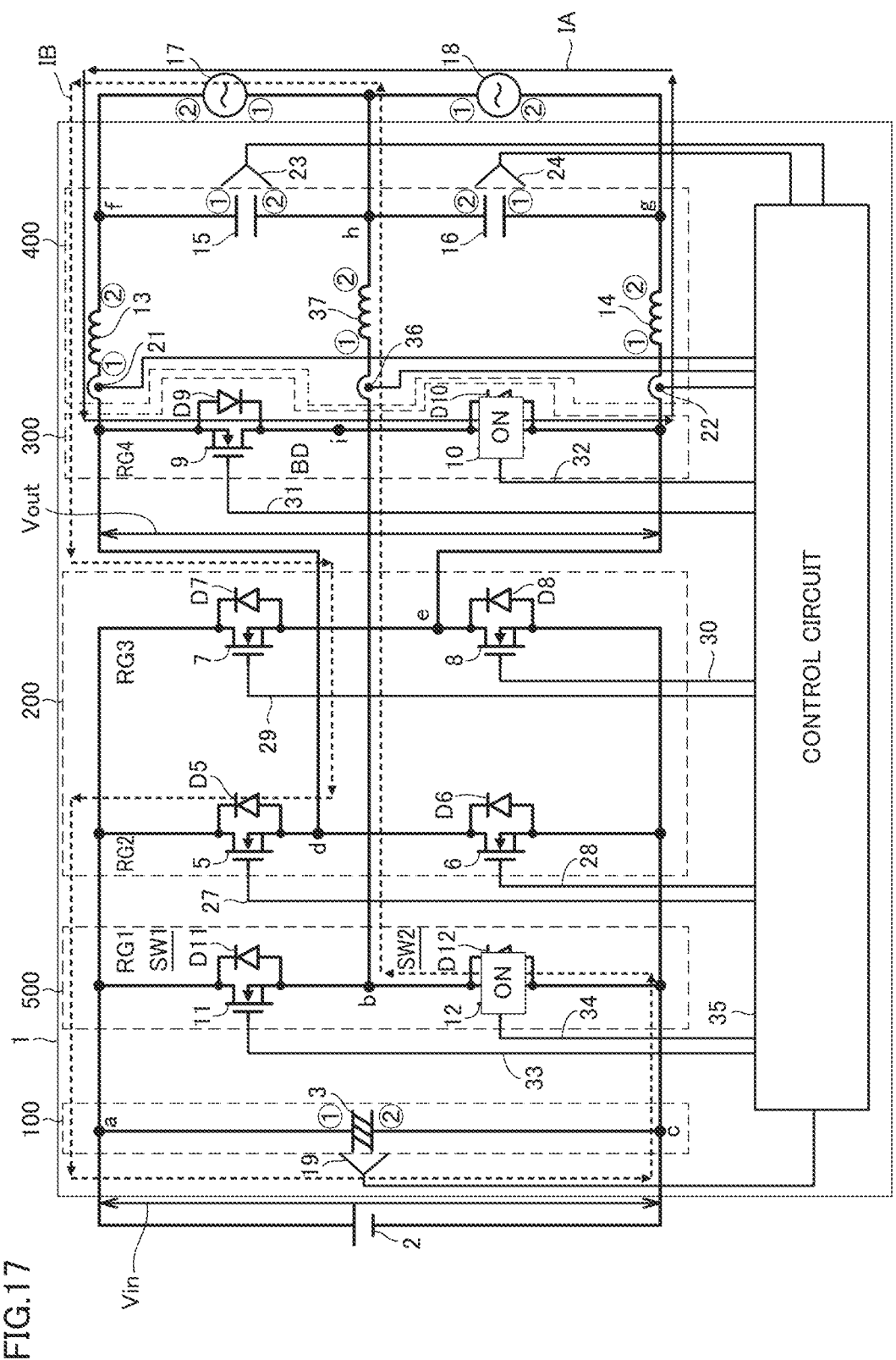
FIG. 17 is a view illustrating a current path at the dead time period during the turn-on of the switching element 12 when the AC voltage is negative, the AC current is negative, and the current flowing through the AC power supply 17 is larger than the current flowing through the AC power supply 18 in the single-phase three-wire operation.
Figure 18:
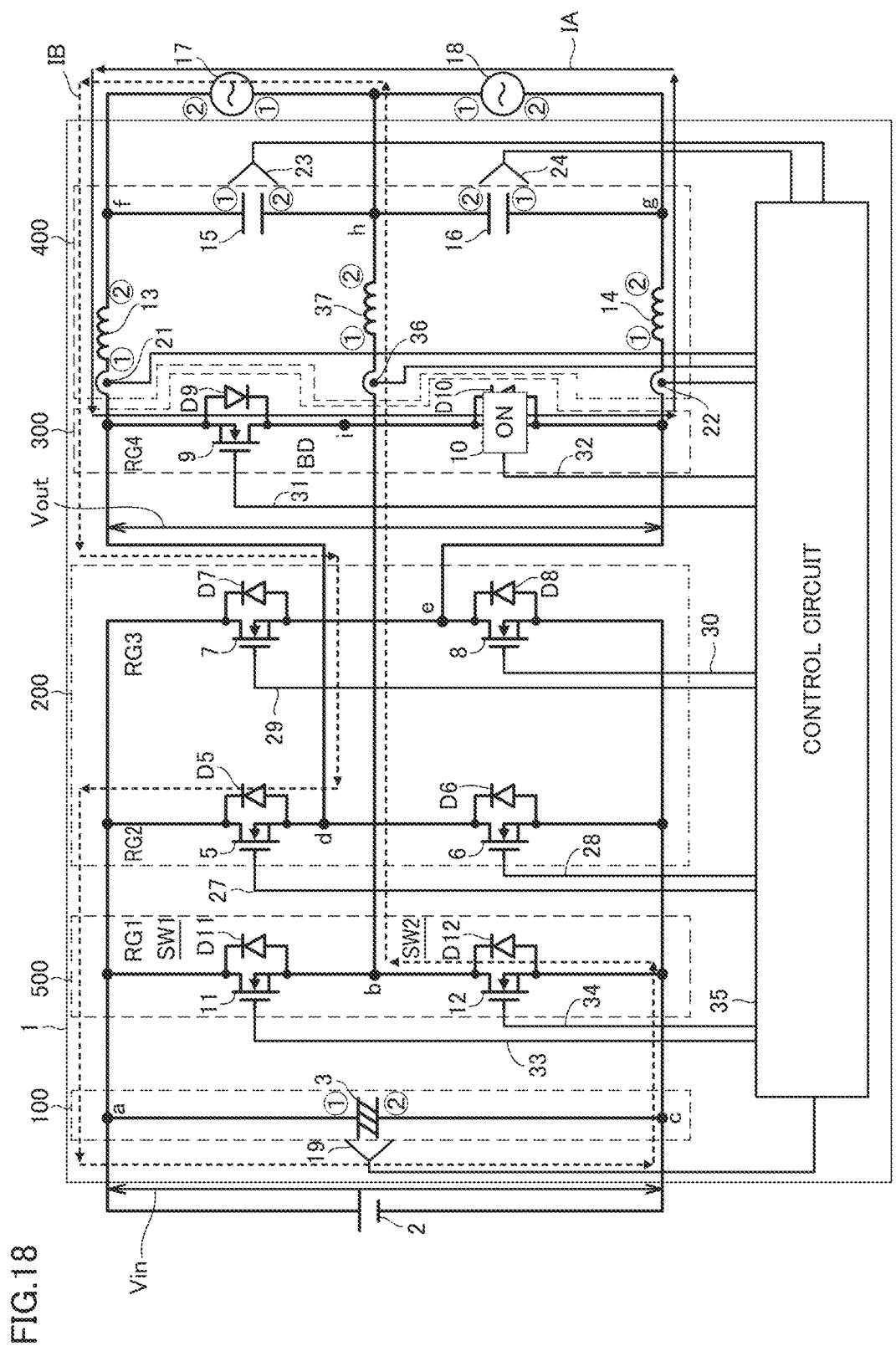
FIG. 18 is a view illustrating a current path at the dead time period during the turn-off of the switching elements 11, 12 when the AC voltage is negative, the AC current is negative, and the current flowing through the AC power supply 17 is larger than the current flowing through the AC power supply 18 in the single-phase three-wire operation.

FIGS. 16, 17, and 18 are views illustrating the current path during the dead time period when the AC voltage is negative, the AC current is negative, and the current flowing through AC power supply 17 is larger than the current flowing through AC power supply 18 in the single-phase three-wire operation. In the dead time period, switching elements 6, 7 are switched from on to off by the switching, switching elements 5, 8 are always in the off-state, switching element 10 is always in the on-state, and switching element 9 is maintained in the off-state. Switching elements 11, 12 continue switching between on and off by switching. That is, power conversion device 1 is set to the second dead time mode.

FIG. 16 illustrates the flow of the current when switching element 11 is on in switching element 11 and switching element 12.

When switching element 11 is on in switching element 11 and switching element 12, current IA flows through reactor 13, diode D9, switching element 10, reactor 14, AC power supply 18, AC power supply 17, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, diode D5, switching element 11, reactor 37, AC power supply 17, and reactor 13 in this order. Current IA does not flow through the path passing through DC power supply 2, and current IA flows back. Current IB also flows back without flowing through the path passing through DC power supply 2.

FIG. 17 illustrates the flow of the current when switching element 12 is on in switching element 11 and switching element 12.

When switching element 12 is on in switching element 11 and switching element 12, current IA flows through reactor 13, diode D9, switching element 10, reactor 14, AC power supply 18, AC power supply 17, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, diode D5, DC power supply 2, switching element 12, reactor 37, AC power supply 17, and reactor 13 in this order. Current IA does not flow through the path passing through DC power supply 2, and current IA flows back. Because the current IB flows through the path passing through DC power supply 2, regeneration is performed by current IB.

FIG. 18 illustrates the flow of the current during the dead time period of switching element 11 and switching element 12 when switching element 11 and switching element 12 are turned off.

When switching element 11 and switching element 12 are off, current IA flows through reactor 13, diode D9, switching element 10, reactor 14, AC power supply 18, AC power supply 17, and reactor 13 in this order. Furthermore, because the current flowing through AC power supply 17 is larger than the current flowing through AC power supply 18, current IB obtained by subtracting the current flowing through the AC power supply 18 from the current flowing through the AC power supply 17 flows through reactor 13, diode D5, DC power supply 2, diode D12, reactor 37, AC power supply 17, and reactor 13 in this order. Current IA does not flow through the path passing through DC power supply 2, and current IA flows back. Because the current IB flows through the path passing through DC power supply 2, regeneration is performed by current IB.

(A-2-3) Flow Back Period

Figure 19:
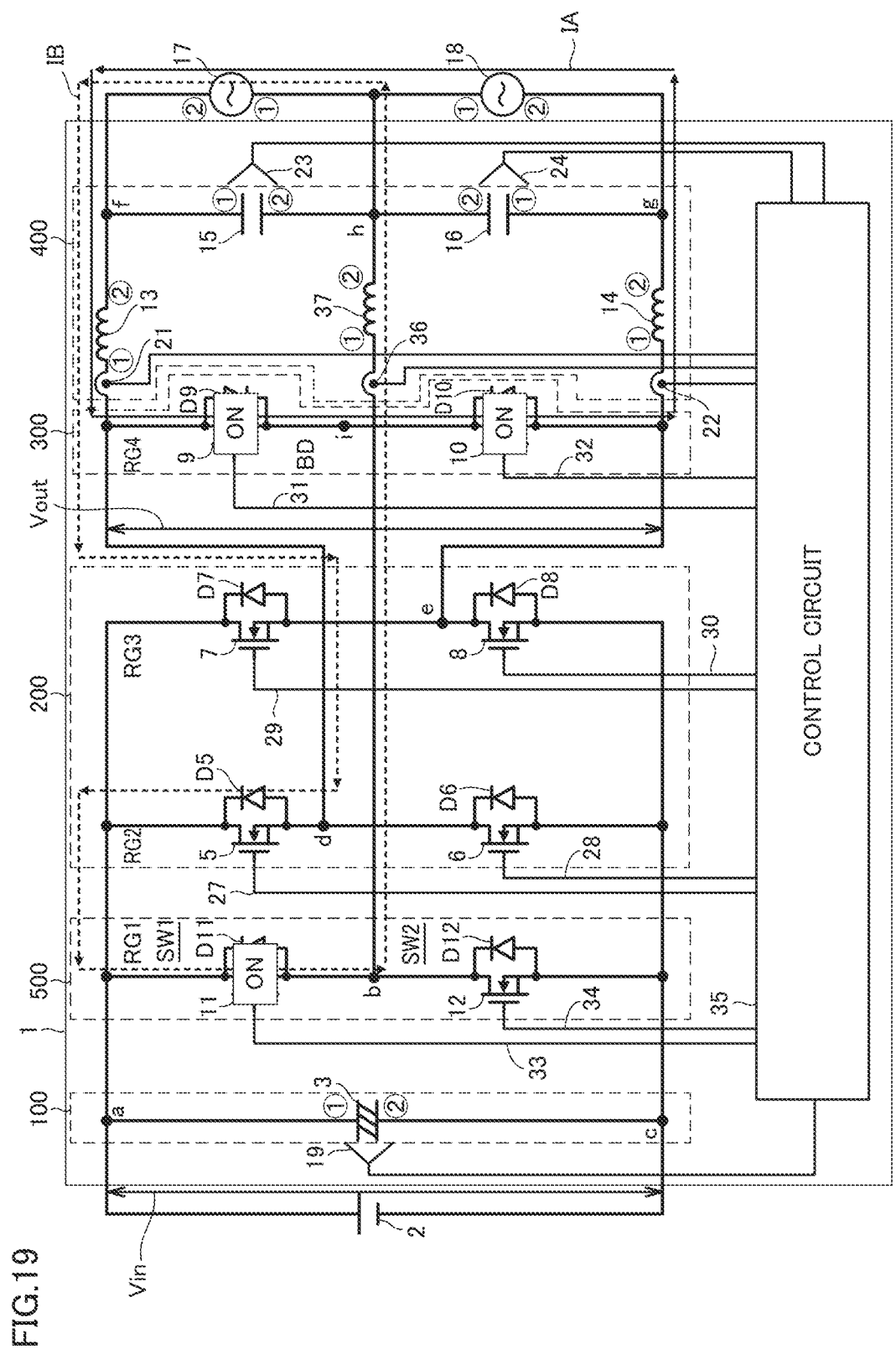
FIG. 19 is a view illustrating a current path at the flow back period during the turn-on of the switching element 11 when the AC voltage is negative, the AC current is negative, and the current flowing through the AC power supply 17 is larger than the current flowing through the AC power supply 18 in the single-phase three-wire operation.
Figure 20:
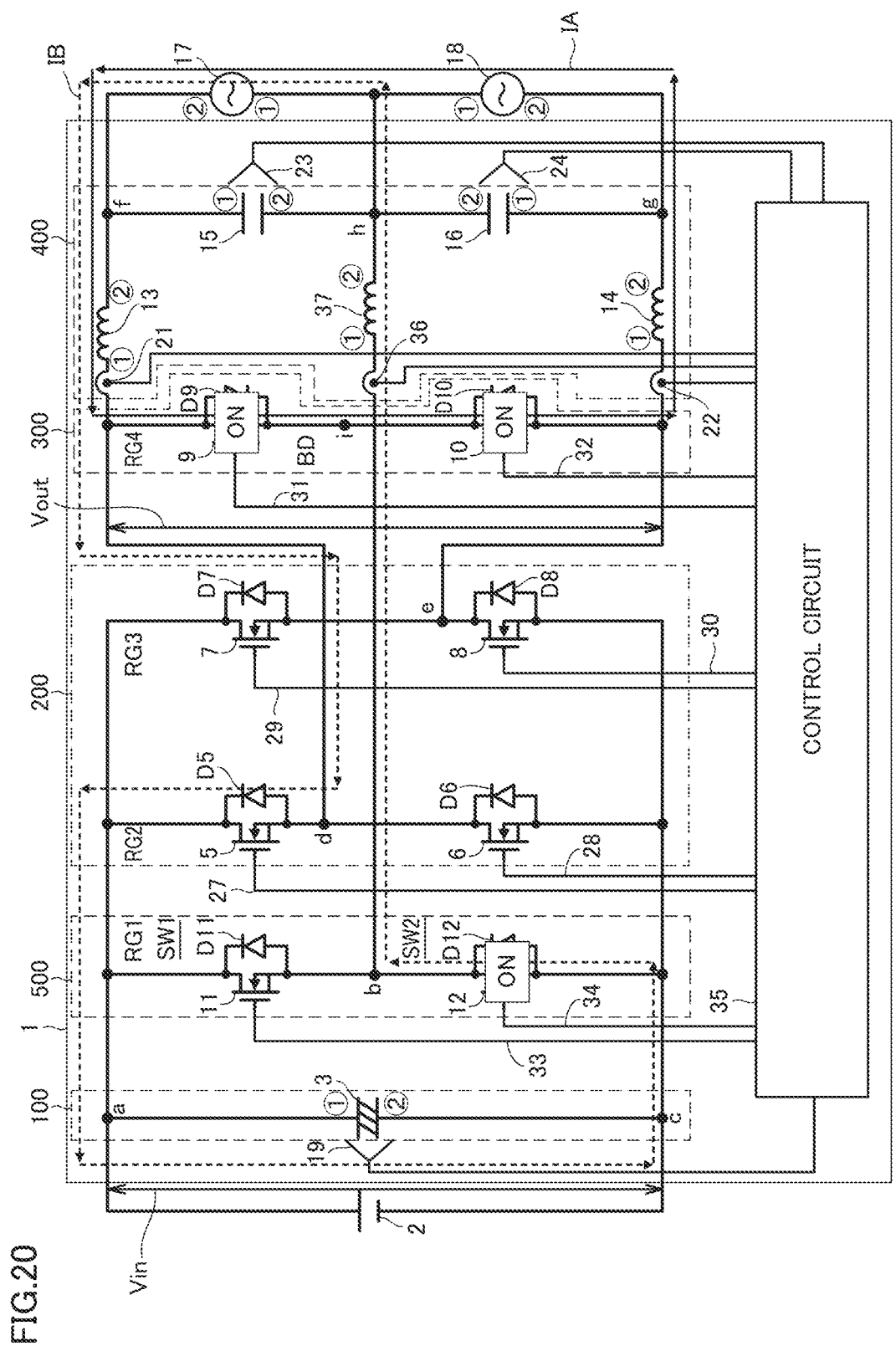
FIG. 20 is a view illustrating a current path at the flow back period during the turn-on of the switching element 12 when the AC voltage is negative, the AC current is negative, and the current flowing through the AC power supply 17 is larger than the current flowing through the AC power supply 18 in the single-phase three-wire operation.
Figure 21:
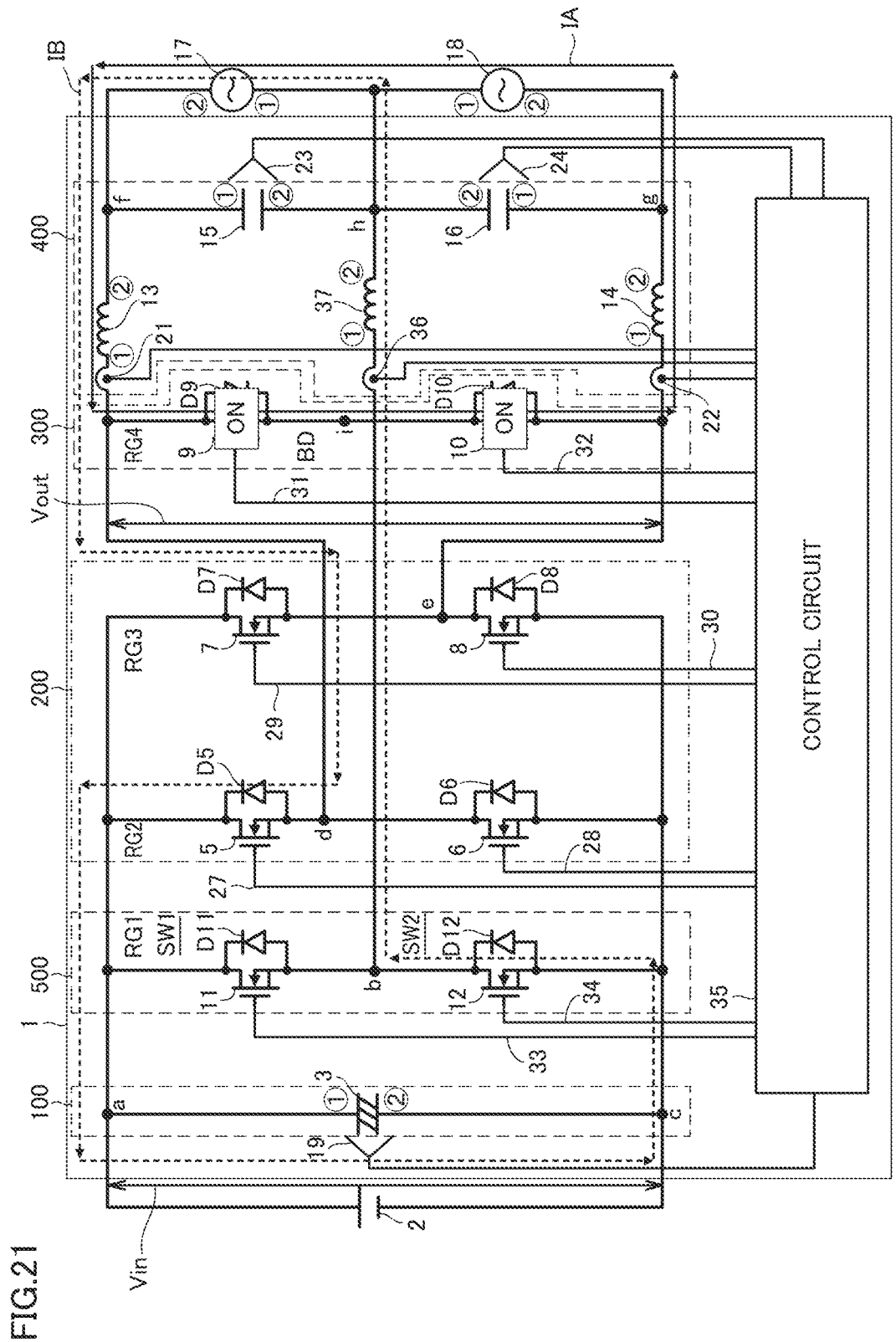
FIG. 21 is a view illustrating a current path at the flow back period during the turn-off of the switching elements 11, 12 when the AC voltage is negative, the AC current is negative, and the current flowing through the AC power supply 17 is larger than the current flowing through the AC power supply 18 in the single-phase three-wire operation.

FIGS. 19, 20, and 21 are views illustrating the current path during the flow back period when the AC voltage is negative, the AC current is negative, and the current flowing through AC power supply 17 is larger than the current flowing through AC power supply 18 in the single-phase three-wire operation. During the flow back period, switching elements 6, 7 are maintained in the off-state, switching elements 5, 8 are always in the off-state, switching element 10 is always in the on-state, and switching element 9 is switched from off to on by the switching operation. Switching elements 11, 12 continue switching between on and off by switching. That is, power conversion device 1 is set to the second switching mode.

FIG. 19 illustrates the flow of the current when switching element 11 is on in switching element 11 and switching element 12.

When switching element 11 is on in switching element 11 and switching element 12, current IA flows through reactor 13, switching element 9, switching element 10, reactor 14, AC power supply 18, AC power supply 17, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, diode D5, switching element 11, reactor 37, AC power supply 17, and reactor 13 in this order. Current IA does not flow through the path passing through DC power supply 2, and current IA flows back. Current IB also flows back without flowing through the path passing through DC power supply 2.

FIG. 20 illustrates the flow of the current when switching element 12 is on in switching element 11 and switching element 12.

When switching element 12 is on in switching element 11 and switching element 12, current IA flows through reactor 13, switching element 9, switching element 10, reactor 14, AC power supply 18, AC power supply 17, and reactor 13 in this order. Furthermore, because the current flowing through AC power supply 17 is larger than the current flowing through AC power supply 18, current IB obtained by subtracting the current flowing through AC power supply 18 from the current flowing through AC power supply 17 flows through reactor 13, diode D5, DC power supply 2, switching element 12, reactor 37, AC power supply 17, and reactor 13 in this order. Current IA does not flow through the path passing through DC power supply 2, and current IA flows back. Because the current IB flows through the path passing through DC power supply 2, regeneration is performed by current IB.

FIG. 21 illustrates the flow of the current during the dead time period of switching element 11 and switching element 12 when switching element 11 and switching element 12 are turned off.

When switching element 11 and switching element 12 are off, current IA flows through reactor 13, switching element 9, switching element 10, reactor 14, AC power supply 18, AC power supply 17, and reactor 13 in this order. Furthermore, because the current flowing through AC power supply 17 is larger than the current flowing through AC power supply 18, current IB obtained by subtracting the current flowing through the AC power supply 18 from the current flowing through the AC power supply 17 flows through reactor 13, diode D5, DC power supply 2, diode D12, reactor 37, AC power supply 17, and reactor 13 in this order. Current IA does not flow through the path passing through DC power supply 2, and current IA flows back. Because the current IB flows through the path passing through DC power supply 2, regeneration is performed by current IB.

When the flow back period ends, the processing transitions to the dead time period similar to (A-2-2), and then returns to the power transmission period of (A-2-1).

(A-3) AC Voltage is Positive, AC Current is Positive, Power of AC Power Supply 17<Power of AC Power Supply 18

The operation when the power of AC power supply 17 is smaller than the power of AC power supply 18 in the case of the positive AC voltage and the positive AC current will be described. Because the power of AC power supply 17 is smaller than the power of AC power supply 18, the current flowing through AC power supply 17 is smaller than the current flowing through AC power supply 18.

When the AC voltage is positive, the voltage at the first terminal of capacitor 15 is positive, the voltage at the second terminal of capacitor 15 is negative, the voltage at the second terminal of capacitor 16 is positive, and the voltage at the first terminal of capacitor 16 is negative.

When the alternating current is positive, the current flows from the first terminal to the second terminal of reactor 13. At this point, switching elements 5, 8, 10 perform switching operations, switching elements 6, 7 are always in the off-state, and switching element 9 is always in the on-state.

(A-3-1) Power Transmission Period

Figure 22:
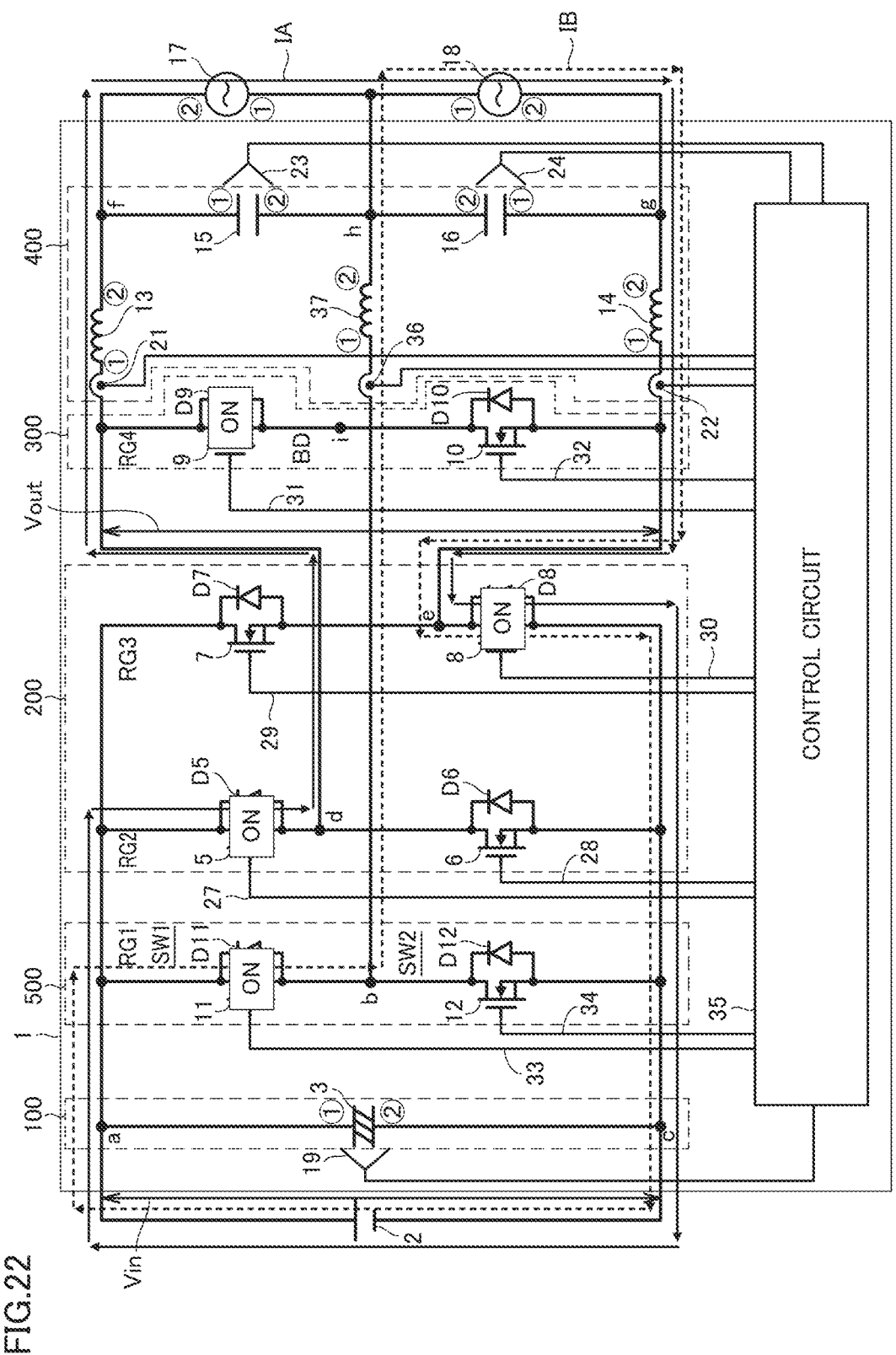
FIG. 22 is a view illustrating a current path at the power transmission period during turn-on of the switching element 11 when the AC voltage is positive, the AC current is positive, and the current flowing through the AC power supply 17 is smaller than the current flowing through the AC power supply 18 in the single-phase three-wire operation.
Figure 23:
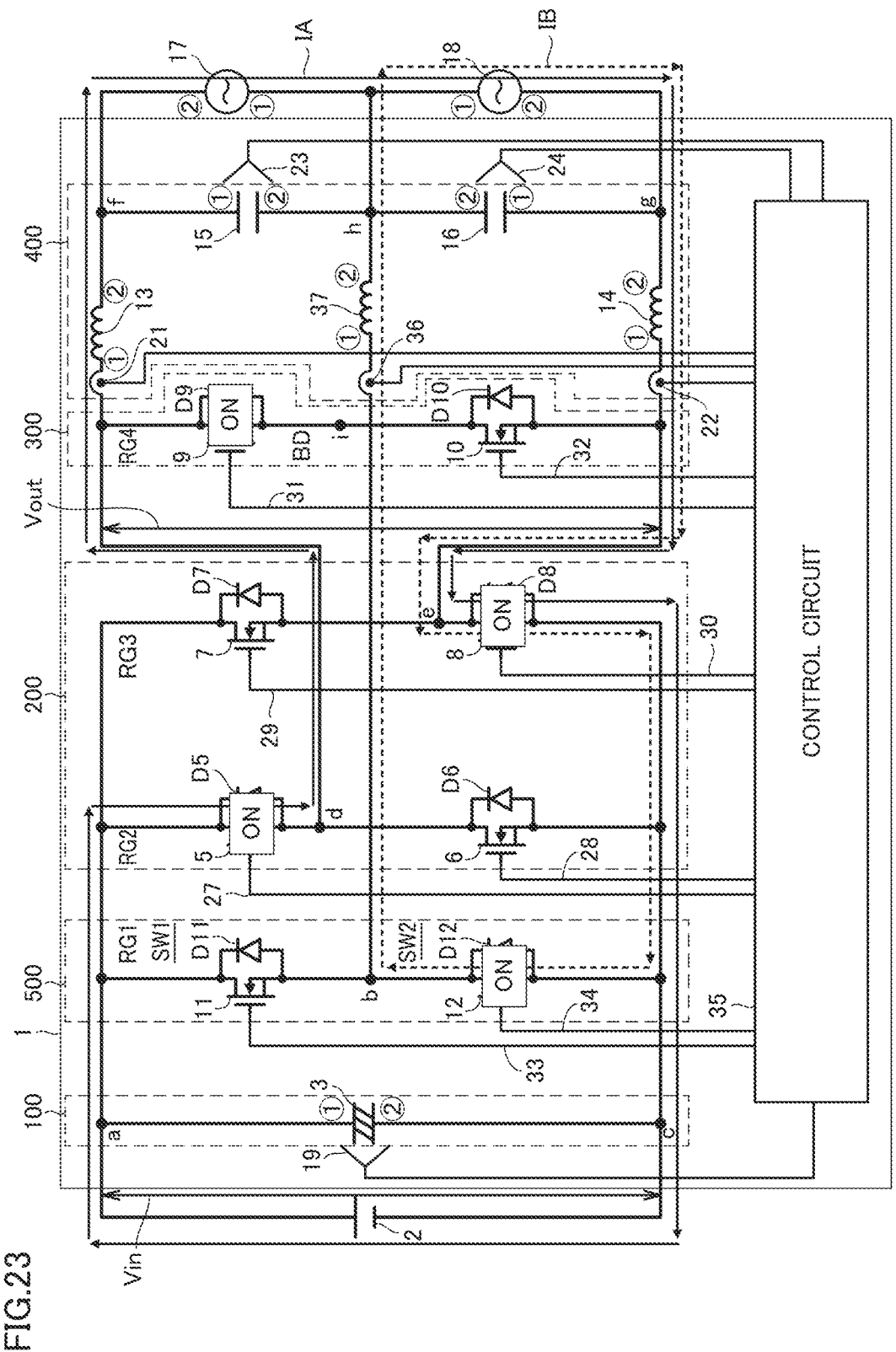
FIG. 23 is a view illustrating a current path at the power transmission period during turn-on of the switching element 12 when the AC voltage is positive, the AC current is positive, and the current flowing through the AC power supply 17 is smaller than the current flowing through the AC power supply 18 in the single-phase three-wire operation.
Figure 24:
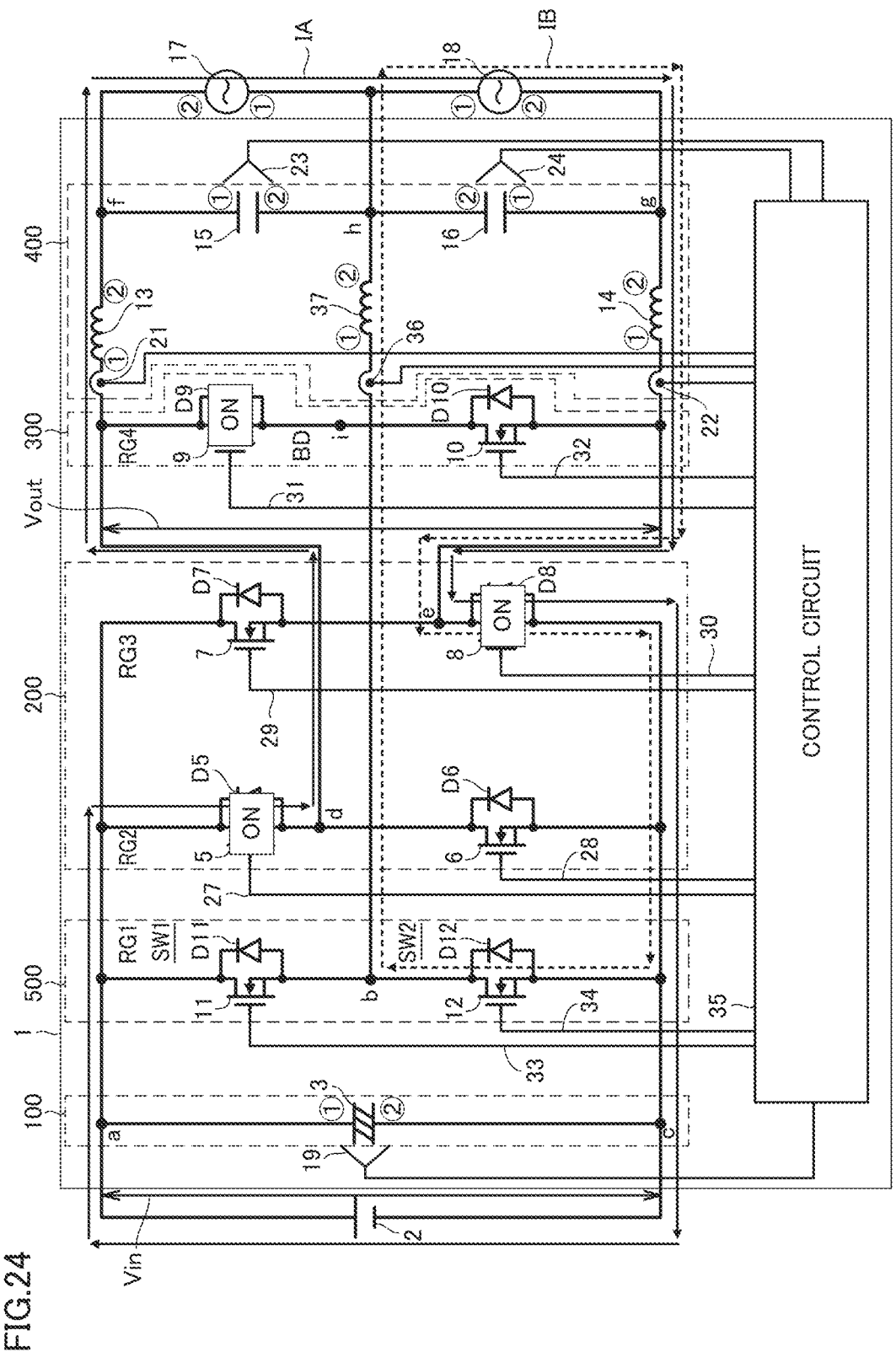
FIG. 24 is a view illustrating a current path at the power transmission period during turn-off of the switching elements 11, 12 when the AC voltage is positive, the AC current is positive, and the current flowing through the AC power supply 17 is smaller than the current flowing through the AC power supply 18 in the single-phase three-wire operation.

FIGS. 22, 23, and 24 are views illustrating the current path during the power transmission period when the AC voltage is positive, the AC current is positive, and the current flowing through AC power supply 17 is smaller than the current flowing through AC power supply 18 in the single-phase three-wire operation. In the power transmission period, switching elements 5, 8 are turned on by the switching, switching elements 6, 7 are always in the off-state, switching element 9 is always in the on-state, and switching element 10 is turned off by the switching. Switching elements 11, 12 continue switching between on and off by switching. That is, power conversion device 1 is set to the first switching mode.

FIG. 22 illustrates the flow of the current when switching element 11 is on in switching element 11 and switching element 12.

When switching element 11 is on in switching element 11 and switching element 12 is on, current IA flows through DC power supply 2, switching element 5, reactor 13, AC power supply 17, AC power supply 18, reactor 14, switching element 8, and DC power supply 2 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, switching element 8, DC power supply 2, switching element 11, reactor 37, AC power supply 18, and reactor 14 in this order. Because current IA flows through the path passing through DC power supply 2, the power transmission is performed by current IA. Because current IB also flows through the path passing through DC power supply 2, the power transmission is performed by current IB.

FIG. 23 illustrates the flow of the current when switching element 12 is on in switching element 11 and switching element 12.

When switching element 12 is on in switching element 11 and switching element 12 is on, current IA flows through DC power supply 2, switching element 5, reactor 13, AC power supply 17, AC power supply 18, reactor 14, switching element 8, and DC power supply 2 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, switching element 8, switching element 12, reactor 37, AC power supply 18, and reactor 14 in this order. Because current IA flows through the path passing through DC power supply 2, the power transmission is performed by current IA. Current IB does not flow through the path passing through DC power supply 2, and current IB flows back.

FIG. 24 illustrates the flow of the current during the dead time period of switching element 11 and switching element 12 when switching element 11 and switching element 12 are turned off.

When switching element 11 and switching element 12 are off, current IA flows through DC power supply 2, switching element 5, reactor 13, AC power supply 17, AC power supply 18, reactor 14, switching element 8, and DC power supply 2 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, switching element 8, diode D12, reactor 37, AC power supply 18, and reactor 14 in this order. Because current IA flows through the path passing through DC power supply 2, the power transmission is performed by current IA. Current IB does not flow through the path passing through DC power supply 2, and current IB flows back.

(A-3-2) Dead Time Period

Figure 25:
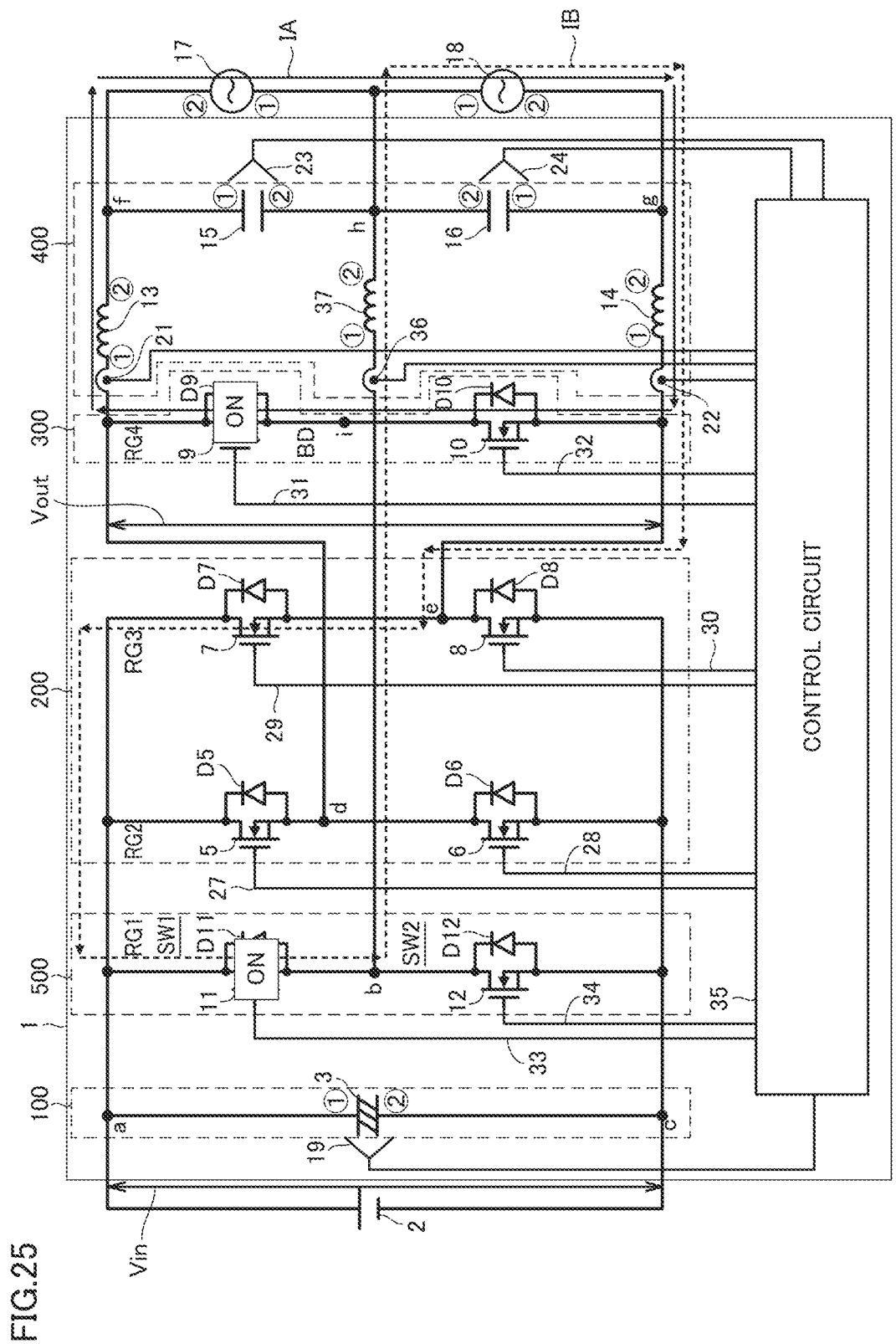
FIG. 25 is a view illustrating a current path at the dead time period during the turn-on of the switching element 11 when the AC voltage is positive, the AC current is positive, and the current flowing through the AC power supply 17 is smaller than the current flowing through the AC power supply 18 in the single-phase three-wire operation.
Figure 26:
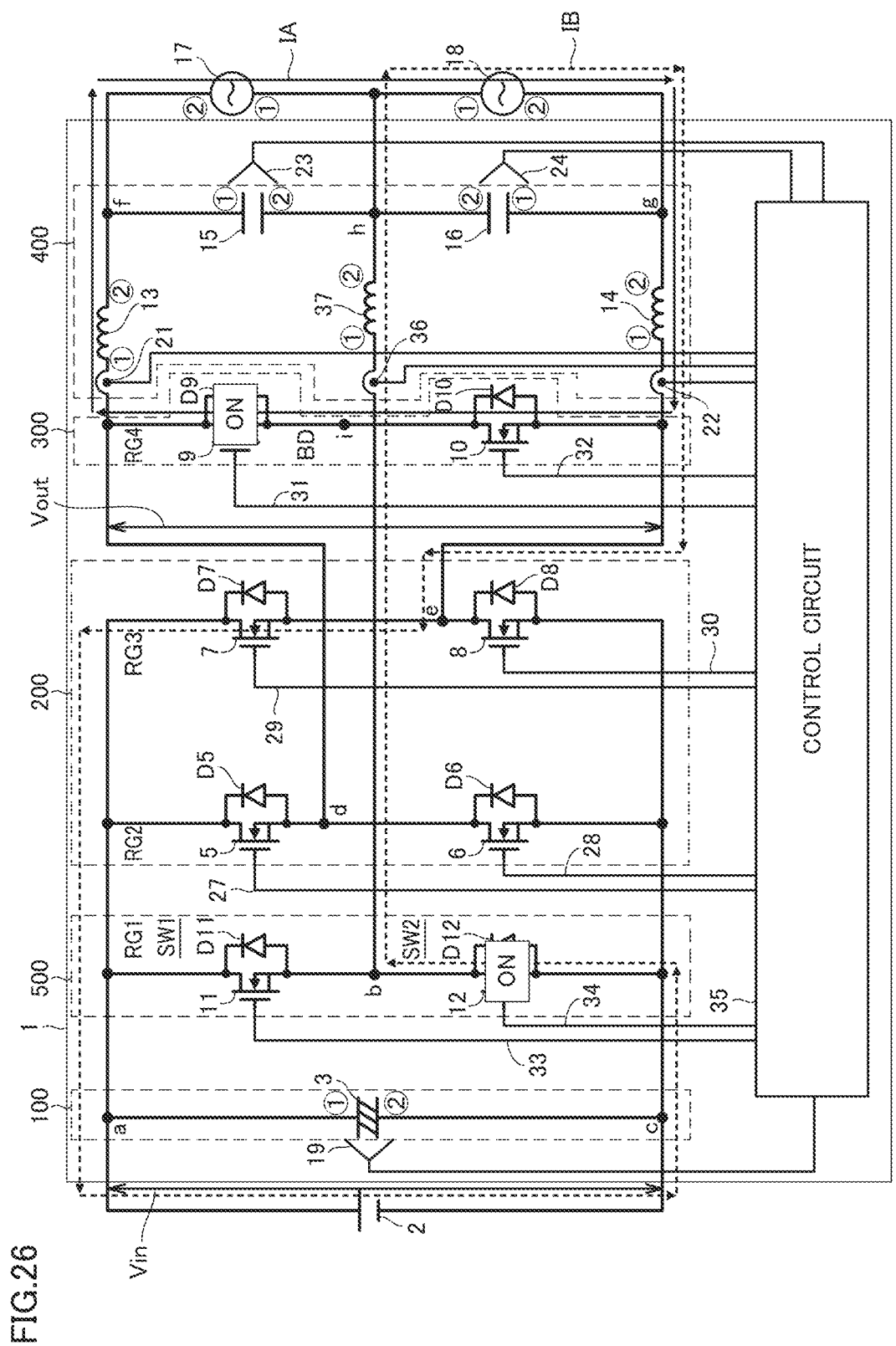
FIG. 26 is a view illustrating a current path at the dead time period during the turn-on of the switching element 12 when the AC voltage is positive, the AC current is positive, and the current flowing through the AC power supply 17 is smaller than the current flowing through the AC power supply 18 in the single-phase three-wire operation.
Figure 27:
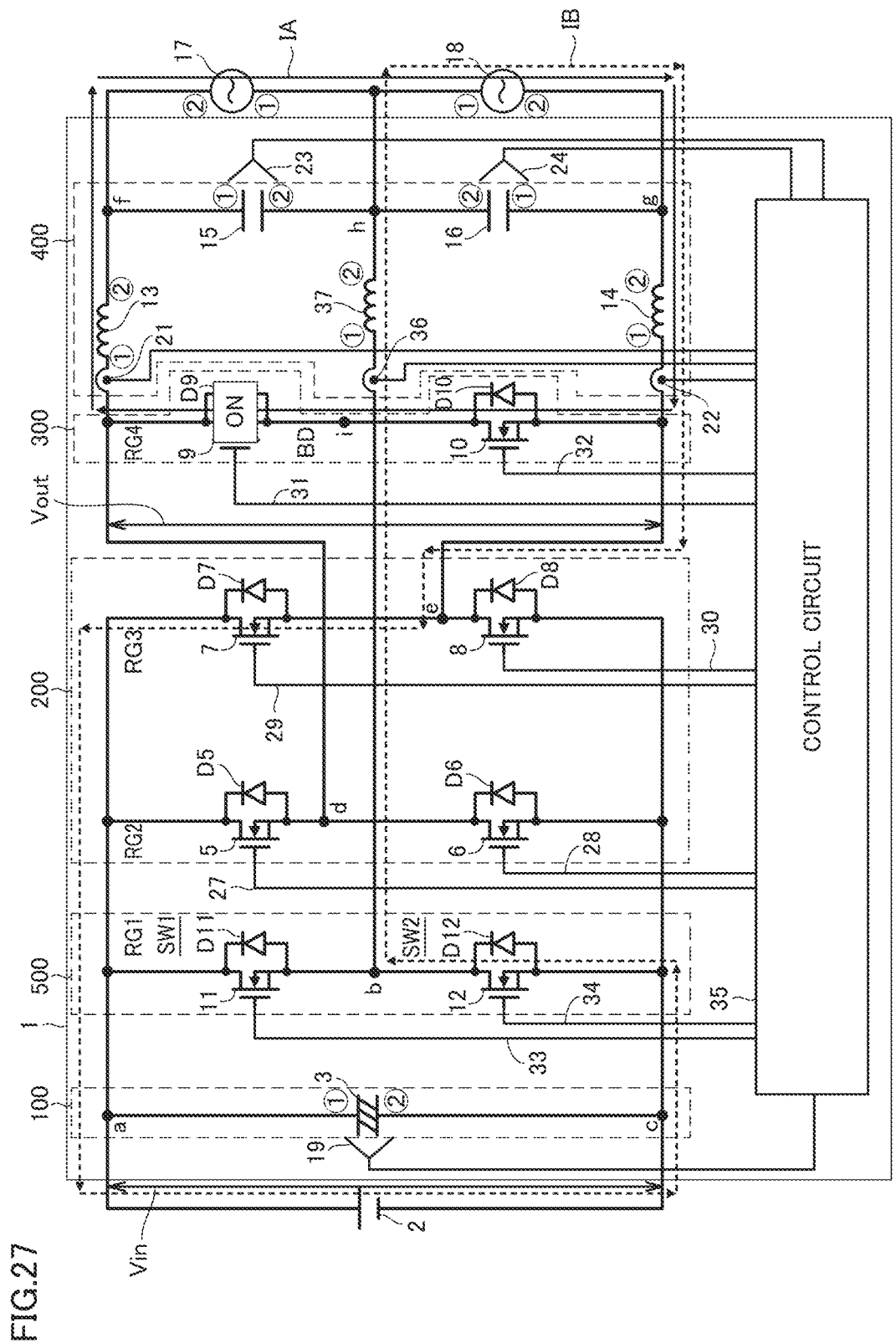
FIG. 27 is a view illustrating a current path at a dead time period during the turn-off of the switching elements 11, 12 when the AC voltage is positive, the AC current is positive, and the current flowing through the AC power supply 17 is smaller than the current flowing through the AC power supply 18 in the single-phase three-wire operation.

FIGS. 25, 26, and 27 are views illustrating the current path during the dead time period when the AC voltage is positive, the AC current is positive, and the current flowing through AC power supply 17 is smaller than the current flowing through AC power supply 18 in the single-phase three-wire operation. In the dead time period, switching elements 5, 8 are switched from on to off by the switching, switching elements 6, 7 are always in an off-state, switching element 9 is always in the on-state, and switching element 10 is maintained in the off-state. Switching elements 11, 12 continue switching between on and off by switching. That is, power conversion device 1 is set to the first dead time mode.

FIG. 25 illustrates the flow of the current when switching element 11 is on in switching element 11 and switching element 12.

When switching element 11 is on in switching element 11 and switching element 12, current IA flows through reactor 13, AC power supply 17, AC power supply 18, reactor 14, diode D10, switching element 9, and reactor 13 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, diode D7, switching element 11, reactor 37, AC power supply 18, and reactor 14 in this order. Current IA does not flow through the path passing through DC power supply 2, and current IA flows back. Current IB also flows back without flowing through the path passing through DC power supply 2.

FIG. 26 illustrates the flow of the current when switching element 12 is on in switching element 11 and switching element 12.

When switching element 12 is on in switching element 11 and switching element 12, current IA flows through reactor 13, AC power supply 17, AC power supply 18, reactor 14, diode D10, switching element 9, and reactor 13 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, diode D7, DC power supply 2, switching element 12, reactor 37, AC power supply 18, and reactor 14 in this order. Current IA does not flow through the path passing through DC power supply 2, and current IA flows back. Because the current IB flows through the path passing through DC power supply 2, regeneration is performed by current IB.

FIG. 27 illustrates the flow of the current during the dead time period of switching element 11 and switching element 12 when switching element 11 and switching element 12 are turned off.

When switching element 11 and switching element 12 are off, current IA flows through reactor 13, AC power supply 17, AC power supply 18, reactor 14, diode D10, switching element 9, and reactor 13 in this order. Furthermore, because the current flowing through AC power supply 17 is smaller than the current flowing through AC power supply 18, current IB obtained by subtracting the current flowing through the AC power supply 17 from the current flowing through the AC power supply 18 flows through reactor 14, diode D7, DC power supply 2, diode D12, reactor 37, AC power supply 18, and reactor 14 in this order. Current IA does not flow through the path passing through DC power supply 2, and current IA flows back. Because the current IB flows through the path passing through DC power supply 2, regeneration is performed by current IB.

(A-3-3) Flow Back Period

Figure 28:
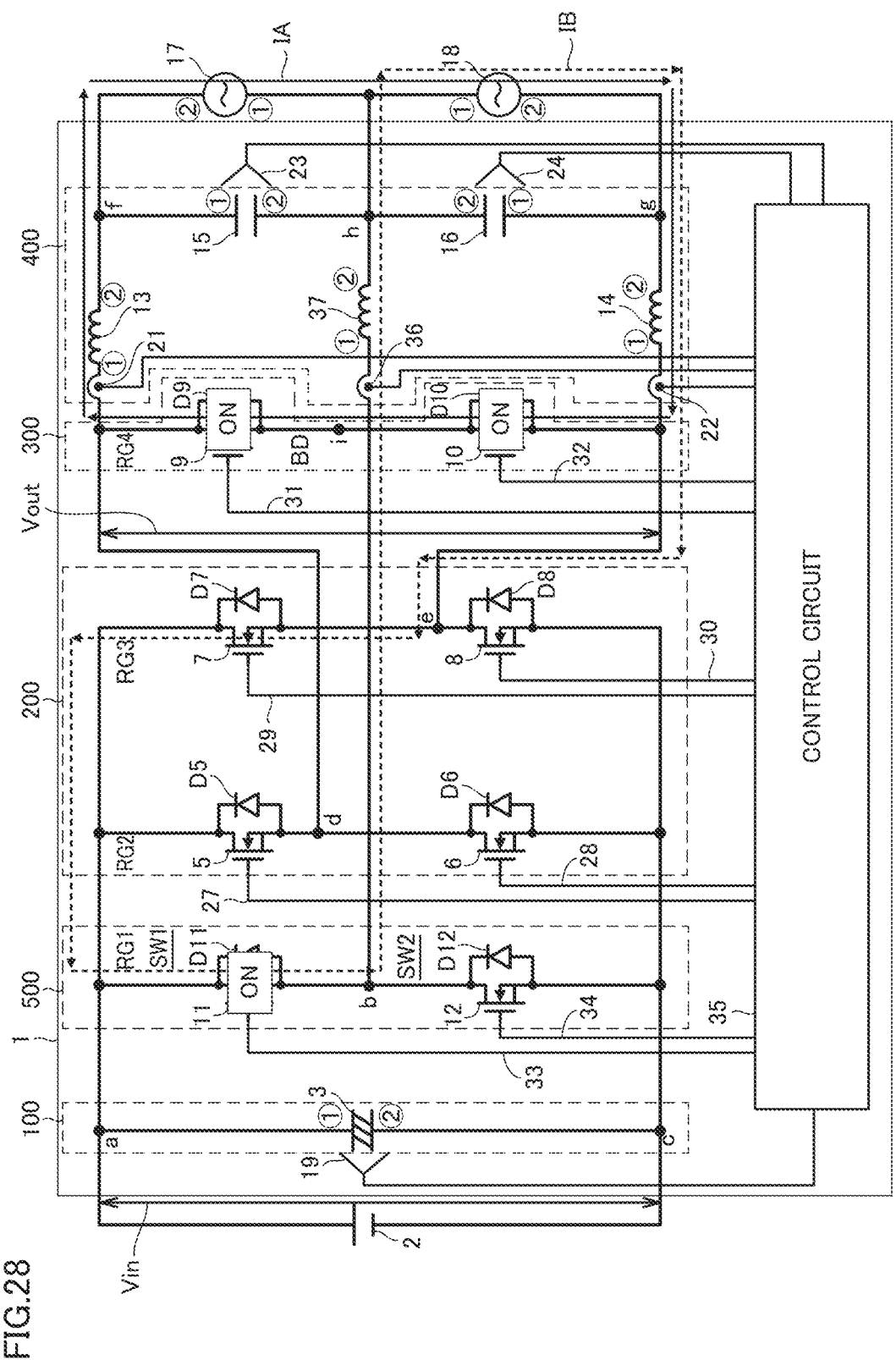
FIG. 28 is a view illustrating a current path at the flow back period during the turn-on of the switching element 11 when the AC voltage is positive, the AC current is positive, and the current flowing through the AC power supply 17 is smaller than the current flowing through the AC power supply 18 in the single-phase three-wire operation.
Figure 29:
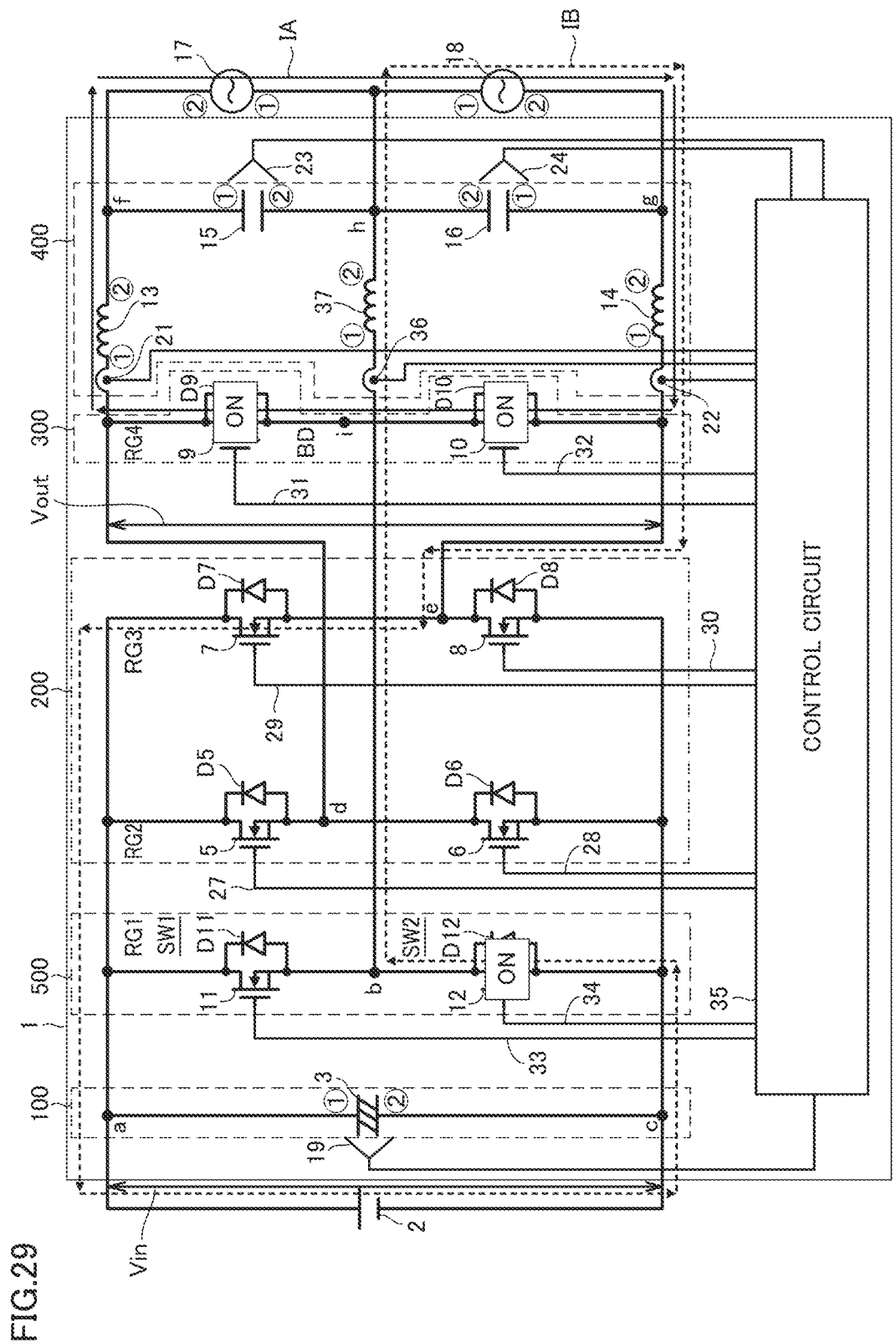
FIG. 29 is a view illustrating a current path at the flow back period during the turn-on of the switching element 12 when the AC voltage is positive, the AC current is positive, and the current flowing through the AC power supply 17 is smaller than the current flowing through the AC power supply 18 in the single-phase three-wire operation.
Figure 30:
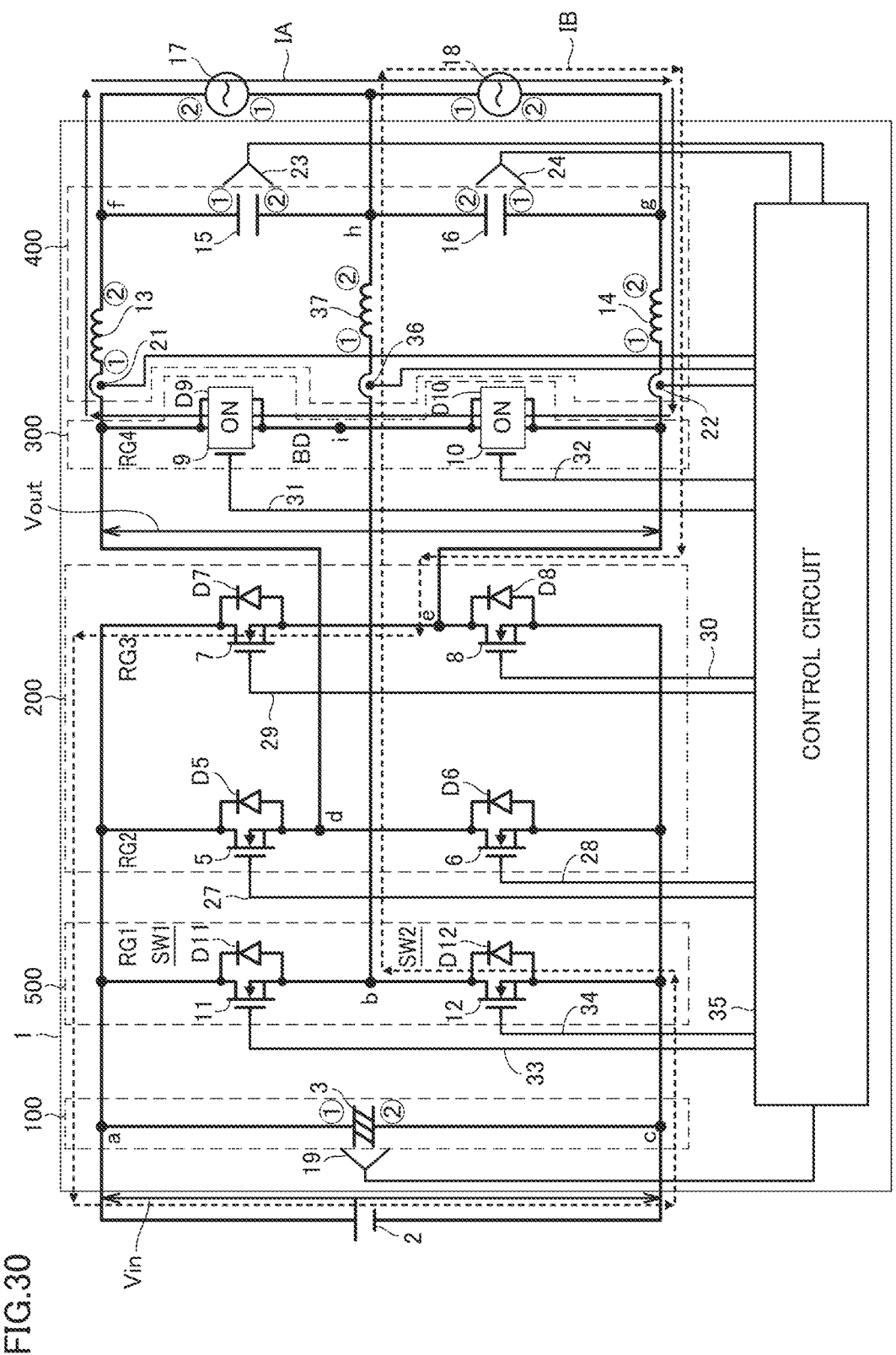
FIG. 30 is a view illustrating a current path at the flow back period during the turn-off of the switching elements 11, 12 when the AC voltage is positive, the AC current is positive, and the current flowing through the AC power supply 17 is smaller than the current flowing through the AC power supply 18 in the single-phase three-wire operation.

FIGS. 28, 29, and 30 are views illustrating the current path during the flow back period when the AC voltage is positive, the AC current is positive, and the current flowing through AC power supply 17 is smaller than the current flowing through AC power supply 18 in the single-phase three-wire operation. During the flow back period, switching elements 5, 8 are maintained in the off-state, switching elements 6, 7 are always in the off-state, switching element 9 is always in the on-state, and switching element 10 is switched from off to on by the switching operation. Switching elements 11, 12 continue switching between on and off by switching. That is, power conversion device 1 is set to the second switching mode.

FIG. 28 illustrates the flow of the current when switching element 11 is on in switching element 11 and switching element 12.

When switching element 11 is on in switching element 11 and switching element 12, current IA flows through reactor 13, AC power supply 17, AC power supply 18, reactor 14, switching element 10, switching element 9, and reactor 13 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, diode D7, switching element 11, reactor 37, AC power supply 18, and reactor 14 in this order. Current IA does not flow through the path passing through DC power supply 2, and current IA flows back. Current IB also flows back without flowing through the path passing through DC power supply 2.

FIG. 29 illustrates the flow of the current when switching element 12 is on in switching element 11 and switching element 12.

When switching element 12 is on in switching element 11 and switching element 12, current IA flows through reactor 13, AC power supply 17, AC power supply 18, reactor 14, switching element 10, switching element 9, and reactor 13 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, diode D7, DC power supply 2, switching element 12, reactor 37, AC power supply 18, and reactor 14 in this order. Current IA does not flow through the path passing through DC power supply 2, and current IA flows back. Because the current IB flows through the path passing through DC power supply 2, regeneration is performed by current IB.

FIG. 30 illustrates the flow of the current during the dead time period of switching element 11 and switching element 12 when switching element 11 and switching element 12 are turned off.

When switching element 11 and switching element 12 are off, current IA flows through reactor 13, AC power supply 17, AC power supply 18, reactor 14, switching element 10, switching element 9, and reactor 13 in this order. Furthermore, because the current flowing through AC power supply 17 is smaller than the current flowing through AC power supply 18, current IB obtained by subtracting the current flowing through the AC power supply 17 from the current flowing through the AC power supply 18 flows through reactor 14, diode D7, DC power supply 2, diode D12, reactor 37, AC power supply 18, and reactor 13 in this order. Current IA does not flow through the path passing through DC power supply 2, and current IA flows back. Because the current IB flows through the path passing through DC power supply 2, regeneration is performed by current IB.

When the flow back period ends, the processing transitions to the dead time period similar to (A-3-2), and then returns to the power transmission period of (A-3-1).

(A-4) AC Voltage is Negative, AC Current is Negative, Power of AC Power Supply 17<Power of AC Power Supply 18

The operation when the power of AC power supply 17 is smaller than the power of AC power supply 18 in the case of the negative AC voltage and the negative AC current will be described. Because the power of AC power supply 17 is smaller than the power of AC power supply 18, the current flowing through AC power supply 17 is smaller than the current flowing through AC power supply 18.

When the AC voltage is negative, the voltage at the first terminal of capacitor 15 is negative, the voltage at the second terminal of capacitor 15 is positive, the voltage at the second terminal of capacitor 16 is negative, and the voltage at the first terminal of capacitor 16 is positive. When the alternating current is negative, the current flows from the second terminal to the first terminal of reactor 13.

(A-4-1) Power Transmission Period

Figure 31:
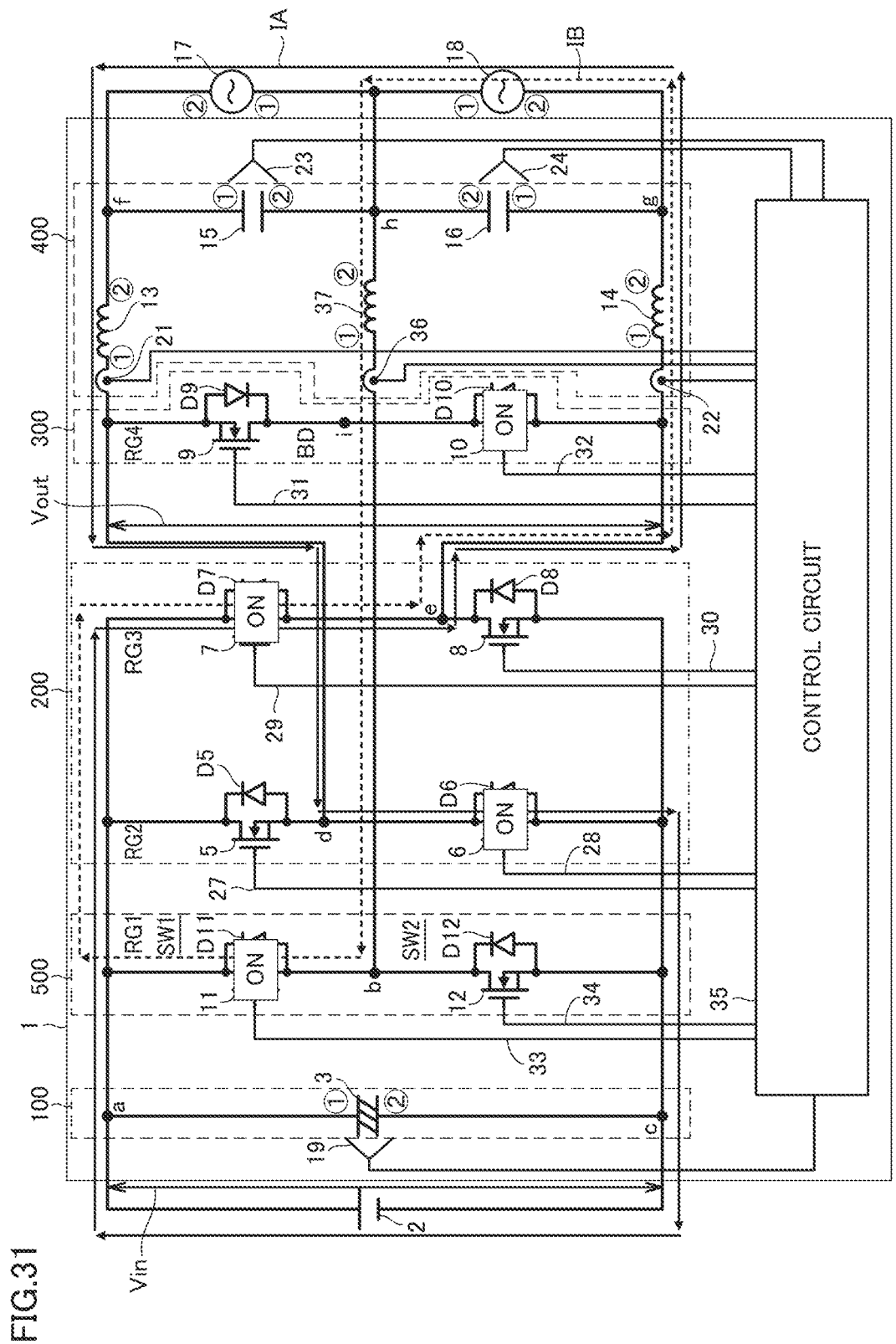
FIG. 31 is a view illustrating a current path at the power transmission period during the turn-on of the switching element 11 when the AC voltage is negative, the AC current is negative, and the current flowing through the AC power supply 17 is smaller than the current flowing through the AC power supply 18 in the single-phase three-wire operation.
Figure 32:
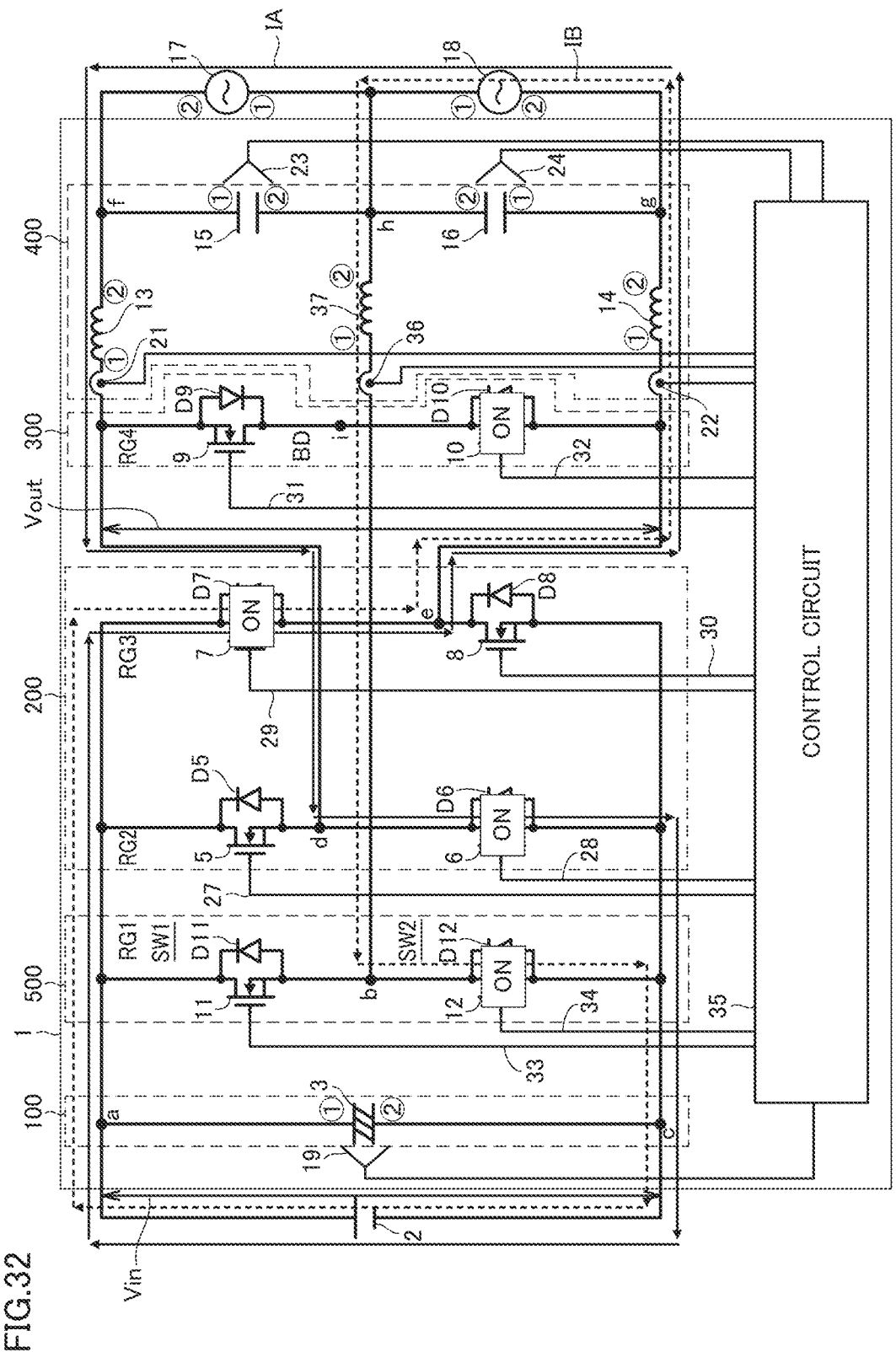
FIG. 32 is a view illustrating a current path at the power transmission period during the turn-on of the switching element 12 when the AC voltage is negative, the AC current is negative, and the current flowing through the AC power supply 17 is smaller than the current flowing through the AC power supply 18 in the single-phase three-wire operation.
Figure 33:
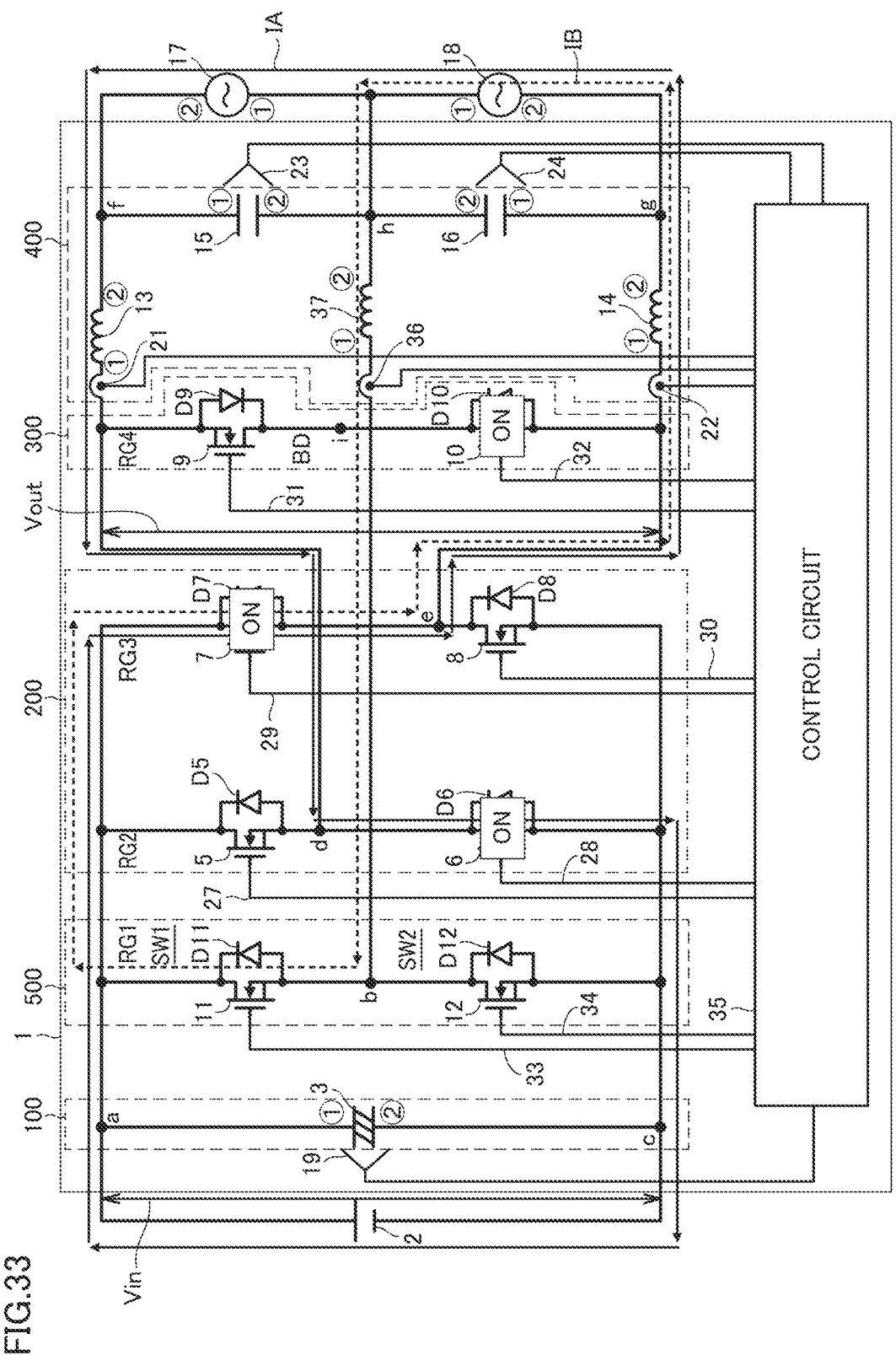
FIG. 33 is a view illustrating a current path at the power transmission period during turn-off of the switching elements 11, 12 when the AC voltage is negative, the AC current is negative, and the current flowing through the AC power supply 17 is smaller than the current flowing through the AC power supply 18 in the single-phase three-wire operation.

FIGS. 31, 32, and 33 are views illustrating the current path during the power transmission period when the AC voltage is negative, the AC current is negative, and the current flowing through AC power supply 17 is smaller than the current flowing through AC power supply 18 in the single-phase three-wire operation. In the power transmission period, switching elements 6, 7 are turned on by the switching, switching elements 5, 8 are always in the off-state, switching element 10 is always in the on-state, and switching element 9 is turned off by the switching. Switching elements 11, 12 continue switching between on and off by switching. That is, power conversion device 1 is set to the third switching mode.

FIG. 31 illustrates the flow of the current when switching element 11 is on in switching element 11 and switching element 12.

When switching element 11 is on in switching element 11 and switching element 12, current IA flows through DC power supply 2, switching element 7, reactor 14, AC power supply 18, AC power supply 17, reactor 13, switching element 6, and DC power supply 2 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, AC power supply 18, reactor 37, switching element 11, switching element 7, and reactor 14 in this order. Because current IA flows through the path passing through DC power supply 2, the power transmission is performed by current IA. Current IB does not flow through the path passing through DC power supply 2, and current IB flows back.

FIG. 32 illustrates the flow of the current when switching element 12 is on in switching element 11 and switching element 12.

When switching element 12 is on in switching element 11 and switching element 12 is on, current IA flows through DC power supply 2, switching element 7, reactor 14, AC power supply 18, AC power supply 17, reactor 13, switching element 6, and DC power supply 2 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, AC power supply 18, reactor 37, switching element 12, DC power supply 2, switching element 7, and reactor 14 in this order. Because current IA flows through the path passing through DC power supply 2, the power transmission is performed by current IA. Because current IB also flows through the path passing through DC power supply 2, the power transmission is performed by current IB.

FIG. 33 illustrates the flow of the current during the dead time period of switching element 11 and switching element 12 when switching element 11 and switching element 12 are turned off.

When switching element 11 and switching element 12 are off, current IA flows through DC power supply 2, switching element 7, reactor 14, AC power supply 18, AC power supply 17, reactor 13, switching element 6, and DC power supply 2 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, AC power supply 18, reactor 37, diode D11, switching element 7, and reactor 14 in this order. Because current IA flows through the path passing through DC power supply 2, the power transmission is performed by current IA. Current IB does not flow through the path passing through DC power supply 2, and current IB flows back.

(A-4-2) Dead Time Period

Figure 34:
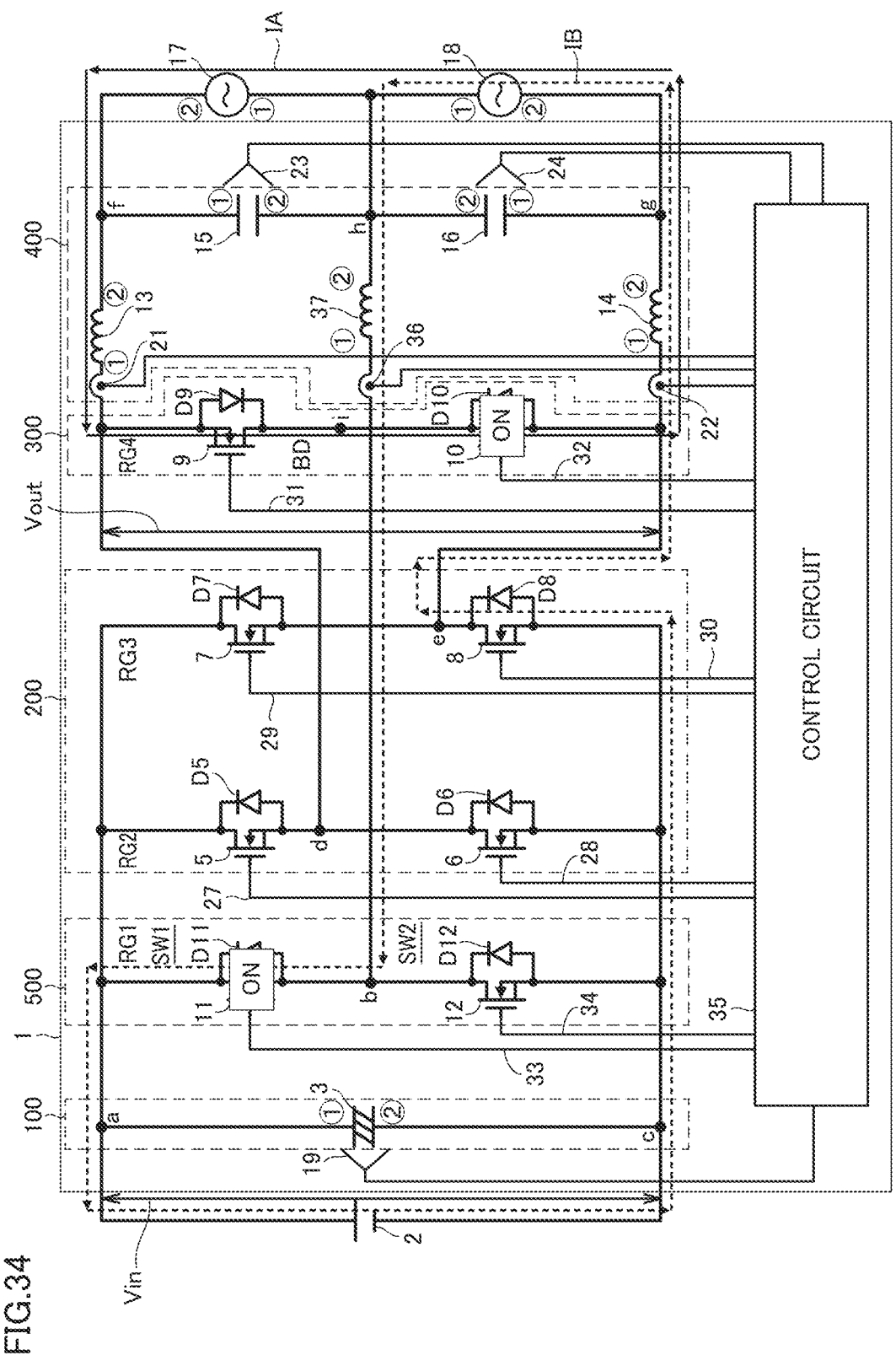
FIG. 34 is a view illustrating a current path at the dead time period during the turn-on of the switching element 11 when the AC voltage is negative, the AC current is negative, and the current flowing through the AC power supply 17 is smaller than the current flowing through the AC power supply 18 in the single-phase three-wire operation.
Figure 35:
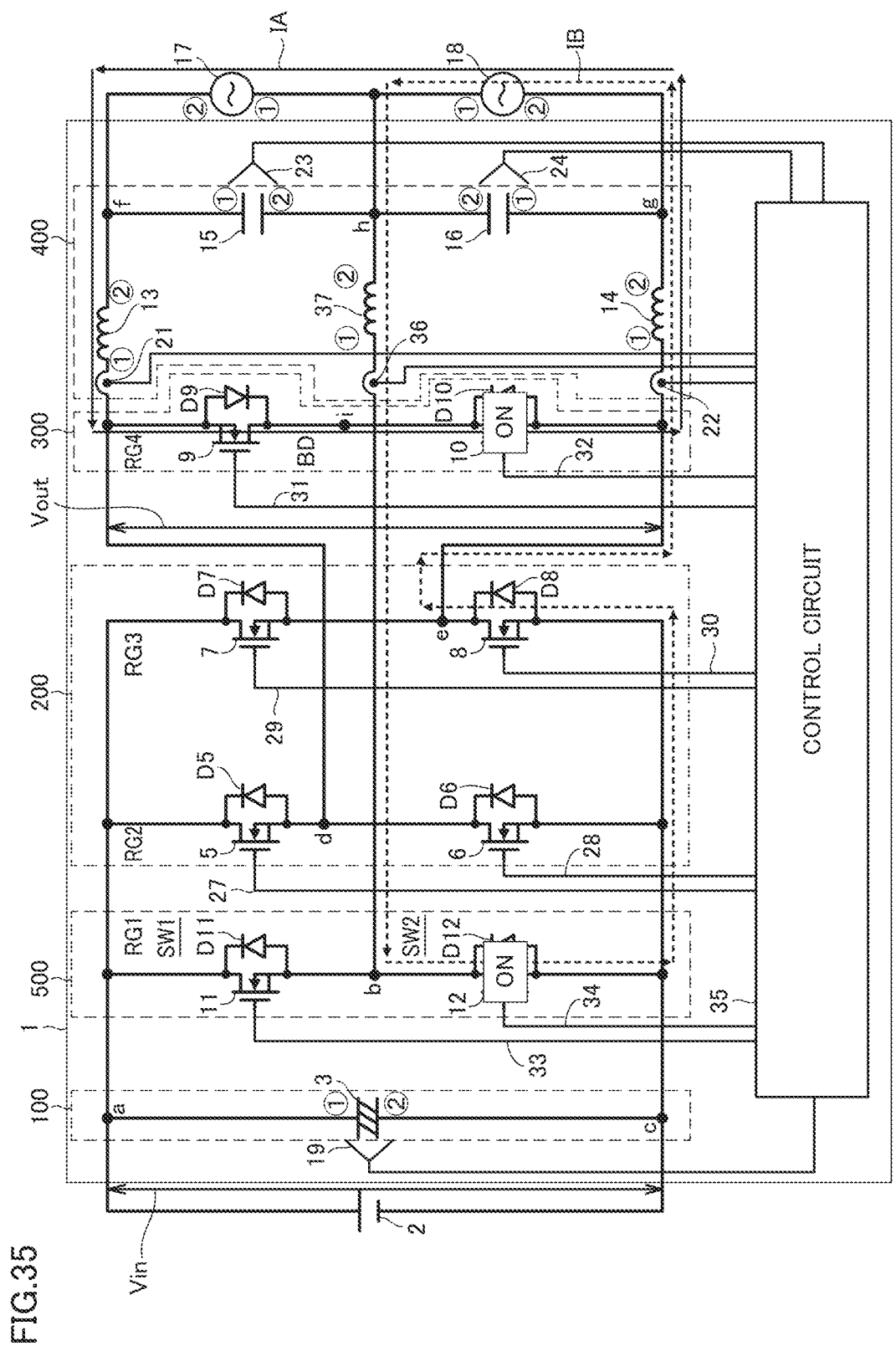
FIG. 35 is a view illustrating a current path at the dead time period during the turn-on of the switching element 12 when the AC voltage is negative, the AC current is negative, and the current flowing through the AC power supply 17 is smaller than the current flowing through the AC power supply 18 in the single-phase three-wire operation.
Figure 36:
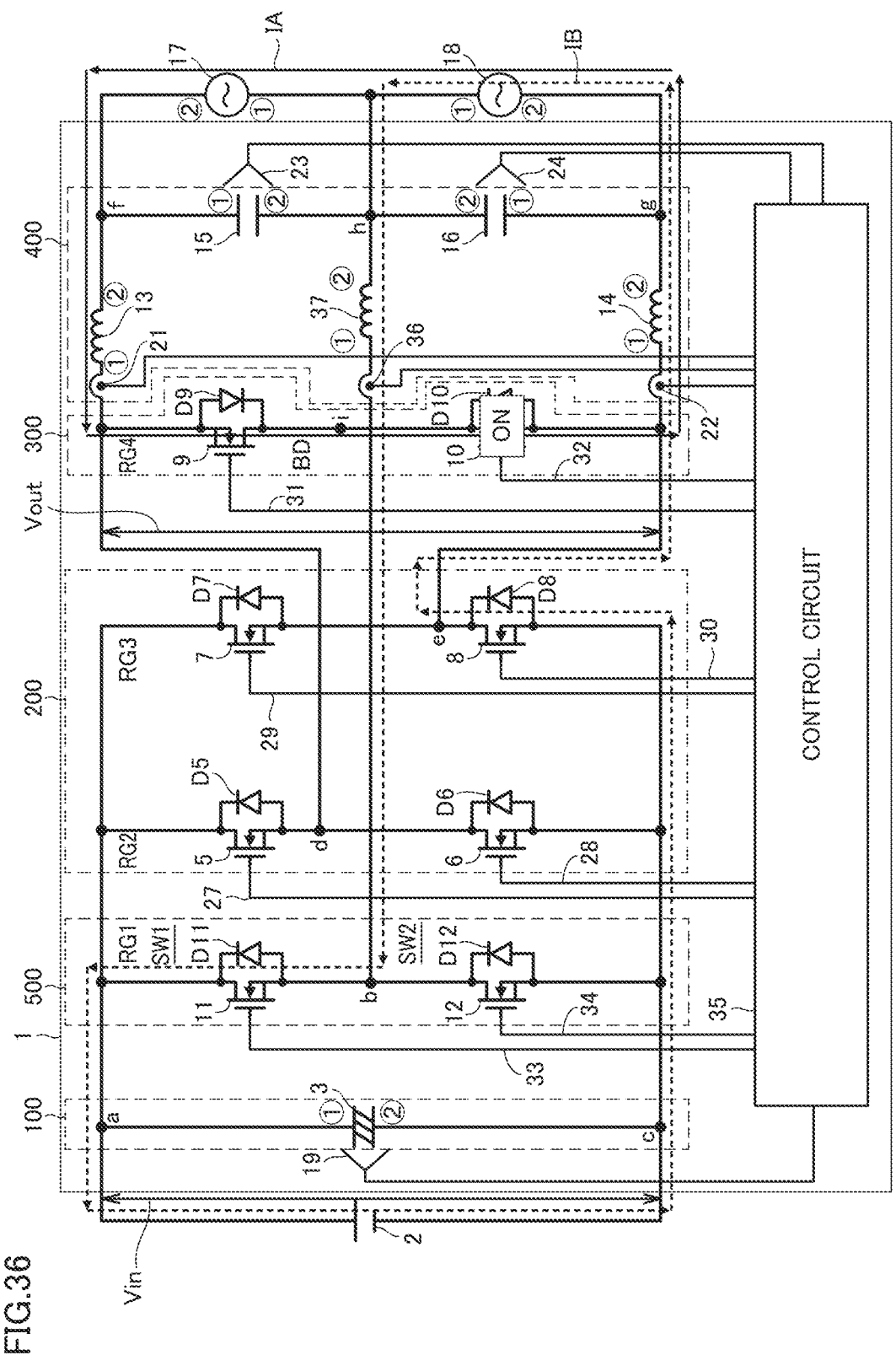
FIG. 36 is a view illustrating a current path at the dead time period during the turn-off of the switching elements 11, 12 when the AC voltage is negative, the AC current is negative, and the current flowing through the AC power supply 17 is smaller than the current flowing through the AC power supply 18 in the single-phase three-wire operation.

FIGS. 34, 35, and 36 are views illustrating the current path during the dead time period when the AC voltage is negative, the AC current is negative, and the current flowing through AC power supply 17 is smaller than the current flowing through AC power supply 18 in the single-phase three-wire operation. In the dead time period, switching elements 6, 7 are switched from on to off by the switching, switching elements 5, 8 are always in an off-state, switching element 10 is always in the on-state, and switching element 9 is maintained in the off-state. Switching elements 11, 12 continue switching between on and off by switching. That is, power conversion device 1 is set to the second dead time mode.

FIG. 34 illustrates the flow of the current when switching element 11 is on in switching element 11 and switching element 12.

When switching element 11 is on in switching element 11 and switching element 12, current IA flows through reactor 13, diode D9, switching element 10, reactor 14, AC power supply 18, AC power supply 17, and reactor 13 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, AC power supply 18, reactor 37, switching element 11, DC power supply 2, diode D8, and reactor 14 in this order. Current IA does not flow through the path passing through DC power supply 2, and current IA flows back. Because the current IB flows through the path passing through DC power supply 2, regeneration is performed by current IB.

FIG. 35 illustrates the flow of the current when switching element 12 is on in switching element 11 and switching element 12.

When switching element 12 is on in switching element 11 and switching element 12, current IA flows through reactor 13, diode D9, switching element 10, reactor 14, AC power supply 18, AC power supply 17, and reactor 13 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, AC power supply 18, reactor 37, switching element 12, diode D8, and reactor 14 in this order. Current IA does not flow through the path passing through DC power supply 2, and current IA flows back. Current IB also flows back without flowing through the path passing through DC power supply 2.

FIG. 36 illustrates the flow of the current during the dead time period of switching element 11 and switching element 12 when switching element 11 and switching element 12 are turned off.

When switching element 11 and switching element 12 are off, current IA flows through reactor 13, diode D9, switching element 10, reactor 14, AC power supply 18, AC power supply 17, and reactor 13 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, AC power supply 18, reactor 37, diode D11, DC power supply 2, diode D8, and reactor 14 in this order. Current IA does not flow through the path passing through DC power supply 2, and current IA flows back. Because the current IB flows through the path passing through DC power supply 2, regeneration is performed by current IB.

(A-4-3) Flow Back Period

Figure 37:
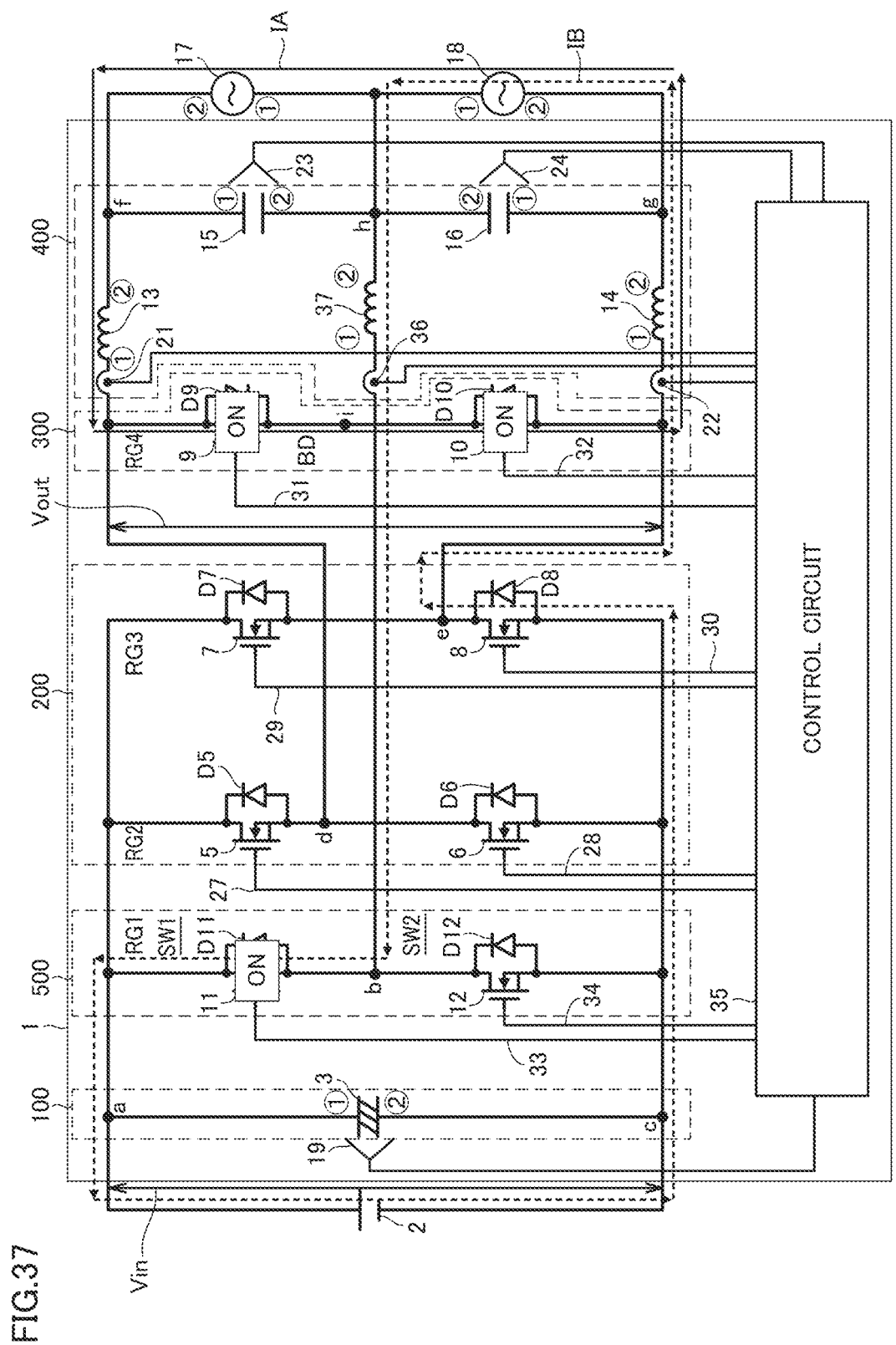
FIG. 37 is a view illustrating a current path at the flow back period during the turn-on of the switching element 11 when the AC voltage is negative, the AC current is negative, and the current flowing through the AC power supply 17 is smaller than the current flowing through the AC power supply 18 in the single-phase three-wire operation.
Figure 38:
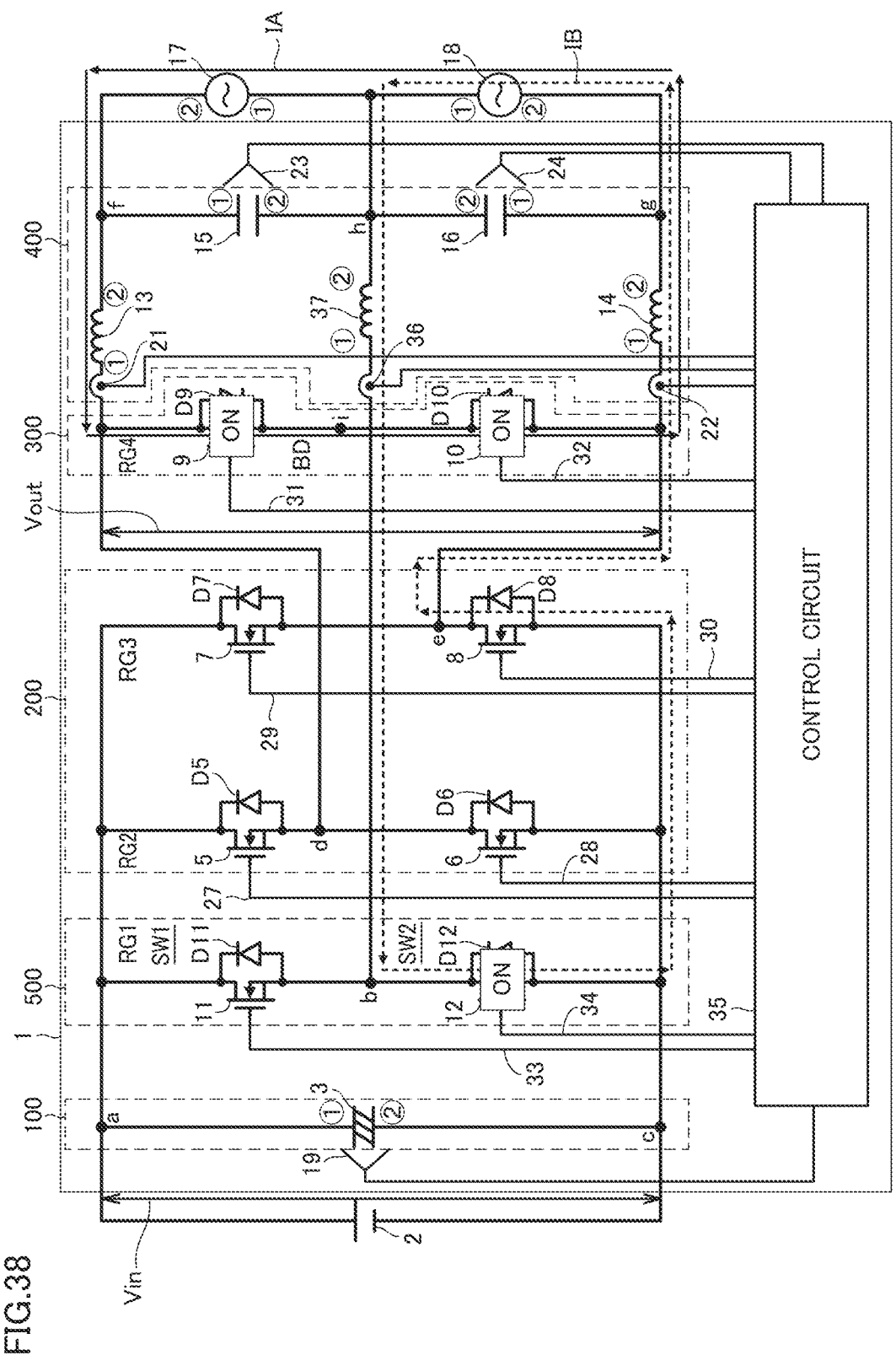
FIG. 38 is a view illustrating a current path at the flow back period during the turn-on of the switching element 12 when the AC voltage is negative, the AC current is negative, and the current flowing through the AC power supply 17 is smaller than the current flowing through the AC power supply 18 in the single-phase three-wire operation.
Figure 39:
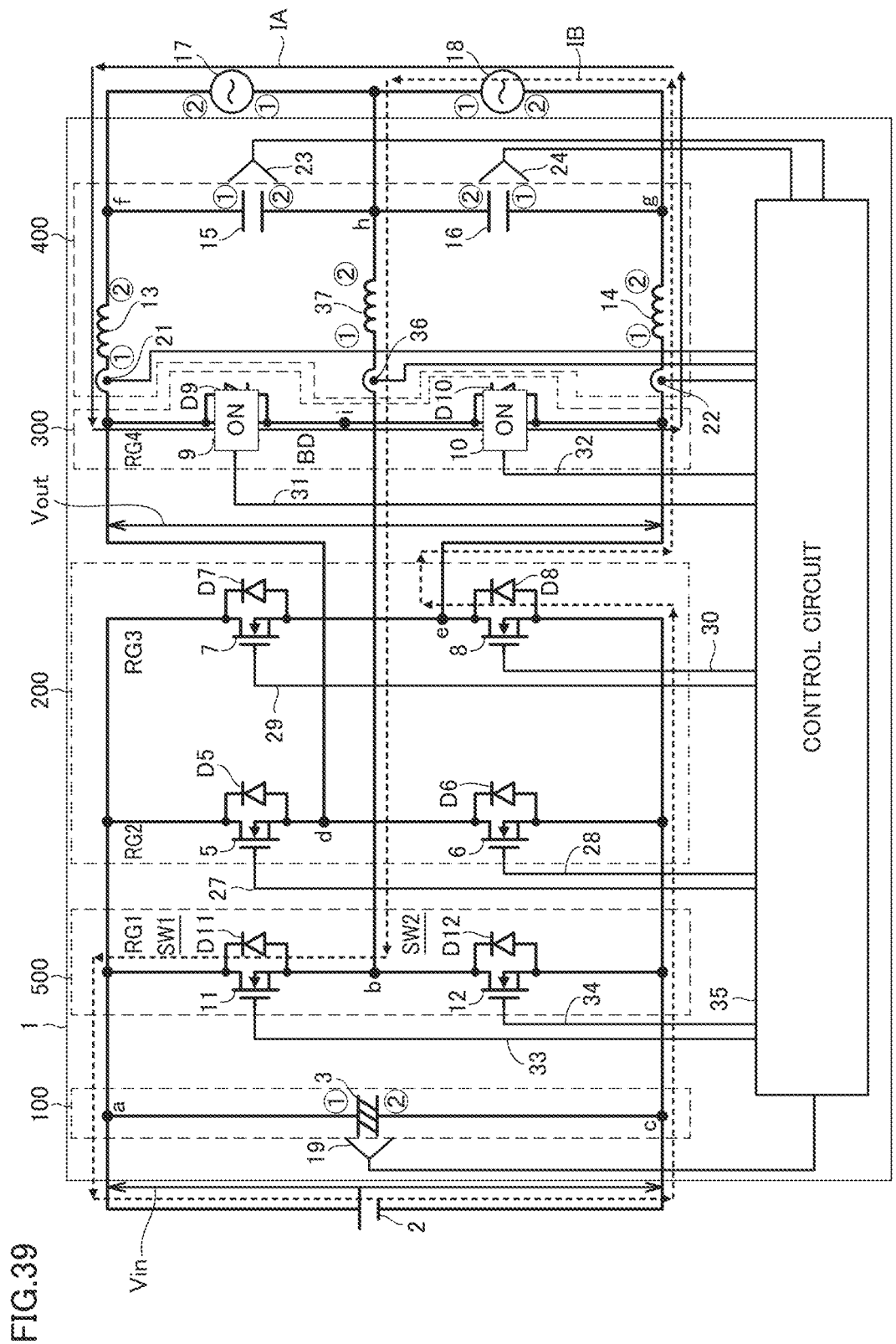
FIG. 39 is a view illustrating a current path at the flow back period during the turn-off of the switching elements 11, 12 when the AC voltage is negative, the AC current is negative, and the current flowing through the AC power supply 17 is smaller than the current flowing through the AC power supply 18 in the single-phase three-wire operation.

FIGS. 37, 38, and 39 are views illustrating the current path during the flow back period when the AC voltage is negative, the AC current is negative, and the current flowing through AC power supply 17 is smaller than the current flowing through AC power supply 18 in the single-phase three-wire operation. During the flow back period, switching elements 6, 7 are maintained in the off-state, switching elements 5, 8 are always in the off-state, switching element 10 is always in the on-state, and switching element 9 is switched from off to on by the switching operation. Switching elements 11, 12 continue switching between on and off by switching. That is, power conversion device 1 is set to the second switching mode.

FIG. 37 illustrates the flow of the current when switching element 11 is on in switching element 11 and switching element 12.

When switching element 11 is on in switching element 11 and switching element 12, current IA flows through reactor 13, switching element 9, switching element 10, reactor 14, AC power supply 18, AC power supply 17, and reactor 13 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, AC power supply 18, reactor 37, switching element 11, DC power supply 2, diode D8, and reactor 14 in this order. Current IA does not flow through the path passing through DC power supply 2, and current IA flows back. Because the current IB flows through the path passing through DC power supply 2, regeneration is performed by current IB.

FIG. 38 illustrates the flow of the current when switching element 12 is on in switching element 11 and switching element 12.

When switching element 12 is on in switching element 11 and switching element 12, current IA flows through reactor 13, switching element 9, switching element 10, reactor 14, AC power supply 18, AC power supply 17, and reactor 13 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, AC power supply 18, reactor 37, switching element 12, diode D8, and reactor 14 in this order. Current IA does not flow through the path passing through DC power supply 2, and current IA flows back. Current IB also flows back without flowing through the path passing through DC power supply 2.

FIG. 39 illustrates the flow of the current during the dead time period of switching element 11 and switching element 12 when switching element 11 and switching element 12 are turned off.

When switching element 11 and switching element 12 are off, current IA flows through reactor 13, switching element 9, switching element 10, reactor 14, AC power supply 18, AC power supply 17, and reactor 13 in this order. Furthermore, because the current flowing through AC power supply 17 is smaller than the current flowing through AC power supply 18, current IB obtained by subtracting the current flowing through AC power supply 17 from the current flowing through AC power supply 18 flows through reactor 14, AC power supply 18, reactor 37, diode D11, DC power supply 2, diode D8, and reactor 14 in this order. Current IA does not flow through the path passing through DC power supply 2, and current IA flows back. Because the current IB flows through the path passing through DC power supply 2, regeneration is performed by current IB.

When the flow back period ends, the processing transitions to the dead time period similar to (A-4-2), and then returns to the power transmission period of (A-4-1).

As described above, according to the first embodiment, the power conversion device includes switching element 11 and switching element 12, so that current IB can flow through a path other than the path passing through the power supply (DC power supply 2, capacitor 3) when the power consumption of AC power supply 17 and the power consumption of AC power supply 18 are different from each other during the single-phase three-wire operation.

Thus, when current IA does not pass through the power source (DC power supply 2, capacitor 3) but flows back, the state in which current IB passes through the power source (DC power supply 2, capacitor 3) can be reduced. As a result, power conversion device 1 operates stably.

Furthermore, according to the first embodiment, because reactor 37 is included in the current path through which differential current IB flows, inductance of the current path can be increased. As a result, a ripple of differential current IB can be decreased. Thus, a change in current flowing through power conversion device 1 can be decreased.

In addition, according to the first embodiment, because first filter circuit 100 includes only one capacitor, an increase in size of power conversion device 1 can be prevented and power conversion device 1 operates stably. This is because, in the case where first filter circuit 100 includes two capacitors connected in series, the operation of power conversion device 1 becomes unstable when the voltage balance between the two capacitors is lost.

Second Embodiment

Figure 40:
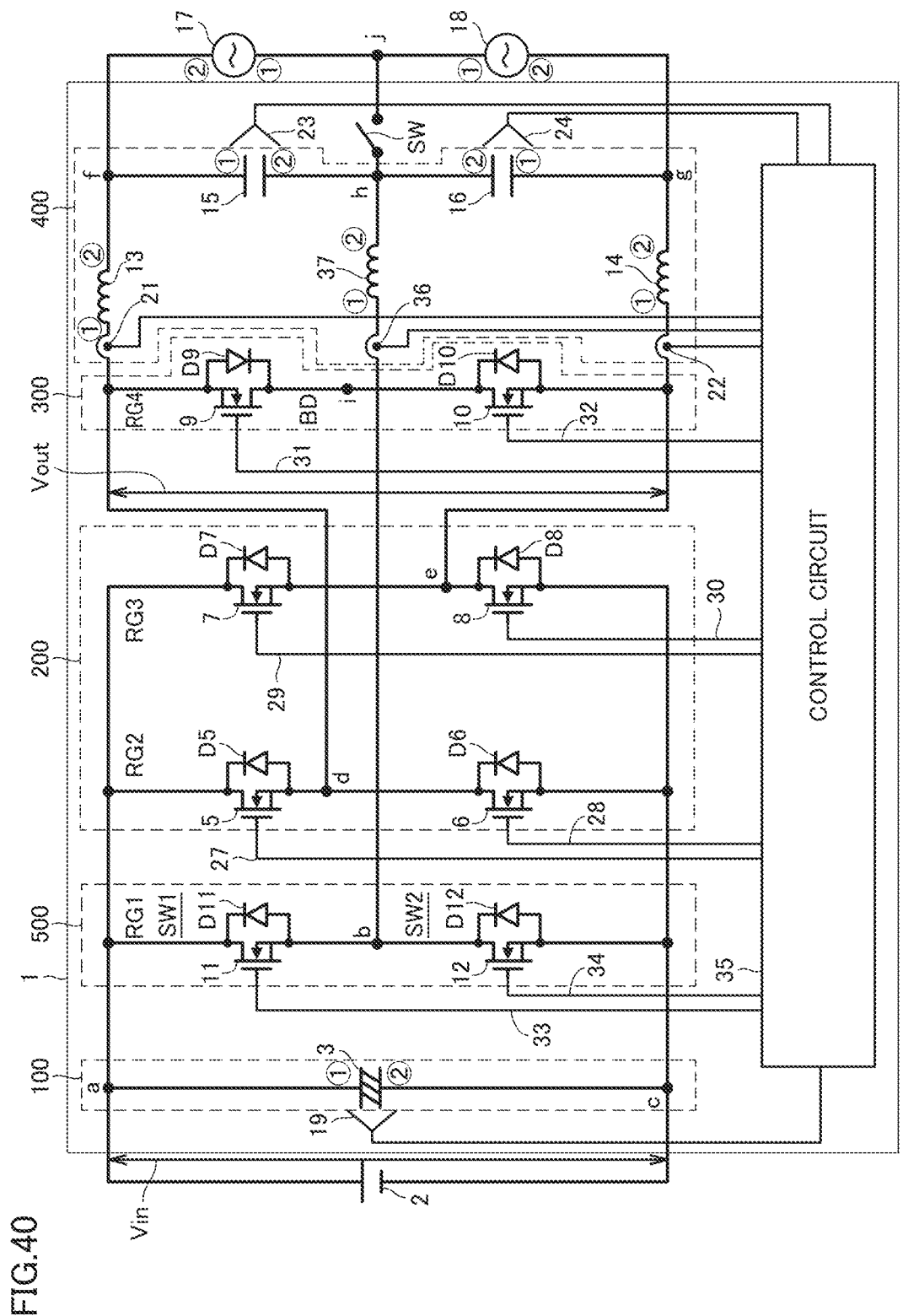
FIG. 40 is a view illustrating a configuration of a power conversion device 1 according to a second embodiment.

FIG. 40 is a view illustrating a configuration of a power conversion device 1 according to a second embodiment.

Power conversion device 1 of the second embodiment is different from power conversion device 1 of the first embodiment in that power conversion device 1 of the second embodiment includes a changeover switch SW.

In the second embodiment, AC power supply 17 is disposed between node f and a node j (tenth node), and AC power supply 18 is disposed between node j and node g. That is, the first terminal of AC power supply 17 and the first terminal of AC power supply 18 are connected at a node j (tenth node). The second terminal of AC power supply 17 is connected to node f. The second terminal of AC power supply 18 is connected to node g.

Changeover switch SW is disposed between node h and node j. Changeover switch SW is a mechanical switch or a semiconductor switch.

Control circuit 35 turns on changeover switch SW during the single-phase three-wire operation, and turns off changeover switch SW during the single-phase two-wire operation.

The single-phase three-wire operation of power conversion device 1 of the second embodiment is similar to that of the first embodiment. The single-phase two-wire operation of the power conversion device 1 will be described.

When power conversion device 1 performs the single-phase two-wire operation, control circuit 35 always turns off second bidirectional switch BD2. That is, control circuit 35 does not drive switching element 11 and switching element 12, and switching element 11 and switching element 12 are always in the off-state.

Figure 41:
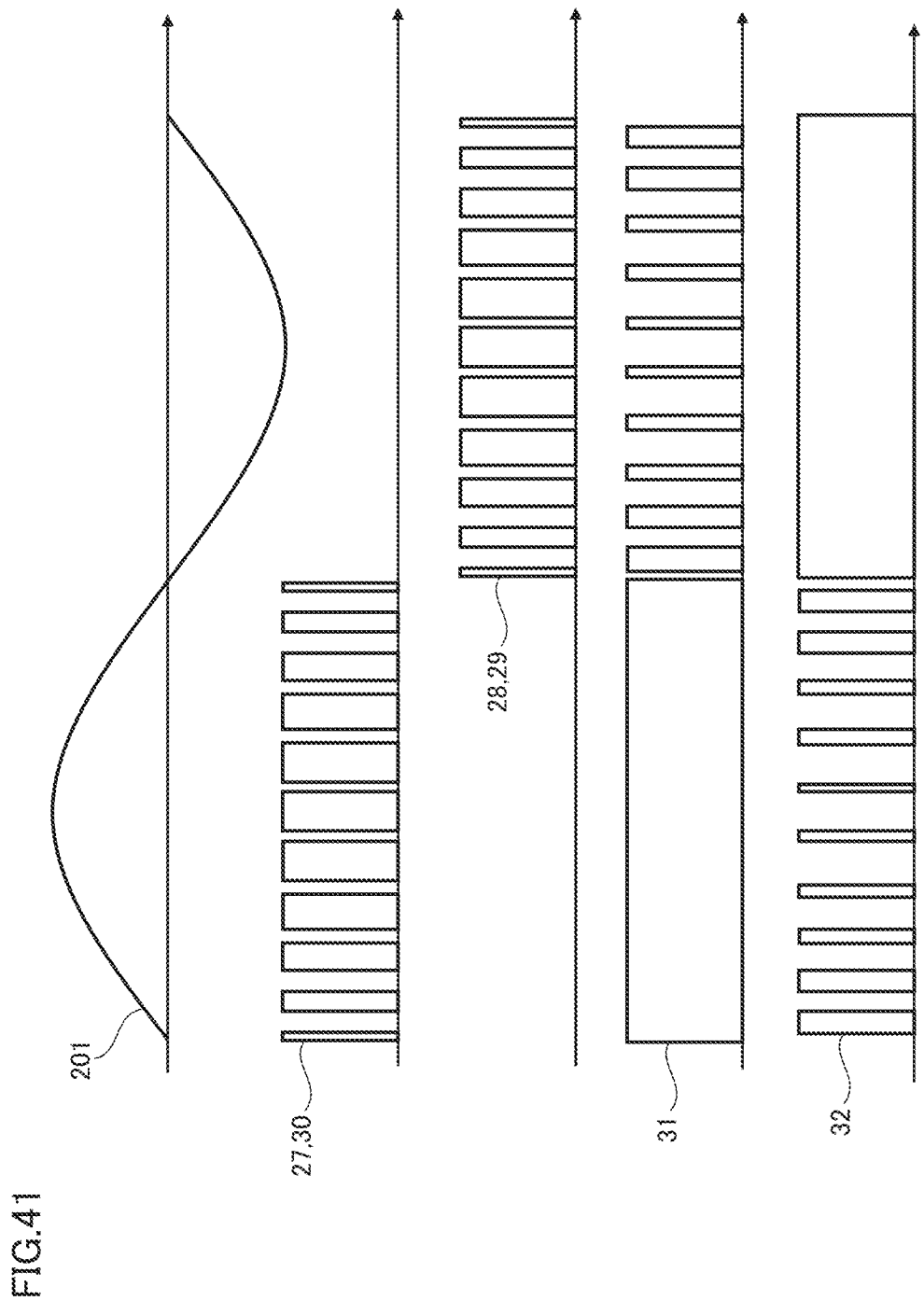
FIG. 41 is a view illustrating an AC power command value 201 and drive signals 27 to 32 during the single-phase two-wire operation of the power conversion device 1 of the second embodiment.

FIG. 41 is a view illustrating an AC power command value 201 and drive signal 27 to 32 during the single-phase two-wire operation of power conversion device 1 of the second embodiment.

FIG. 41 illustrates AC power command value 201, drive signals 27, 30 of switching elements 5, 8, drive signals 28, 29 of switching elements 6 and 7, drive signal 31 of switching element 9, and drive signal 32 of switching element 10. Drive signals 27 to 32 are a binary of the high level or the low level.

When AC power command value 201 is positive, the operation is as follows.

Switching elements 5, 8, 10 perform the switching. At this point, the switching operation of switching element 10 is complementary to the switching operation of switching elements 5, 8. Switching elements 6, 7 are always in the off-state. Switching element 9 is always in an on-state.

When AC power command value 201 is negative, the operation is as follows.

Switching elements 6, 7, 9 perform the switching. At this point, the switching operation of switching element 9 is complementary to the switching operation of switching elements 6, 7. Switching elements 5, 8 are always in the off-state. Switching element 10 is always in the on-state.

In the above-described complementary operation, on-timing of one switching element and off-timing of the other switching element are set so as not to be completely the same. This is to avoid generation of the short-circuit state of DC power supply 2.

During the single-phase two-wire operation of power conversion device 1, for example, control circuit 35 controls the switching of switching element 5 to 10 such that the current flowing through reactor 13 becomes a command value.

Control circuit 35 may control the switching of switching element 5 to 10 such that a sum of the voltage at capacitor 15 and the voltage at capacitor 16 becomes the command value. At this point, an instantaneous value or an effective value may be used as the detected current flowing through reactor 13, the detected voltage at capacitor 15, and the detected voltage at capacitor 16.

(B-1) AC voltage is Positive and AC Current is Positive

When the AC voltage is positive, the voltage at the first terminal of capacitor 15 is positive, the voltage at the second terminal of capacitor 15 is negative, the voltage at the second terminal of capacitor 16 is positive, and the voltage at the first terminal of capacitor 16 is negative. When the alternating current is positive, the current flows from the first terminal to the second terminal of reactor 13.

At this point, switching elements 5, 8, 10 perform the switching operation, switching elements 6, 7 are always in the off-state, and switching element 9 is always in the on-state. The switching operation of switching element 10 is complementary to the switching operation of switching elements 5, 8. Switching elements 11, 12 are always in the off-state.

(B-1-1) Power Transmission Period

First, power conversion device 1 starts the power transmission period.

Figure 42:
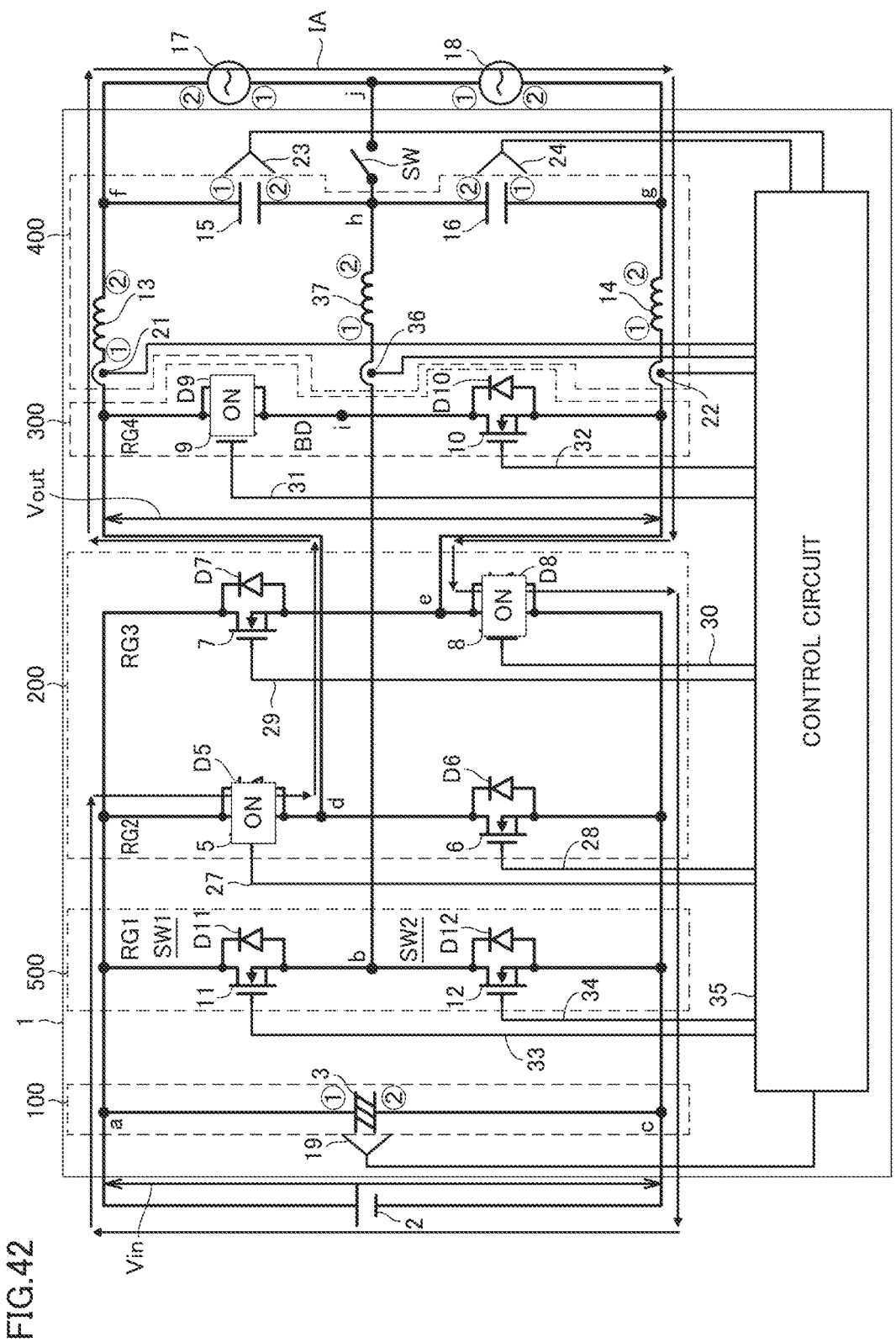
FIG. 42 is a view illustrating a current path during the power transmission period when the AC voltage is positive and the AC current is positive in the single-phase two-wire operation.

FIG. 42 is a view illustrating the current path during the power transmission period when the AC voltage is positive and the AC current is positive in the single-phase two-wire operation.

In the power transmission period, switching elements 5, 8 are turned on by the switching, switching elements 6, 7 are always in the off-state, switching element 9 is always in the on-state, and switching element 10 is turned off by the switching.

In the power transmission period, current IA flows through DC power supply 2, switching element 5, reactor 13, AC power supply 17, AC power supply 18, reactor 14, switching element 8, and DC power supply 2 in this order. Current IA passes through DC power supply 2, and there is also current passing through capacitor 3. Current IA passes through AC power supply 17 and AC power supply 18, and there is also current passing through capacitor 15 and capacitor 16. The same applies to the following.

(B-1-2) Dead Time Period

Subsequently, power conversion device 1 shifts to the dead time period.

Figure 43:
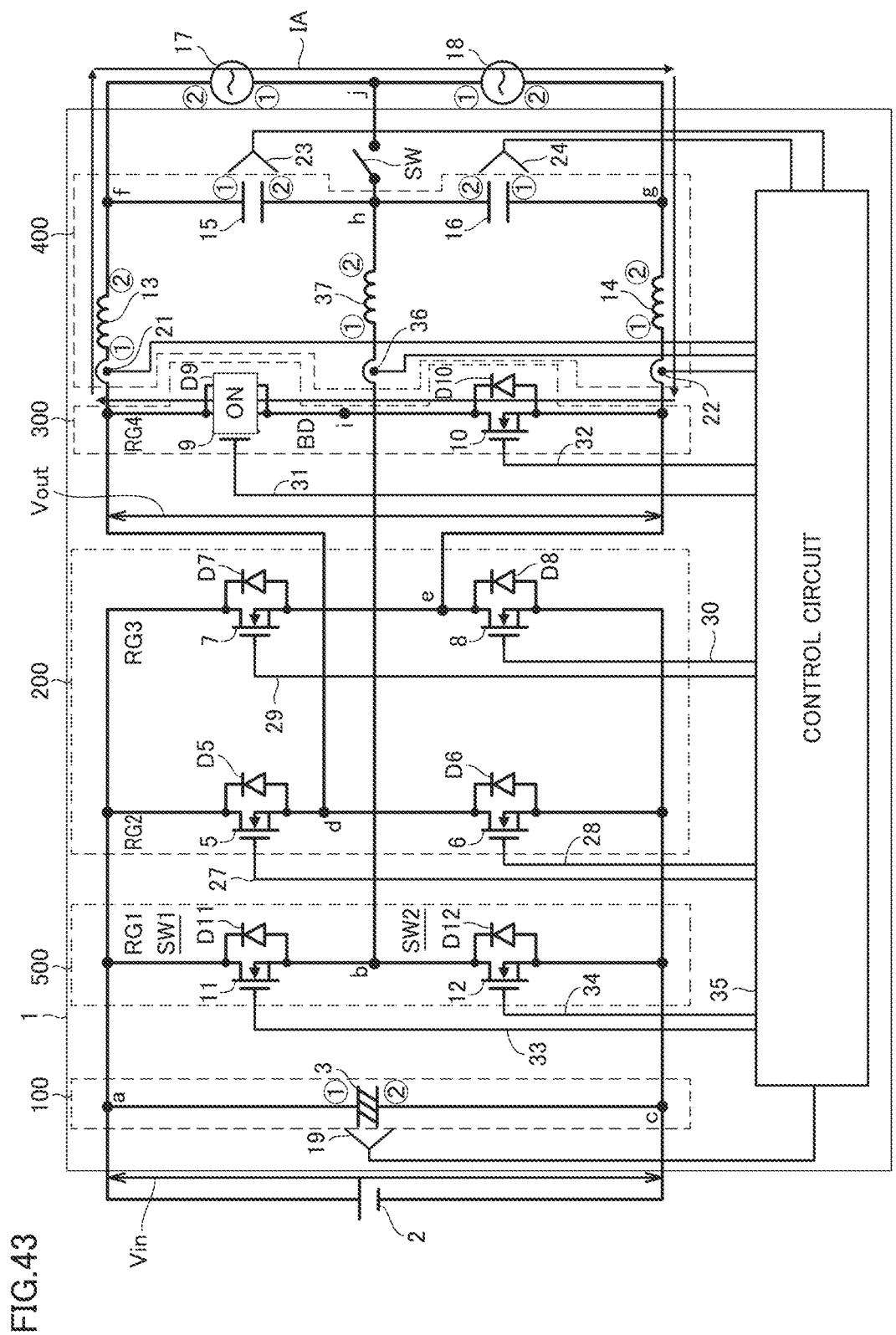
FIG. 43 is a view illustrating a current path during the dead time period when the AC voltage is positive and the AC current is positive in the single-phase two-wire operation.

FIG. 43 is a view illustrating the current path during the dead time period when the AC voltage is positive and the AC current is positive in the single-phase two-wire operation.

In the dead time period, switching elements 5, 8 are switched from on to off by the switching, switching elements 6, 7 are always in the off-state, switching element 9 is always in the on-state, and switching element 10 is maintained in the off-state.

During the dead time period, current IA flows through reactor 13, AC power supply 17, AC power supply 18, reactor 14, diode D10, switching element 9, and reactor 13 in this order.

(B-1-3) Flow Back Period

Subsequently, power conversion device 1 shifts to the flow back period.

Figure 44:
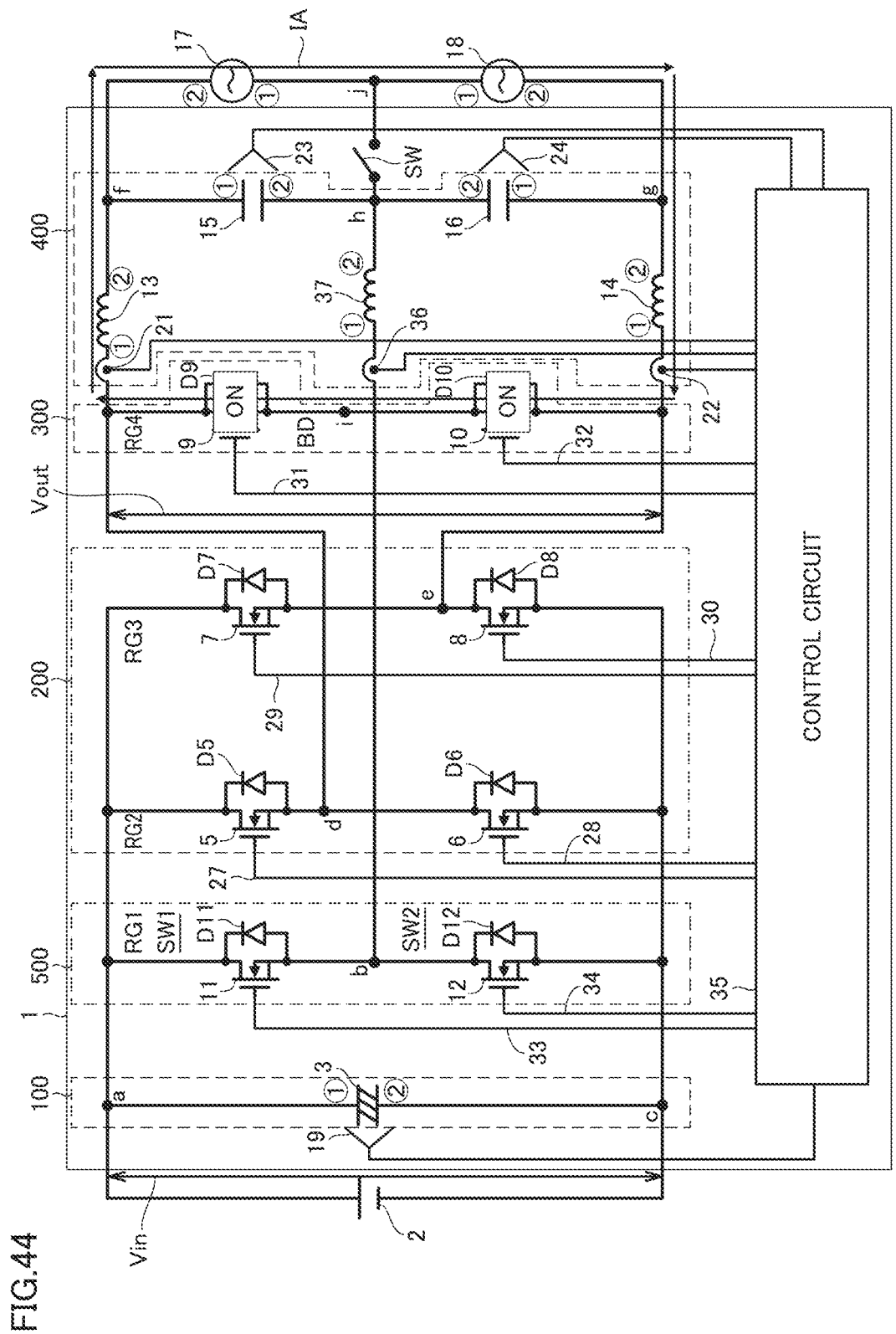
FIG. 44 is a view illustrating a current path at the time of the flow back when the AC voltage is positive and the AC current is positive in the single-phase two-wire operation.

FIG. 44 is a diagram illustrating the current path at the time of flow back when the AC voltage is positive and the AC current is positive in the single-phase two-wire operation.

During the flow back period, switching elements 5, 8 are maintained in the off-state, switching elements 6, 7 are always in the off-state, switching element 9 is always in the on-state, and switching element 10 is switched from off to on by the switching operation.

During the flow back period, current IA flows through reactor 13, AC power supply 17, AC power supply 18, reactor 14, switching element 10, switching element 9, and reactor 13 in this order.

The current path in the flow back period is the same as the current path in the dead time period, and the following characteristic is obtained when the switching element is the MOSFET. When switching element 10 is switched from off to on, a current flowing portion is changed from the diode to the MOSFET. When the voltage drop during passing through the MOSFET is smaller than the voltage drop during passing through the diode, the power loss in the flow back period is smaller than the power loss in the dead time period.

(B-1-4) Dead Time Period

Subsequently, power conversion device 1 shifts to the dead time period.

In the dead time period, switching element 10 is switched from on to off by the switching, switching elements 6, 7 are always in the off-state, switching element 9 is always in the on-state, and switching elements 5, 8 are maintained in the off-state.

In the dead time period, power conversion device 1 operates similarly to the dead time period (B-1-2) described above.

(B-1-5) Power Transmission Period

Subsequently, power conversion device 1 returns to the power transmission period.

In the power transmission period, switching element 5 and switching element 8 are switched from off to on by the switching.

In the power transmission period, power conversion device 1 operates similarly to the power transmission period of (B-1-1) described above.

In this way, it can be seen that only two switching elements pass through the current path. In a neutral point grounding three-level power conversion device, four switching elements are passed through in the flow back period during which the power transmission is not performed, whereas the number of passing elements of the switching elements is small in the second embodiment.

(B-2) AC Voltage is Negative and AC Current is Negative

When the AC voltage is negative, the voltage at the first terminal of capacitor 15 is negative, the voltage at the second terminal of capacitor 15 is positive, the voltage at the first terminal of capacitor 16 is positive, and the voltage at the second terminal of capacitor 16 is negative.

When the alternating current is negative, the current flows from the second terminal to the first terminal of reactor 13. At this point, switching elements 6, 7, 9 perform switching operations, switching elements 5, 8 are always in the off-state, and switching element 10 is always in the on-state. The switching operation of switching element 9 is complementary to the switching operation of switching elements 6, 7. Switching elements 11, 12 are always in the off-state.

(B-2-1) Power Transmission Period

First, power conversion device 1 starts the power transmission period.

Figure 45:
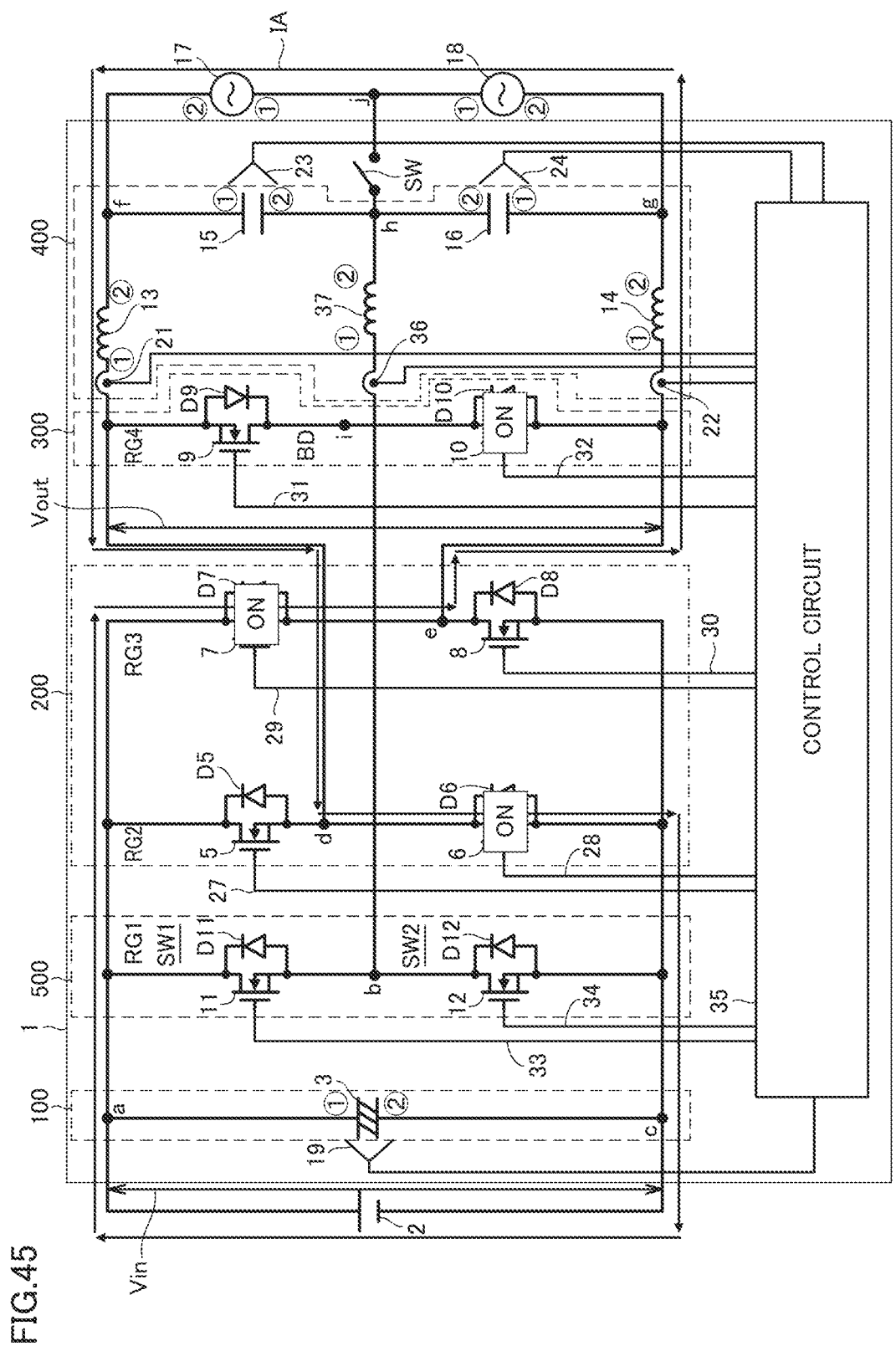
FIG. 45 is a view illustrating the current path during the power transmission period when the AC voltage is negative and the AC current is negative in the single-phase two-wire operation.

FIG. 45 is a view illustrating the current path during the power transmission period when the AC voltage is negative and the AC current is negative in the single-phase two-wire operation.

In the power transmission period, switching elements 6, 7 are turned on by the switching, switching elements 5, 8 are always in the off-state, switching element 10 is always in the on-state, and switching element 9 is turned off by the switching.

In the power transmission period, current IA flows through DC power supply 2, switching element 7, reactor 14, AC power supply 18, AC power supply 17, reactor 13, switching element 6, and DC power supply 2 in this order.

(B-2-2) Dead Time Period

Subsequently, power conversion device 1 shifts to the dead time period.

Figure 46:
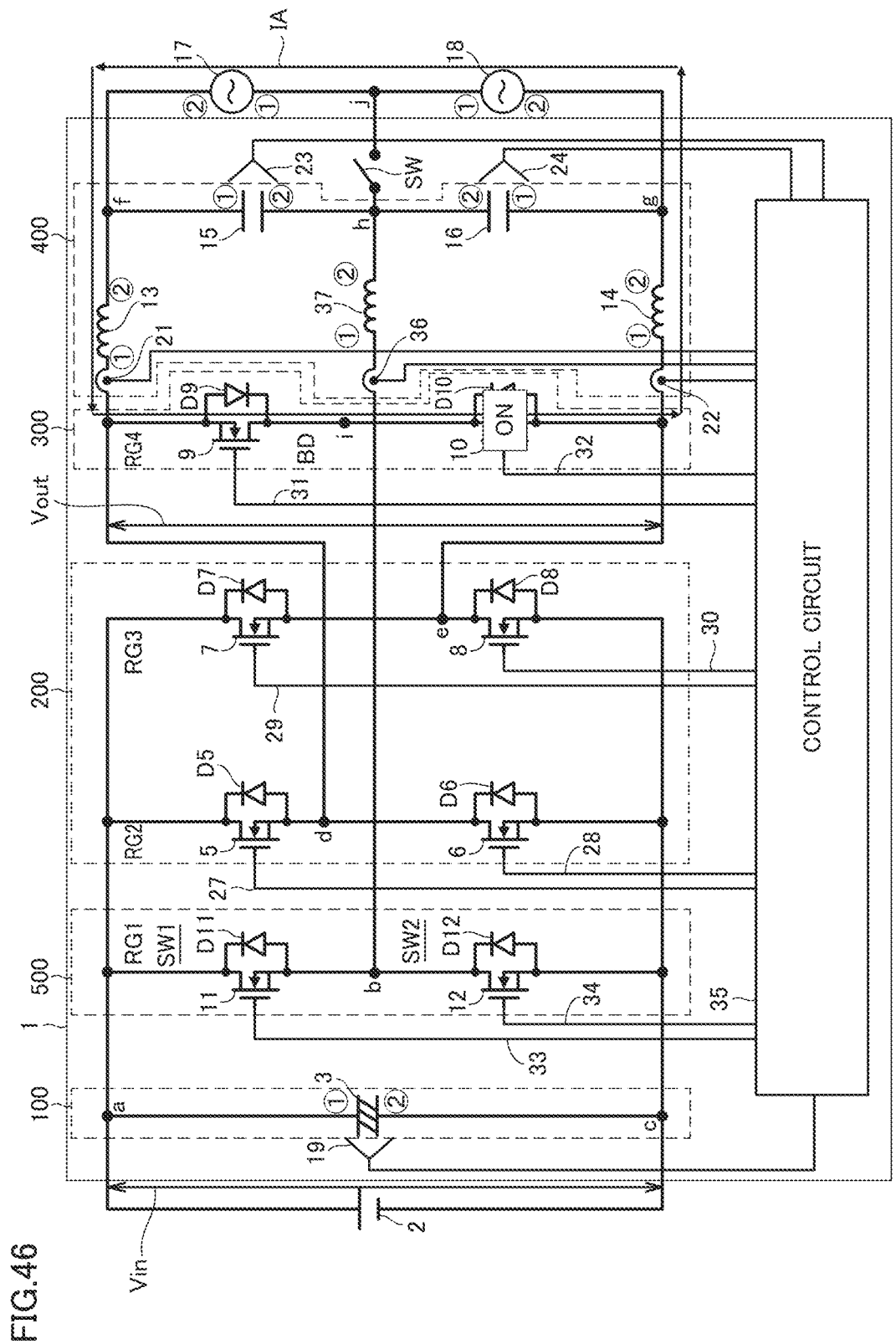
FIG. 46 is a view illustrating the current path during the dead time period when the AC voltage is negative and the AC current is negative in the single-phase two-wire operation.

FIG. 46 is a view illustrating the current path during the dead time period when the AC voltage is negative and the AC current is negative in the single-phase two-wire operation.

In the dead time period, switching elements 6, 7 are switched from on to off by the switching, switching elements 5, 8 are always in the off-state, switching element 10 is always in the on-state, and switching element 9 is maintained in the off-state.

During the dead time period, current IA flows through reactor 14, AC power supply 18, AC power supply 17, reactor 13, diode D9, switching element 10, and reactor 14 in this order.

(B-2-3) Flow Back Period

Subsequently, power conversion device 1 shifts to the flow back period.

Figure 47:
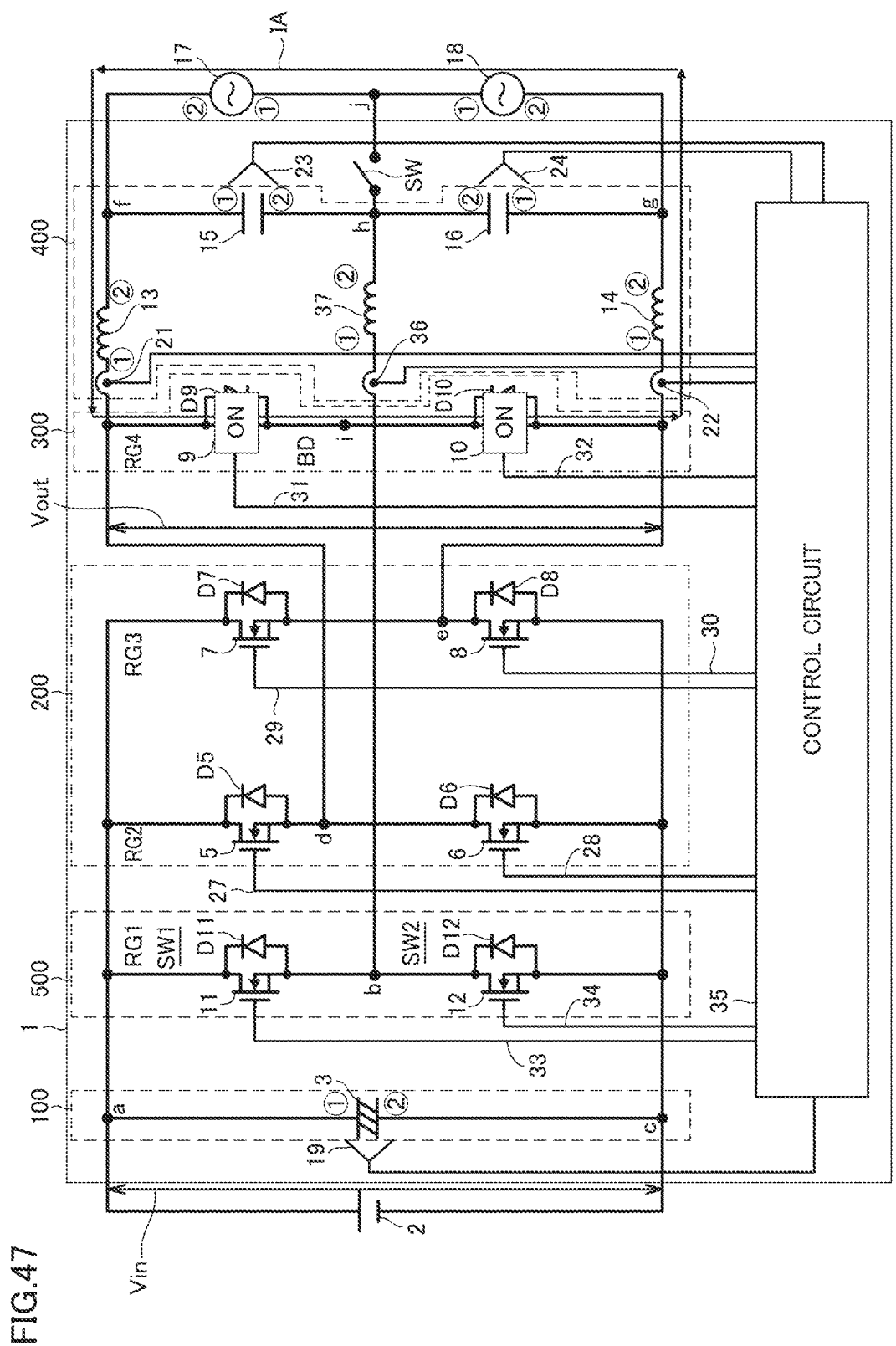
FIG. 47 is a view illustrating the current path during the flow back period when the AC voltage is negative and the AC current is negative in the single-phase two-wire operation.

FIG. 47 is a view illustrating the current path during the flow back period when the AC voltage is negative and the AC current is negative in the single-phase two-wire operation.

During the flow back period, switching elements 6, 7 are maintained in the off-state, switching elements 5, 8 are always in the off-state, switching element 10 is always in the on-state, and switching element 9 is switched from off to on by the switching operation.

During the flow back period, current IA flows through reactor 14, AC power supply 18, AC power supply 17, reactor 13, switching element 9, switching element 10, and reactor 14 in this order.

(B-2-4) Dead Time Period

Subsequently, power conversion device 1 shifts to the dead time period.

In the dead time period, switching element 9 is switched from on to off by the switching, switching elements 5, 8 are always in the off-state, switching element 10 is always in the on-state, and switching elements 6, 7 are maintained in the off-state.

In the dead time period, power conversion device 1 operates similarly to the dead time period (B-2-2) described above.

(B-2-5) Power Transmission Period

Subsequently, power conversion device 1 returns to the power transmission period.

In the power transmission period, switching elements 6, 7 are switched from off to on by the switching.

In the power transmission period, power conversion device 1 operates similarly to the power transmission period of (B-2-1) described above.

As described above, according to the second embodiment, the single-phase two-wire operation can be executed in addition to the single-phase three-wire operation similar to that of the first embodiment.

Third Embodiment

FIG. 48 is a view illustrating magnitude of the power of AC power supply 17 and the power of AC power supply 18, a sign of the AC voltage, a sign of the AC current, and a path of differential current IB for each on and off of switching element 11 and switching element 12.

As illustrated in FIG. 48, when the AC voltage is positive, the AC current is positive, and the power of AC power supply 17 is larger than the power of AC power supply 18, on-time of switching element 12 needs to be lengthened in order to lengthen the period of the power transmission, and the on-time of switching element 12 needs to be shortened in order to shorten the period of the power transmission.

When the AC voltage is positive, the AC current is positive, and the power of AC power supply 17 is smaller than the power of AC power supply 18, the on-time of switching element 11 needs to be lengthened in order to lengthen the period of the power transmission, and the on-time of switching element 11 needs to be shortened in order to shorten the period of the power transmission.

When the AC voltage is negative, the AC current is negative, and the power of AC power supply 17 is larger than the power of AC power supply 18, the on-time of switching element 11 needs to be lengthened in order to lengthen the period of the power transmission, and the on-time of switching element 11 needs to be shortened in order to shorten the period of the power transmission.

When the AC voltage is negative, the AC current is negative, and the power of AC power supply 17 is larger than the power of AC power supply 18, the on-time of switching element 12 needs to be lengthened in order to lengthen the period of the power transmission, and the on-time of switching element 12 needs to be shortened in order to shorten the period of the power transmission.

That is, the on-time of switching element 11 or switching element 12 needs to be controlled so as to be longer than 50% or shorter than 50% depending on whether the AC current is positive or negative, the AC voltage is positive or negative, the power of AC power supply 17 is larger or smaller than the power of AC power supply 18, and the amount of the power to be transmitted is large or small. A method for setting the on-time of switching elements 11, 12 such that the voltage of capacitor 15, the voltage of capacitor 16, the current flowing through reactor 13, or the current flowing through reactor 14 becomes the command value will be described below.

Figure 49:
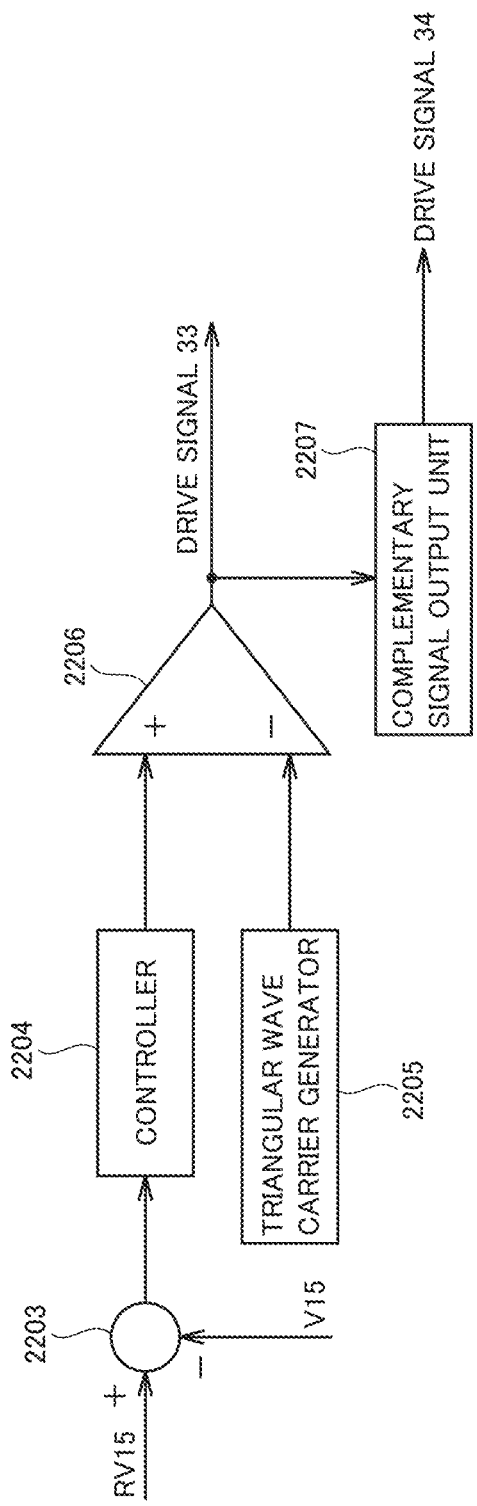
FIG. 49 is a view illustrating a control block that generates the drive signals 33, 34 of the switching elements 11, 12 such that voltage at a capacitor 15 becomes a command value.

FIG. 49 is a view illustrating a control block that generates drive signals 33, 34 of switching elements 11, 12 such that voltage at capacitor 15 becomes the command value. This control block is included in control circuit 35.

The control block includes a subtractor 2203, a controller 2204, a triangular wave carrier generator 2205, a comparator 2206, and a complementary signal output unit 2207.

Subtractor 2203 subtracts a detected value V15 of the voltage at capacitor 15 from a command value RV15 of the voltage at capacitor 15. At this point, voltage detected value V15 is detected by voltage detector 23.

Controller 2204 receives the output of subtractor 2203. For example, controller 2204 performs proportional-integral control, proportional control, or integral control on the output of subtractor 2203.

Triangular wave carrier generator 2205 outputs a triangular wave.

Comparator 2206 compares the output of controller 2204 with a triangular wave carrier, and outputs a comparison result as drive signal 33 of switching element 11.

Complementary signal output unit 2207 adds the dead time to drive signal 33, and then outputs the complementary signal as drive signal 34 of switching element 12.

Figure 50:
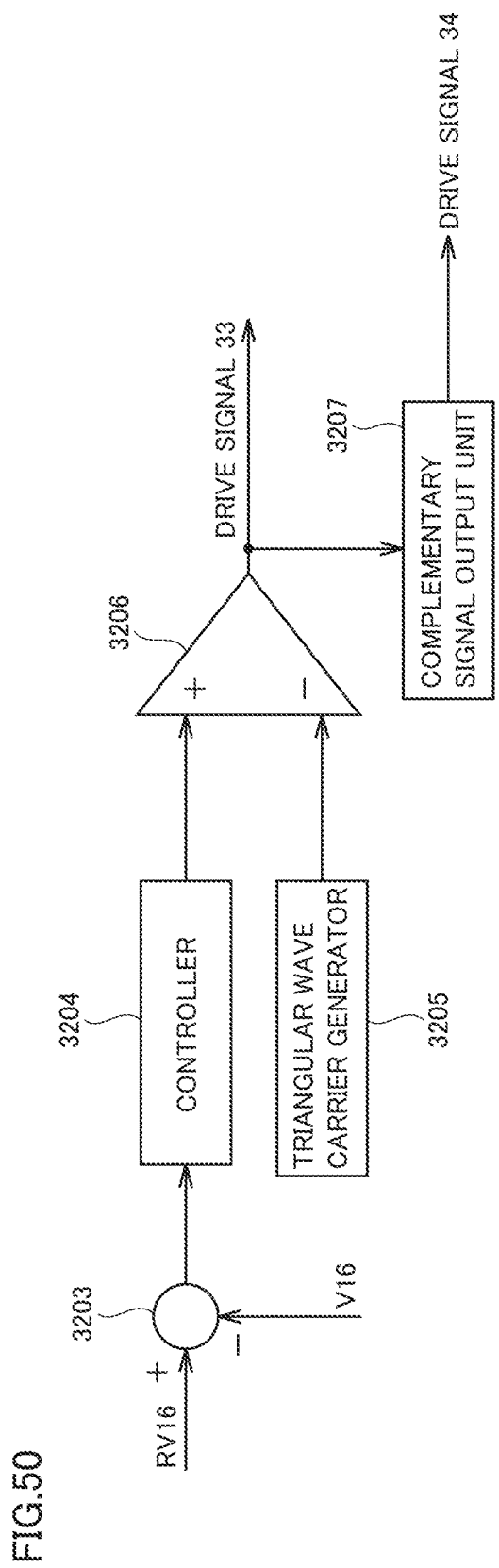
FIG. 50 is a view illustrating the control block that generates the drive signals 33, 34 of the switching elements 11, 12 such that voltage at a capacitor 16 becomes the command value.

FIG. 50 is a view illustrating a control block that generates drive signals 33, 34 of switching elements 11, 12 such that voltage at capacitor 16 becomes the command value. This control block is included in control circuit 35.

The control block includes a subtractor 3203, a controller 3204, a triangular wave carrier generator 3205, a comparator 3206, and a complementary signal output unit 3207.

Subtractor 3203 subtracts a detected value V16 of the voltage at capacitor 16 from a command value RV16 of the voltage at capacitor 16. At this point, voltage detected value V16 is detected by voltage detector 24.

Controller 3204 receives the output of subtractor 3203. For example, controller 3204 performs proportional-integral control, proportional control, or integral control on the output of subtractor 3203.

Triangular wave carrier generator 3205 outputs the triangular wave.

Comparator 3206 compares the output of controller 3204 with a triangular wave carrier, and outputs a comparison result as drive signal 33 of switching element 11.

Complementary signal output unit 3207 adds the dead time to drive signal 33, and then outputs the complementary signal as drive signal 34 of switching element 12.

Figure 51:
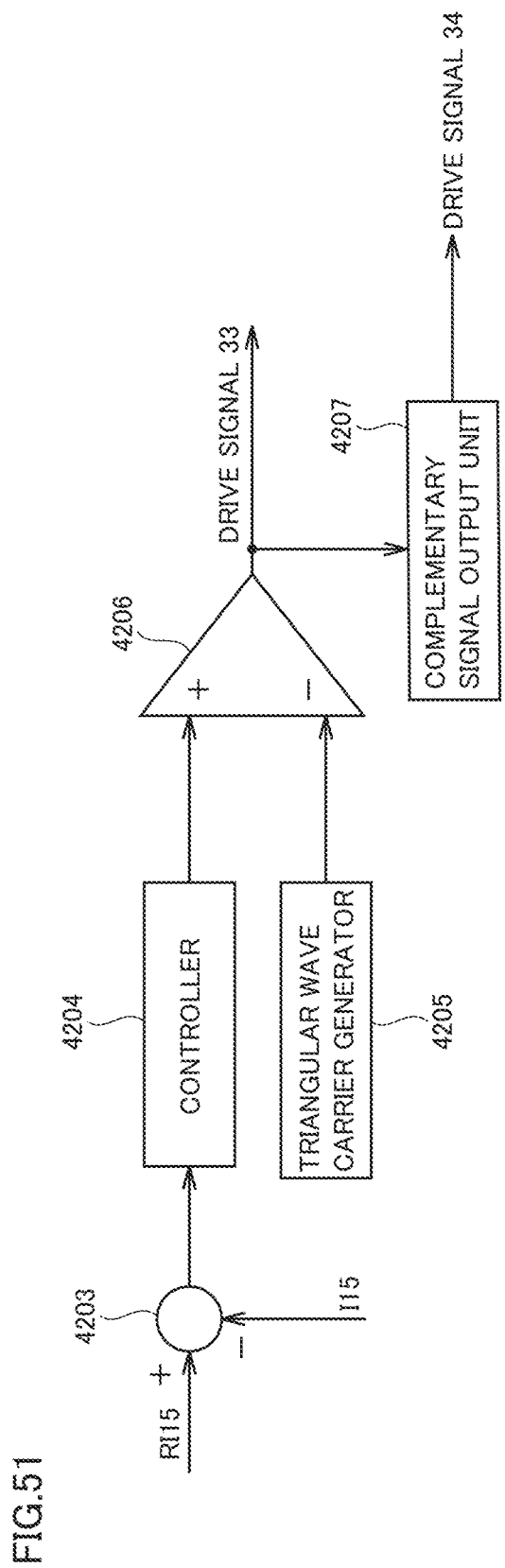
FIG. 51 is a view illustrating the control block that generates the drive signals 33, 34 of the switching elements 11, 12 such that current flowing through a reactor 13 becomes the command value.

FIG. 51 is a view illustrating the control block that generates drive signals 33, 34 of switching elements 11, 12 such that current flowing through reactor 13 becomes the command value. This control block is included in control circuit 35.

The control block includes a subtractor 4203, a controller 4204, a triangular wave carrier generator 4205, a comparator 4206, and a complementary signal output unit 4207.

Subtractor 4203 subtracts a detected value I13 of the current flowing through reactor 13 from a command value RI13 of the current flowing through reactor 13. At this point, detected value I13 of the current is detected by current detector 21.

Controller 4204 receives the output of subtractor 4203. For example, controller 4204 performs proportional-integral control, proportional control, or integral control on the output of subtractor 4203.

The triangular wave carrier generator 4205 outputs the triangular wave.

Comparator 4206 compares the output of controller 4204 with a triangular wave carrier, and outputs a comparison result as drive signal 33 of switching element 11.

Complementary signal output unit 4207 adds the dead time to drive signal 33, and then outputs the complementary signal as drive signal 34 of switching element 12.

Figure 52:
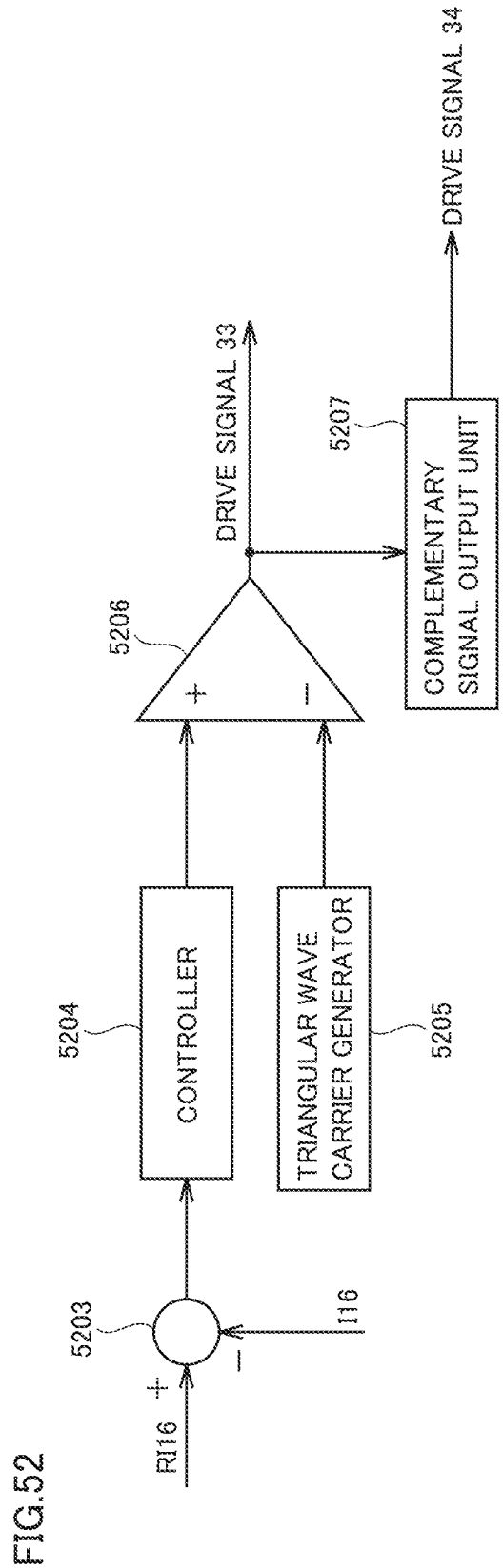
FIG. 52 is a view illustrating the control block that generates the drive signals 33, 34 of the switching elements 11, 12 such that current flowing through a reactor 14 becomes the command value.

FIG. 52 is a view illustrating the control block that generates drive signals 33, 34 of switching elements 11, 12 such that current flowing through reactor 14 becomes the command value. This control block is included in control circuit 35.

The control block includes a subtractor 5203, a controller 5204, a triangular wave carrier generator 5205, a comparator 5206, and a complementary signal output unit 5207.

Subtractor 5203 subtracts a detected value I14 of the current flowing through reactor 14 from a command value RI14 of the current flowing through reactor 14. At this point, detected value I14 of the current is detected by current detector 22.

Controller 5204 receives the output of subtractor 5203. For example, controller 5204 performs proportional-integral control, proportional control, or integral control on the output of subtractor 5203.

Triangular wave carrier generator 5205 outputs the triangular wave.

Comparator 5206 compares the output of controller 5204 with a triangular wave carrier, and outputs a comparison result as drive signal 33 of switching element 11.

Complementary signal output unit 5207 adds the dead time to drive signal 33, and then outputs the complementary signal as drive signal 34 of switching element 12.

Figure 53:
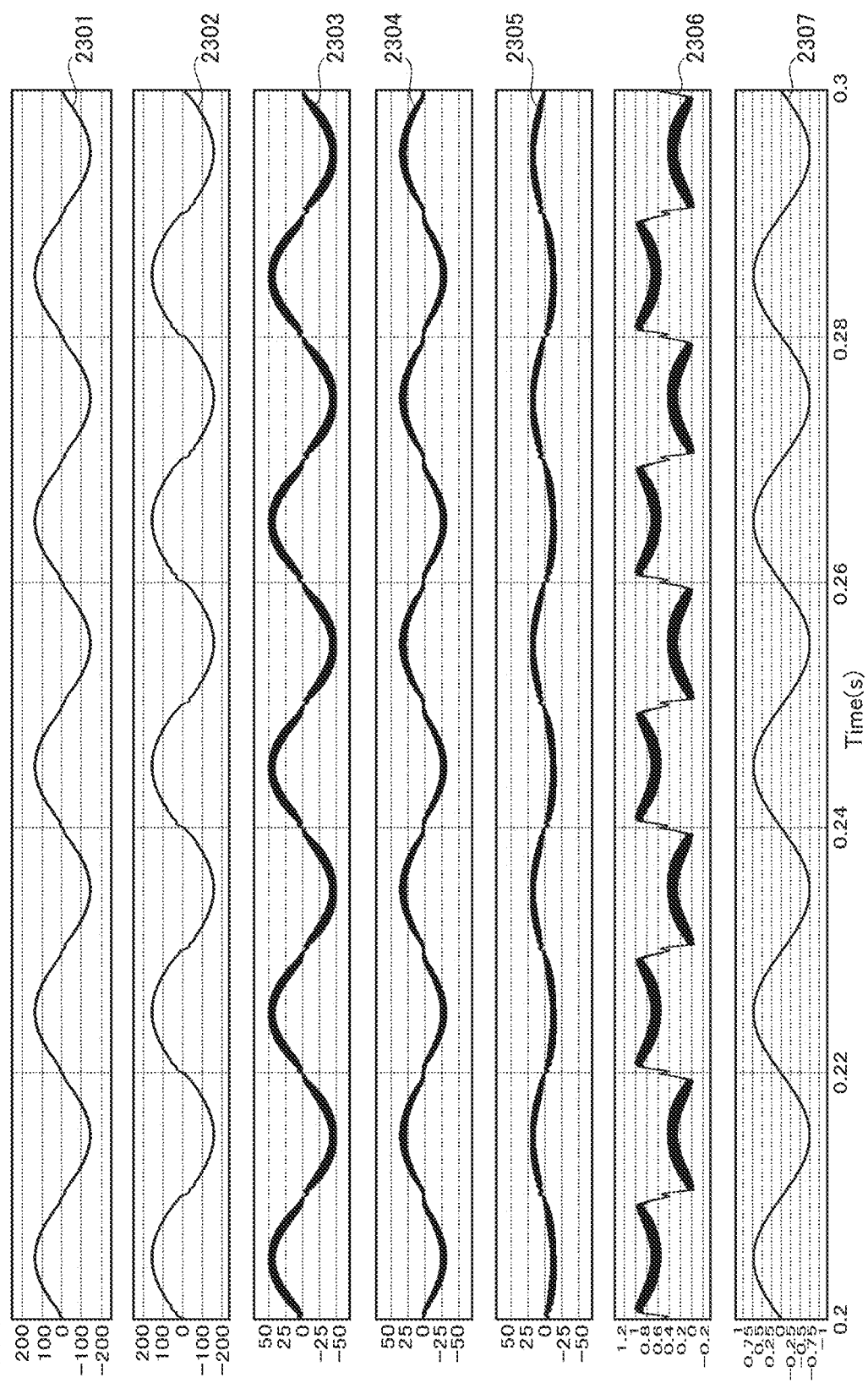
FIG. 53 is a view illustrating an example of a simulation result.

FIG. 53 is a view illustrating an example of a simulation result.

FIG. 53 illustrates a plurality of waveforms when the voltage at capacitor 15 (=voltage at AC power supply 17) is controlled so as to be the command value in the case where the power of AC power supply 17 is larger than the power of AC power supply 18.

Specifically, a voltage waveform 2301 of AC power supply 17, a voltage waveform 2302 of AC power supply 18, current I3 flowing through reactor 13, current I14 flowing through reactor 14, differential current IB between current I13 and current I14, a modulation factor MP of switching element 12, and control command values 2307 of switching element 5 to 10 are illustrated.

As illustrated in FIG. 48, in the period in which the power of AC power supply 17 is larger than the power of AC power supply 18, voltage waveform 2301 of AC power supply 17 is positive, and current I13 of reactor 13 is positive, the power can be transmitted by differential current IB only in the period in which switching element 12 is turned on. As illustrated in FIG. 53, the control block in FIG. 49 sets such that modulation factor MP of switching element 12 exceeds 50% in this period. That is, in this period, the power transmission period is set to be longer by setting such that the on-time of switching element 12 is longer than the on-time of switching element 11.

On the other hand, as illustrated in FIG. 48, in the period in which the power of AC power supply 17 is larger than the power of AC power supply 18, voltage waveform 2301 of AC power supply 17 is negative, and current I13 of reactor 13 is negative, the power can be transmitted by differential current IB only in the period in which switching element 11 is turned on. As illustrated in FIG. 53, the control block in FIG. 49 sets such that modulation factor MP of switching element 12 is less than 50% in this period. That is, in this period, the power transmission period is set to be longer by setting such that the on-time of switching element 11 is longer than the on-time of switching element 12.

Figure 54:
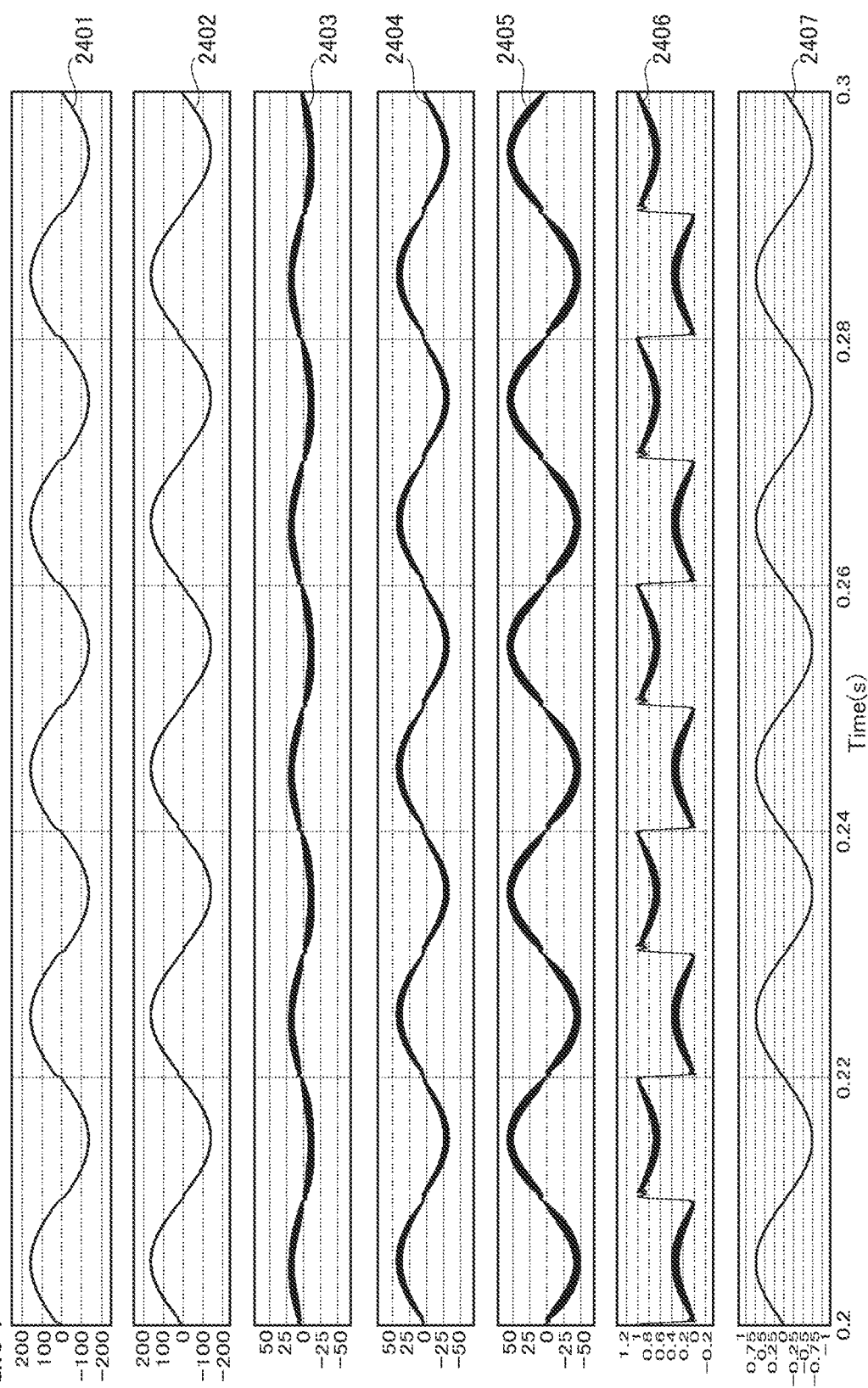
FIG. 54 is a view illustrating another example of the simulation result.

FIG. 54 is a view illustrating another example of the simulation result.

FIG. 54 illustrates a plurality of waveforms when the voltage at capacitor 15 (=voltage at AC power supply 17) is controlled so as to be a designated value in the case where the power of AC power supply 18 is larger than the power of AC power supply 17.

Specifically, a voltage waveform 2301 of AC power supply 17, a voltage waveform 2302 of AC power supply 18, current I3 flowing through reactor 13, current I14 flowing through reactor 14, differential current IB between current I13 and current I14, a modulation factor MP of switching element 12, and control command values 2307 of switching element 5 to 10 are illustrated.

As illustrated in FIG. 48, in the period in which the power of AC power supply 18 is larger than the power of AC power supply 17, voltage waveform 2301 of AC power supply 17 is positive, and current I13 of reactor 13 is positive, the power can be transmitted by differential current IB only in the period in which switching element 11 is turned on. As illustrated in FIG. 54, the control block in FIG. 49 sets such that modulation factor MP of switching element 12 is less than 50% in this period. That is, in this period, the power transmission period is set to be longer by setting such that the on-time of switching element 11 is longer than the on-time of switching element 12.

On the other hand, as illustrated in FIG. 48, in the period in which the power of AC power supply 18 is larger than the power of AC power supply 17, voltage waveform 2301 of AC power supply 17 is negative, and current I13 of reactor 13 is negative, the power can be transmitted by differential current IB only in the period in which switching element 12 is turned on. As illustrated in FIG. 54, the control block in FIG. 49 sets such that modulation factor MP of switching element 12 exceeds 50% in this period. That is, in this period, the power transmission period is set to be longer by setting such that the on-time of switching element 12 is longer than the on-time of switching element 11.

As described above, according to the third embodiment, the three-level power conversion device including the clamp circuit can stably perform the single-phase three-wire operation by setting the ON time of the switching elements 11 and 12.

Fourth Embodiment

Figure 55:
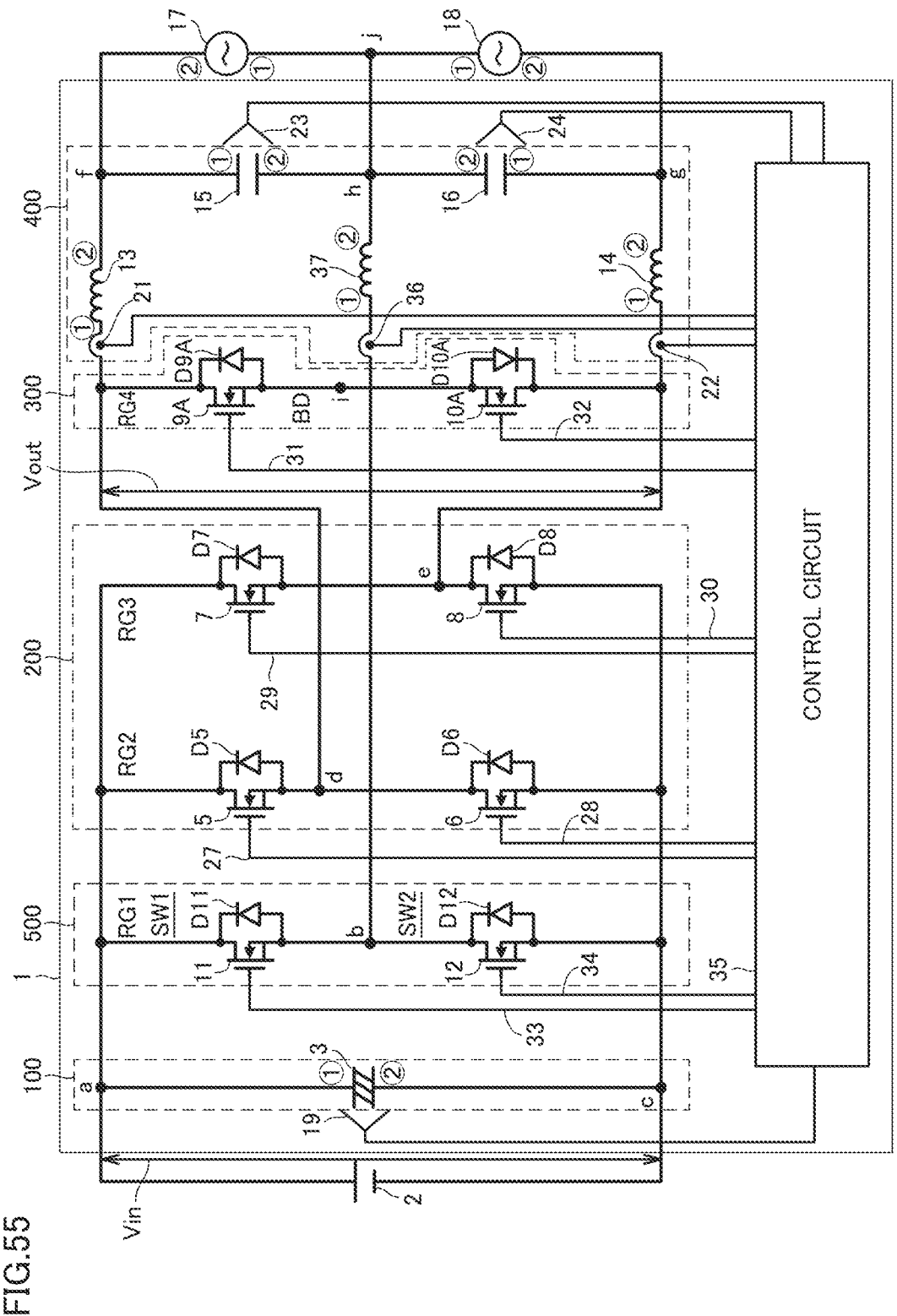
FIG. 55 is a view illustrating a configuration of a power conversion device 1 according to a fourth embodiment.

FIG. 55 is a view illustrating a configuration of a power conversion device 1 according to a fourth embodiment.

Power conversion device 1 of the fourth embodiment is different from power conversion device 1 of the first embodiment in clamp circuit 300.

Clamp circuit 300 includes a fourth leg RG4 including a bidirectional switch BD disposed between node d and node e.

Bidirectional switch BD includes a switching element 9A (fifth switching element), a switching element 10A (sixth switching element), a diode D9A (fifth diode), and a diode D10A (sixth diode). Switching element 9A is disposed between node d and node i. Switching element 10A is disposed between node i and node e. The positive electrode of switching element 9A is connected to node d. The positive electrode of switching element 10A is connected to node e. The negative electrode of switching element 9A and the negative electrode of switching element 10A are connected to node i. Diode D9A is connected in antiparallel to switching element 9A. Diode D10A is connected in antiparallel to switching element 10A.

Switching elements 9A, 10A are configured by MOSFETs or IGBTs. When switching elements 9A, 10A are configured by IGBTs, the positive electrodes of switching elements 9A, 10A correspond to collectors, the negative electrodes correspond to emitters, and the control electrodes correspond to gates. When switching elements 9A, 10A are configured by MOSFETs, diodes D9A, D10A can use parasitic diodes formed in the direction from the source to the drain of the MOSFET.

Also in the fourth embodiment, the effects similar to those of the first embodiment can be obtained.

Fifth Embodiment

Figure 56:
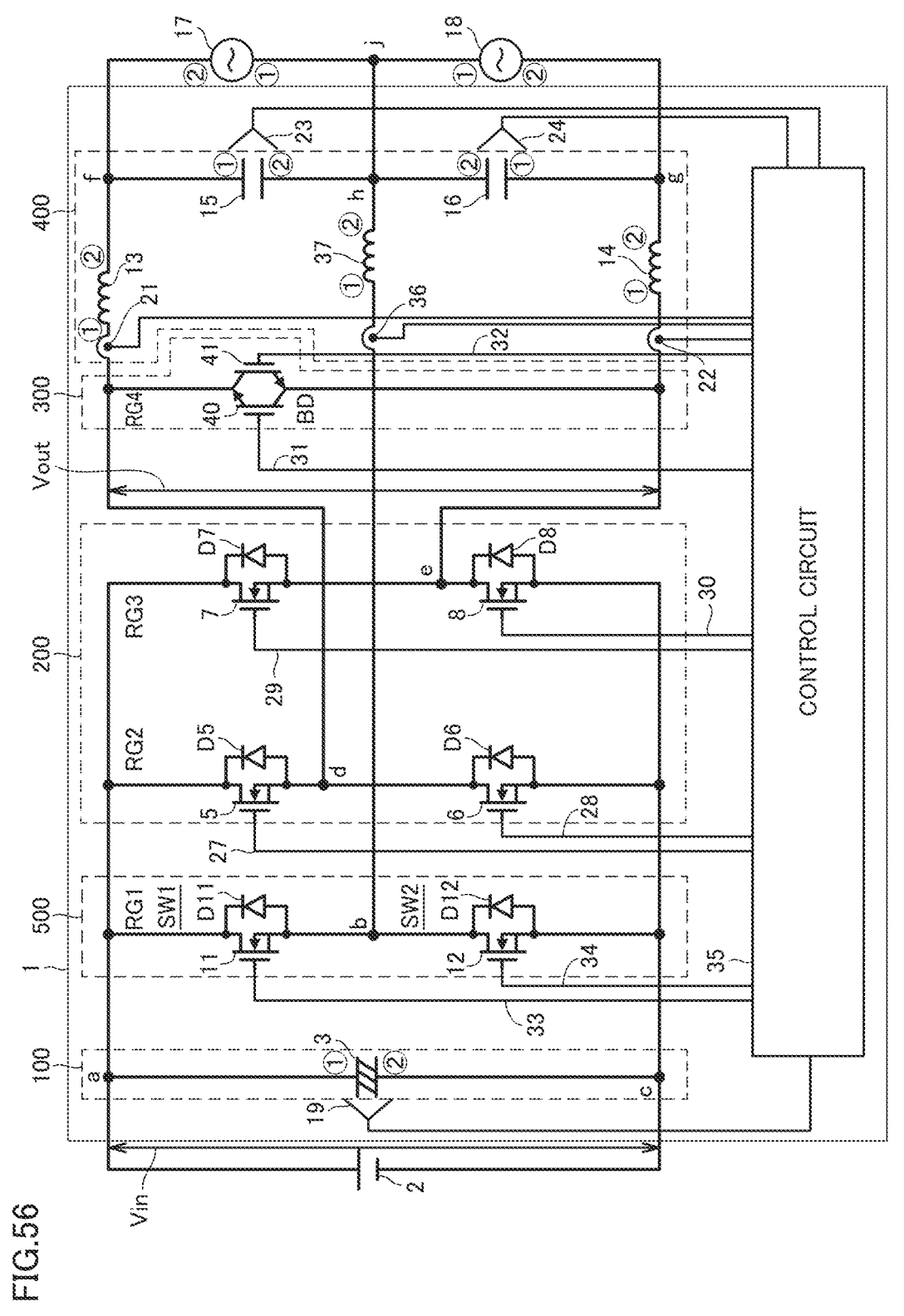

FIG. 56 is a view illustrating a configuration of a power conversion device 1 according to a fifth embodiment.

Power conversion device 1 of the fifth embodiment is different from power conversion device 1 of the first embodiment in clamp circuit 300.

Clamp circuit 300 includes a fourth leg RG4 including a bidirectional switch BD disposed between node d and node e.

Bidirectional switch BD includes a switching element 40 (fifth switching element) and a switching element 41 (sixth switching element) that are connected in antiparallel between node d and node e. Switching element 40 and switching element 41 have withstand voltages in opposite directions.

The positive electrode of switching element 40 and the negative electrode of switching element 41 may be connected to node d, and the negative electrode of switching element 40 and the positive electrode of switching element 41 may be connected to node e. Alternatively, the negative electrode of switching element 40 and the positive electrode of switching element 41 may be connected to node d, and the positive electrode of switching element 40 and the negative electrode of switching element 41 may be connected to node e.

Switching elements 40, 41 is configured by IGBTs having withstand voltages in opposite directions. When switching elements 40, 41 are configured by IGBTs, the positive electrodes of switching elements 40, 41 correspond to collectors, the negative electrodes correspond to emitters, and the control electrodes correspond to gates.

The flow and interruption of the current in both directions can be controlled by switching elements 40, 41.

Also in the fifth embodiment, the effects similar to those of the first embodiment can be obtained.

Sixth Embodiment

Figure 57:
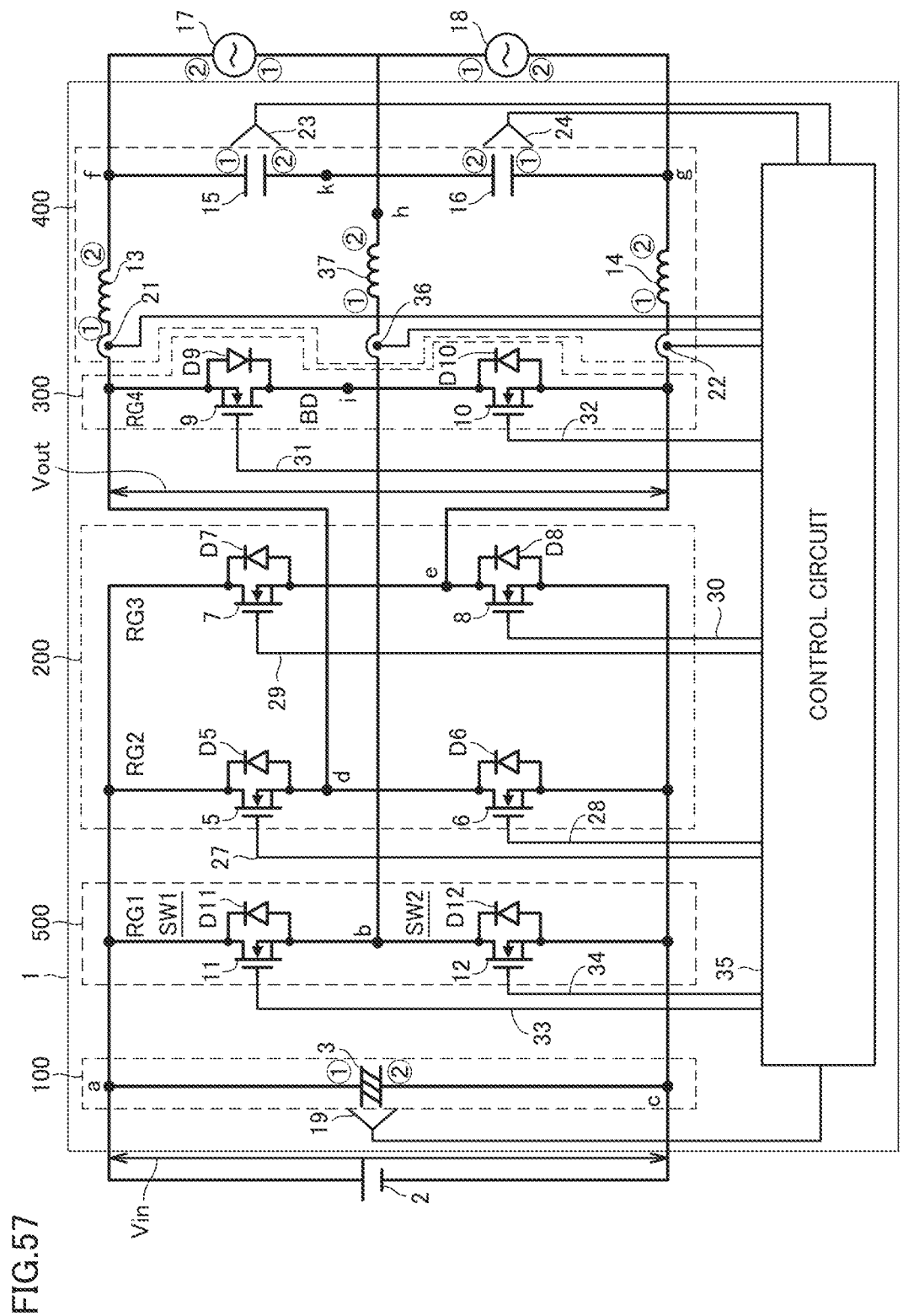
FIG. 57 is a view illustrating a configuration of a power conversion device 1 according to a sixth embodiment.

FIG. 57 is a view illustrating a configuration of a power conversion device 1 according to a sixth embodiment.

Power conversion device 1 of the sixth embodiment is different from power conversion device 1 of the first embodiment in second filter circuit 400.

Second filter circuit 400 includes a capacitor 15 (second capacitor) and a capacitor 16 (third capacitor) that are connected in series between node f and node g. The first terminal of capacitor 15 is connected to node f, and the second terminal of capacitor 15 is connected to a node k (eleventh node). The first terminal of capacitor 16 is connected to node g, and the second terminal of capacitor 16 is connected to node k. Second filter circuit 400 includes reactors 13, 14, 37 similarly to the first embodiment.

Also in the sixth embodiment, the effects similar to those of the first embodiment can be obtained.

Seventh Embodiment

Figure 58:
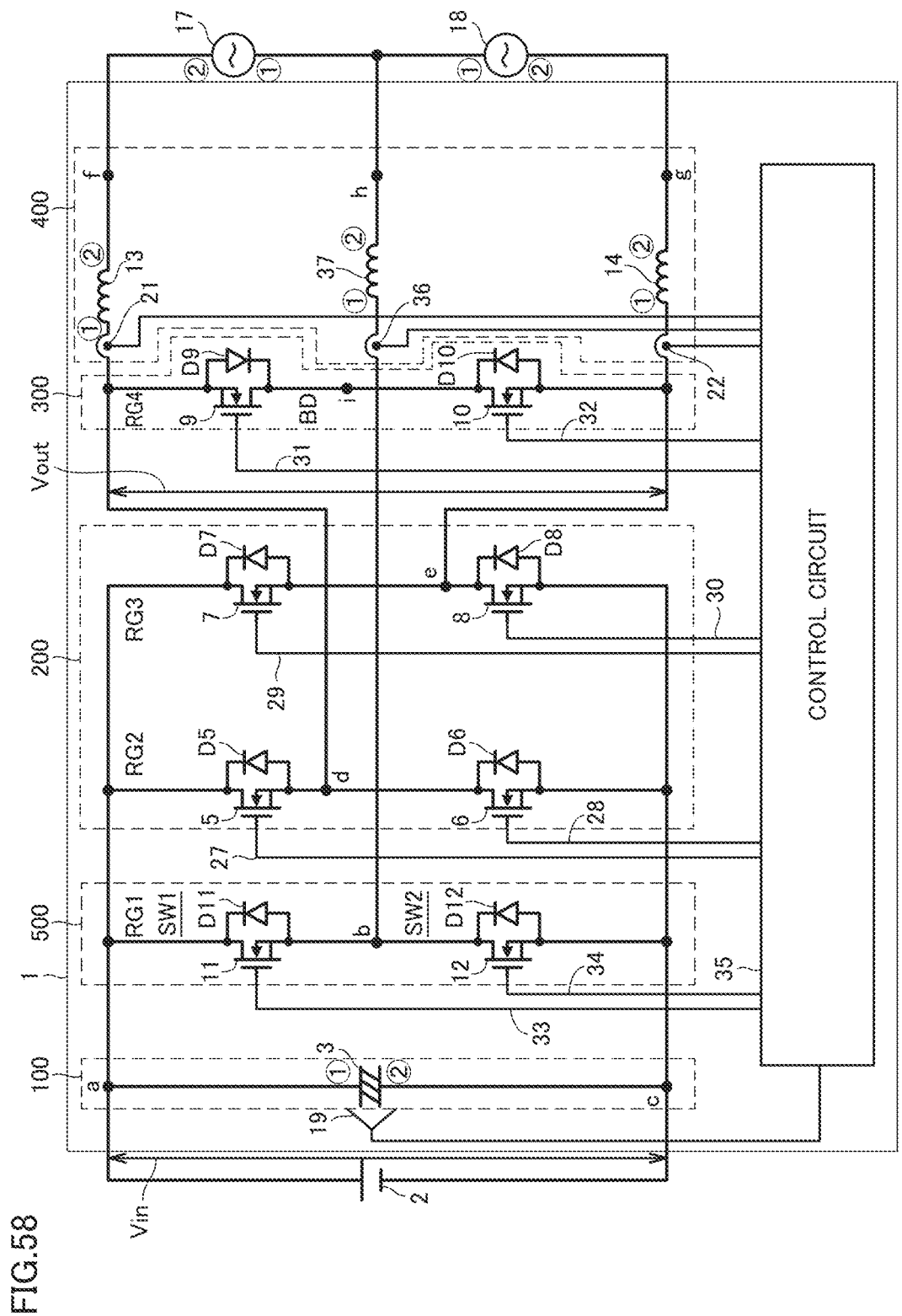
FIG. 58 is a diagram showing a configuration of a power conversion device 1 according to a seventh embodiment.

FIG. 58 is a view illustrating a configuration of a power conversion device 1 according to a seventh embodiment.

Power conversion device 1 of the seventh embodiment is different from power conversion device 1 of the first embodiment in that second filter circuit 400 of power conversion device 1 of the seventh embodiment does not include capacitors 15, 16. Second filter circuit 400 includes reactors 13, 14, 37 similarly to the first embodiment.

Also in the seventh embodiment, the effects similar to those of the first embodiment can be obtained.

Eighth Embodiment

Figure 59:
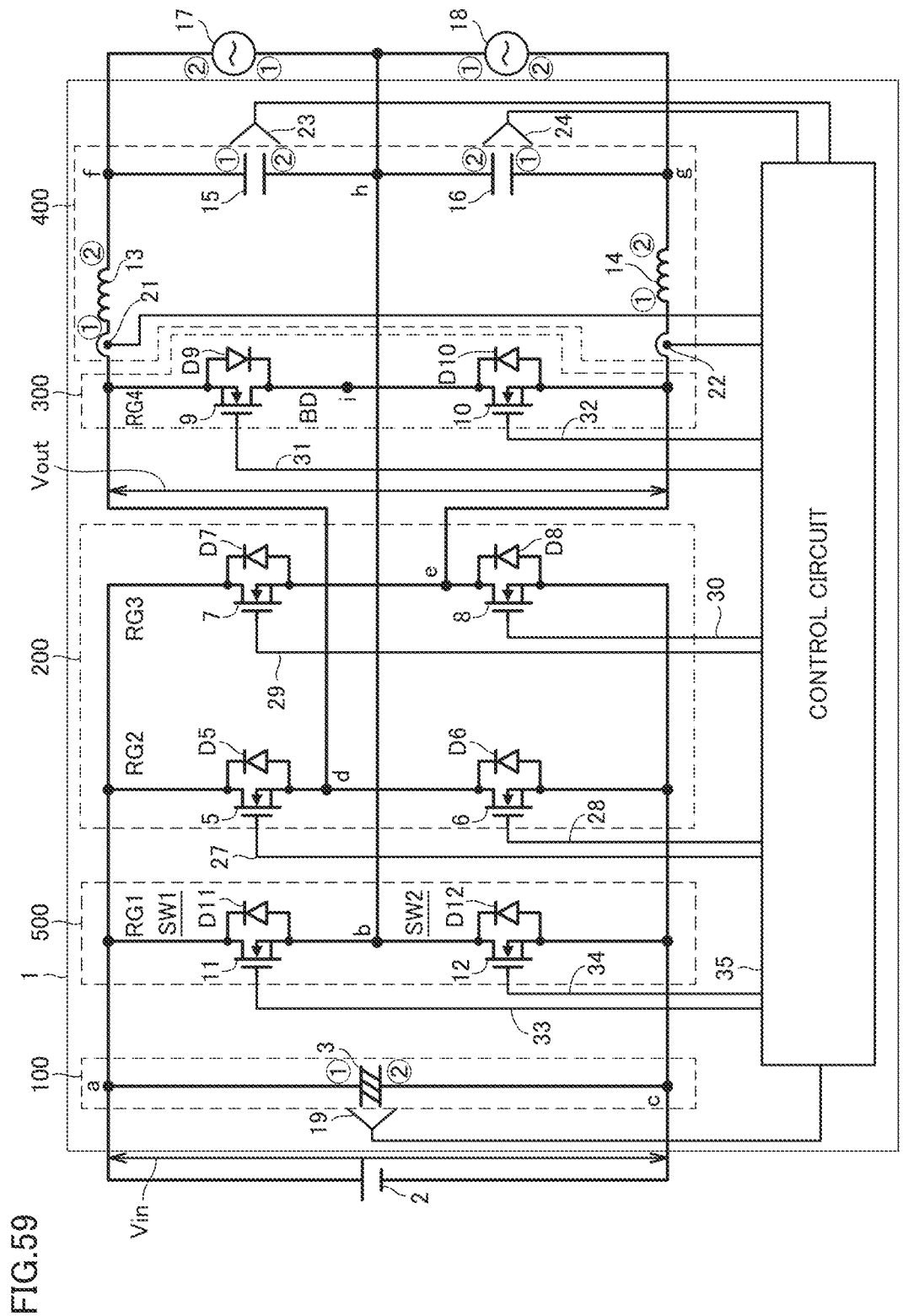
FIG. 59 is a view illustrating a configuration of a power conversion device 1 according to an eighth embodiment.

FIG. 59 is a view illustrating a configuration of a power conversion device 1 according to an eighth embodiment.

Power conversion device 1 of the eighth embodiment is different from power conversion device 1 of the first embodiment in that second filter circuit 400 of power conversion device 1 of the eighth embodiment does not include reactor 37.

Although reactor 37 can reduce the current ripple of differential current IB, when the current ripple of differential current IB has small influence, it is assumed that second filter circuit 400 does not include reactor 37.

In the first to eighth embodiments, the case where the phase of the AC voltage and the phase of the AC current are the same has been described as an example, but the present invention is not limited thereto. The phase of the AC voltage and the phase of the AC current may be shifted by π. Furthermore, a shift amount between the phase of the AC voltage and the phase of the AC current may be other than π. Even in such a case, the power conversion device includes the bidirectional switch, so that the stable operation can be continued as compared with the case where the power conversion device does not include the bidirectional switch.

It should be considered that the disclosed embodiments are an example in all respects and not restrictive. The scope of the present invention is defined by not the description above, but the claims, and it is intended that all modifications within the meaning and scope of the claims and their equivalents are included in the present invention.

REFERENCE SIGNS LIST

1: power conversion device
2: DC power supply
3, 15, 16: capacitor
5 to 12, 9A, 10A, 40, 41: switching element
13, 14, 37: reactor
17, 18: AC power supply
19, 23, 24: voltage detector
21, 22, 36: current detector
27 to 34: drive signal
100: first filter circuit
200: bridge circuit
300: clamp circuit
400: second filter circuit
500: first leg
2203, 3203, 4203, 5203: subtractor
2204, 3204, 4204, 5204: controller 2205, 3205, 4205, 5205: triangular wave carrier generator
2206, 3206, 4206, 5206: comparator
2207, 3207, 4207, 5207: complementary signal output unit
BD: bidirectional switch
SW: changeover switch
D5 to D12, D9A, D10A: diode
RG1 to RG4: leg
a to k: node

The invention claimed is:

1. A three-level power conversion device comprising:
a first leg including: a first switch circuit disposed between a first node to which a positive electrode of a DC power supply is connected and a second node; and a second switch circuit disposed between the second node and a third node;
a first filter circuit including a first capacitor disposed between the first node and the third node;
a bridge circuit including a second leg and a third leg that are disposed in parallel between the first node and the third node;
a clamp circuit including a fourth leg including a bidirectional switch disposed between a fourth node that is a midpoint of the second leg and a fifth node that is a midpoint of the third leg; and
a second filter circuit including: a first reactor including a first terminal connected to the fourth node and a second terminal connected to a sixth node; and a second reactor including a first terminal connected to the fifth node and a second terminal connected to a seventh node,
the second node being connected to a first terminal of a first AC power supply and a first terminal of a second AC power supply, the sixth node being connected to a second terminal of the first AC power supply, and the seventh node being connected to a second terminal of the second AC power supply.

2. The three-level power conversion device according to claim 1, wherein the second filter circuit further includes a third reactor including a first terminal connected to the second node and a second terminal connected to an eighth node,
the first terminal of the first AC power supply and the first terminal of the second AC power supply are connected to the eighth node so as to be connected to the second node via the third reactor.

3. The three-level power conversion device according to claim 2, wherein
the second leg includes:
a first switching element disposed between the first node and the fourth node;
a second switching element disposed between the fourth node and the third node;
a first diode connected in antiparallel to the first switching element; and
a second diode connected in antiparallel to the second switching element, and
the third leg includes:
a third switching element disposed between the first node and the fifth node;
a fourth switching element disposed between the fifth node and the third node;
a third diode connected in antiparallel to the third switching element; and
a fourth diode connected in antiparallel to the fourth switching element.

4. The three-level power conversion device according to claim 3, wherein
the bidirectional switch includes:
a fifth switching element disposed between the fourth node and a ninth node;
a sixth switching element disposed between the ninth node and the fifth node;
a fifth diode connected in antiparallel to the fifth switching element; and
a sixth diode connected in antiparallel to the sixth switching element, and
a positive electrode of the fifth switching element and a positive electrode of the sixth switching element are connected to the ninth node.

5. The three-level power conversion device according to claim 3, wherein
the bidirectional switch includes:
a fifth switching element disposed between the fourth node and a ninth node;
a sixth switching element disposed between the ninth node and the fifth node;
a fifth diode connected in antiparallel to the fifth switching element; and
a sixth diode connected in antiparallel to the sixth switching element, and
a negative electrode of the fifth switching element and a negative electrode of the sixth switching element are connected to the ninth node.

6. The three-level power conversion device according to claim 3, wherein the bidirectional switch includes a fifth switching element and a sixth switching element that are connected in antiparallel between the fourth node and the fifth node.

7. The three-level power conversion device according to claim 4, wherein
the first switch circuit includes:
a seventh switching element disposed between the first node and the second node; and
a seventh diode connected in antiparallel to the seventh switching element,
the second switch circuit includes:
an eighth switching element disposed between the second node and the third node; and
an eighth diode connected in antiparallel to the eighth switching element, and
a negative electrode of the seventh switching element and a positive electrode of the eighth switching element are connected to the second node.

8. The three-level power conversion device according to claim 2, wherein
the second filter circuit further includes a second capacitor and a third capacitor that are connected in series between the sixth node and the seventh node.

9. The three-level power conversion device according to claim 8, wherein
a first terminal of the second capacitor is connected to the sixth node, a second terminal of the second capacitor is connected to the eighth node,
a first terminal of the third capacitor is connected to the seventh node, and
a second terminal of the third capacitor is connected to the eighth node.

10. The three-level power conversion device according to claim 7, further comprising a changeover switch disposed between the eighth node and a tenth node,
wherein the first AC power supply is connected between the sixth node and the tenth node, the second AC power supply is connected between the tenth node and the seventh node, the second filter circuit further includes:
  a second capacitor disposed between the sixth node and the eighth node; and
  a third capacitor disposed between the eighth node and the seventh node, and the changeover switch is turned on during single-phase three-wire operation, and the changeover switch is turned off during single-phase two-wire operation.

11. The three-level power conversion device according to claim 10, further comprising a control circuit configured to perform switching control of the eighth switching element at timing complementary to timing of the seventh switching element during the single-phase three-wire operation.

12. The three-level power conversion device according to claim 10, further comprising a control circuit configured to always turn off the seventh switching element and the eighth switching element during the single-phase two-wire operation.

13. The three-level power conversion device according to claim 11, wherein when potential of the first terminal of the second capacitor is positive, potential of the second terminal of the second capacitor is negative, potential of the first terminal of the third capacitor is negative, potential of the second terminal of the third capacitor is positive, and current flows from the first terminal of the first reactor to the second terminal of the first reactor, the control circuit:
always turns on the fifth switching element;
always turns off the second switching element and the third switching element;
performs switching control of the first switching element and the fourth switching element at identical timing;
performs the switching control the sixth switching element at timing complementary to the timing of the first switching element and the fourth switching element; and
set a dead time during which the first switching element, the fourth switching element, and the sixth switching element are simultaneously turned off.

14. The three-level power conversion device according to claim 11, wherein when the potential of the first terminal of the second capacitor is negative, the potential of the second terminal of the second capacitor is positive, the potential of the first terminal of the third capacitor is positive, the potential of the second terminal of the third capacitor is negative, and the current flows from the second terminal of the first reactor to the first terminal of the first reactor, the control circuit:
always turns on the sixth switching element;
always turns off the first switching element and the fourth switching element;
performs the switching control of the second switching element and the third switching element at identical timing;
performs the switching control of the fifth switching element at timing complementary to the timing of the second switching element and the third switching element; and
sets the dead time during which the second switching element, the third switching element, and the fifth switching element are simultaneously turned off.

15. The three-level power conversion device according to claim 11, wherein the control circuit controls modulation factors of the seventh switching element and the eighth switching element based on a detected value of voltage at the second capacitor and a command value of the voltage at the second capacitor.

16. The three-level power conversion device according to claim 11, wherein the control circuit controls modulation factors of the seventh switching element and the eighth switching element based on a detected value of voltage at the third capacitor and a command value of the voltage at the third capacitor.

17. The three-level power conversion device according to claim 11, wherein the control circuit controls modulation factors of the seventh switching element and the eighth switching element based on a detected value of current flowing through the first reactor and a command value of the current flowing through the first reactor.

18. The three-level power conversion device according to claim 11, wherein the control circuit controls modulation factors of the seventh switching element and the eighth switching element based on a detected value of current flowing through the second reactor and a command value of the current flowing through the second reactor.

* * * * *